(12) United States Patent
Jore et al.

(10) Patent No.: US 9,154,024 B2
(45) Date of Patent: Oct. 6, 2015

(54) SYSTEMS AND METHODS FOR IMPROVED DIRECT DRIVE GENERATORS

(75) Inventors: Matthew B. Jore, Ronan, MT (US); Lincoln Jore, Ronan, MT (US); Michael A. Kvam, Polson, MT (US); James D. Jore, Polson, MT (US); David Samsel, Missoula, MT (US); James David Duford, Polson, MT (US); James S. Smith, Lyons, CO (US)

(73) Assignee: Boulder Wind Power, Inc., Louisville, CO (US)

( * ) Notice: Subject to any disclaimer, the term of this patent is extended or adjusted under 35 U.S.C. 154(b) by 572 days.

(21) Appl. No.: 13/152,164

(22) Filed: Jun. 2, 2011

(65) Prior Publication Data

US 2012/0217831 A1  Aug. 30, 2012

Related U.S. Application Data

(60) Provisional application No. 61/350,850, filed on Jun. 2, 2010, provisional application No. 61/517,040, filed on Apr. 12, 2011.

(51) Int. Cl.
*H02K 21/24* (2006.01)
*H02K 1/30* (2006.01)
*H02K 7/18* (2006.01)

(52) U.S. Cl.
CPC .................. *H02K 21/24* (2013.01); *H02K 1/30* (2013.01); *H02K 7/1838* (2013.01); *H02K 2201/15* (2013.01); *Y02E 10/725* (2013.01)

(58) Field of Classification Search
USPC ............... 310/156.25, 156.32, 109, 126, 266, 310/268; 290/44, 55
See application file for complete search history.

(56) References Cited

U.S. PATENT DOCUMENTS

| | | |
|---|---|---|
| 3,233,950 A | 2/1966 | Baermann |
| 3,614,181 A | 10/1971 | Meeks |
| 3,793,530 A | 2/1974 | Carter |
| 3,796,039 A | 3/1974 | Lucien |
| 4,035,659 A | 7/1977 | Jeppson |
| 4,055,123 A | 10/1977 | Heidelberg |
| 4,168,439 A | 9/1979 | Palma |
| 4,242,628 A | 12/1980 | Mohan et al. |
| 4,261,441 A | 4/1981 | Wood |
| 4,281,965 A | 8/1981 | Stjernholm |

(Continued)

FOREIGN PATENT DOCUMENTS

| | | |
|---|---|---|
| DE | 202010003183 | 6/2010 |
| DE | 10 2009 017839 A1 | 10/2010 |

(Continued)

OTHER PUBLICATIONS

Invitation to Pay Additional Fees for International Application No. PCT/US2012/041062, mailed Mar. 4, 2013, 6 pages.

(Continued)

*Primary Examiner* — Naishadh Desai
(74) *Attorney, Agent, or Firm* — Cooley LLP

(57) ABSTRACT

Systems and methods for improved generators are described. One embodiment includes an assembly for an axial flux generator, the assembly comprising an arc-shaped rotor section that includes a rotor support configured to rotate around an axis of a generator, and an at least one rotor element for power generation that is connected to the rotor support; an arc-shaped stator section comprising a stator support and an at least one stator element for power generation connected to the stator support; wherein the rotor section and the stator section are configured to provide an axial air gap between the at least one rotor element and the at least one stator element, and wherein the at least one rotor element and the at least one stator element are positioned to be at substantially the same radial distance from the axis of the generator.

18 Claims, 47 Drawing Sheets

(56) References Cited

U.S. PATENT DOCUMENTS

| | | | |
|---|---|---|---|
| 4,291,233 A | 9/1981 | Kirschbaum |
| 4,292,532 A | 9/1981 | Leroux |
| 4,318,019 A | 3/1982 | Teasley et al. |
| 4,336,475 A | 6/1982 | Morinaga et al. |
| 4,418,287 A | 11/1983 | Syverson |
| 4,594,552 A | 6/1986 | Grimaldi et al. |
| 4,658,162 A | 4/1987 | Koyama et al. |
| 4,720,640 A | 1/1988 | Anderson et al. |
| 4,793,263 A | 12/1988 | Basic et al. |
| 4,804,574 A | 2/1989 | Osawa et al. |
| 4,906,060 A | 3/1990 | Claude |
| 4,970,404 A | 11/1990 | Barger |
| 4,992,920 A | 2/1991 | Davis |
| 4,994,684 A | 2/1991 | Lauw et al. |
| 5,028,804 A | 7/1991 | Lauw |
| 5,083,077 A | 1/1992 | Wallace et al. |
| 5,099,162 A | 3/1992 | Sawada |
| 5,237,230 A | 8/1993 | Sugiyama et al. |
| 5,239,251 A | 8/1993 | Lauw |
| 5,260,617 A | 11/1993 | Leibowitz |
| 5,289,042 A | 2/1994 | Lis |
| 5,299,913 A | 4/1994 | Heidelberg |
| 5,315,159 A | 5/1994 | Gribnau |
| 5,370,711 A | 12/1994 | Audit et al. |
| 5,418,446 A | 5/1995 | Hallidy |
| 5,439,488 A | 8/1995 | Audit et al. |
| 5,506,453 A | 4/1996 | McCombs |
| 5,525,894 A | 6/1996 | Heller |
| 5,587,643 A | 12/1996 | Heller |
| 5,589,722 A | 12/1996 | Sakaguchi et al. |
| 5,608,196 A | 3/1997 | Hall et al. |
| 5,610,463 A | 3/1997 | Dunfield et al. |
| 5,619,083 A | 4/1997 | Dunfield et al. |
| 5,619,085 A | 4/1997 | Shramo |
| 5,783,894 A | 7/1998 | Wither |
| 5,798,631 A | 8/1998 | Spee et al. |
| 5,798,632 A | 8/1998 | Muljadi |
| 5,842,312 A | 12/1998 | Krumme et al. |
| 5,844,324 A | 12/1998 | Spriggle |
| 5,844,341 A | 12/1998 | Spooner et al. |
| 5,986,438 A | 11/1999 | Wallace et al. |
| 6,016,015 A | 1/2000 | Willard, Jr. |
| 6,040,650 A | 3/2000 | Rao |
| 6,064,123 A | 5/2000 | Gislason |
| 6,066,945 A | 5/2000 | Shimazu et al. |
| 6,072,303 A | 6/2000 | Nickoladze et al. |
| 6,097,104 A | 8/2000 | Russell et al. |
| 6,153,944 A | 11/2000 | Clark |
| 6,157,147 A | 12/2000 | Lin |
| 6,160,336 A | 12/2000 | Baker, Jr. et al. |
| 6,163,097 A | 12/2000 | Smith et al. |
| 6,163,137 A | 12/2000 | Wallace et al. |
| 6,172,429 B1 | 1/2001 | Russell |
| 6,177,735 B1 | 1/2001 | Chapman et al. |
| 6,215,199 B1 | 4/2001 | Lysenko et al. |
| 6,246,125 B1 | 6/2001 | Axtell |
| 6,249,058 B1 | 6/2001 | Rea |
| 6,278,197 B1 | 8/2001 | Appa |
| 6,285,090 B1 | 9/2001 | Brutsaert et al. |
| 6,327,994 B1 | 12/2001 | Labrador |
| 6,359,401 B1 | 3/2002 | Garcia-Sinclair et al. |
| 6,362,554 B1 | 3/2002 | Neal |
| 6,373,161 B1 | 4/2002 | Khalaf |
| 6,392,371 B1 | 5/2002 | Cheng et al. |
| 6,412,237 B1 | 7/2002 | Sahai |
| 6,426,580 B1 | 7/2002 | Ikeda et al. |
| 6,429,552 B2 | 8/2002 | Asao et al. |
| 6,452,287 B1 | 9/2002 | Looker |
| 6,476,513 B1 | 11/2002 | Gueorguiev |
| 6,476,534 B1 | 11/2002 | Vanderbeck et al. |
| 6,476,535 B1 | 11/2002 | Oohashi et al. |
| 6,483,199 B2 | 11/2002 | Umemoto et al. |
| 6,504,260 B1 | 1/2003 | Debleser |
| 6,522,045 B2 | 2/2003 | Ikeda et al. |
| 6,522,046 B2 | 2/2003 | Ikeda et al. |
| 6,541,877 B2 | 4/2003 | Kim et al. |
| 6,566,783 B2 | 5/2003 | Hatz et al. |
| 6,598,573 B2 | 7/2003 | Kobayashi |
| 6,641,367 B1 | 11/2003 | Van der Klippe |
| 6,661,146 B2 | 12/2003 | Oohashi et al. |
| 6,664,704 B2 | 12/2003 | Calley |
| 6,665,990 B1 | 12/2003 | Cody |
| 6,693,409 B2 | 2/2004 | Lynch et al. |
| 6,727,630 B1 | 4/2004 | Maslov et al. |
| 6,741,000 B2 * | 5/2004 | Newcomb ........................ 310/87 |
| 6,781,276 B1 | 8/2004 | Stiesdal et al. |
| 6,790,156 B2 * | 9/2004 | Hosle ........................... 475/331 |
| 6,791,222 B1 | 9/2004 | Maslov et al. |
| 6,794,777 B1 | 9/2004 | Fradella |
| 6,794,781 B2 | 9/2004 | Razzell et al. |
| 6,798,082 B1 | 9/2004 | Chen |
| 6,800,956 B2 | 10/2004 | Bartlett |
| 6,814,493 B2 | 11/2004 | Wobben |
| 6,826,874 B2 | 12/2004 | Takeuchi et al. |
| 6,833,633 B2 | 12/2004 | Wobben |
| 6,836,028 B2 | 12/2004 | Northrup et al. |
| 6,836,036 B2 | 12/2004 | Dubé |
| 6,841,892 B1 | 1/2005 | Le Nabour et al. |
| 6,844,656 B1 | 1/2005 | Larsen et al. |
| 6,849,965 B2 | 2/2005 | Le Nabour et al. |
| 6,853,094 B2 | 2/2005 | Feddersen et al. |
| 6,856,039 B2 | 2/2005 | Mikhail et al. |
| 6,876,176 B2 | 4/2005 | Stefanovi et al. |
| 6,891,302 B1 | 5/2005 | Gabrys |
| 6,897,577 B2 | 5/2005 | Weeber et al. |
| 6,903,466 B1 | 6/2005 | Mercier et al. |
| 6,909,211 B2 | 6/2005 | Ciciliani et al. |
| 6,911,741 B2 | 6/2005 | Pettersen et al. |
| 6,921,243 B2 | 7/2005 | Canini et al. |
| 6,929,671 B2 | 8/2005 | Kim et al. |
| 6,943,461 B2 | 9/2005 | Kaploun |
| 6,943,462 B2 | 9/2005 | Wobben |
| 6,943,478 B2 | 9/2005 | Zepp et al. |
| 6,946,750 B2 | 9/2005 | Wobben |
| 6,954,004 B2 | 10/2005 | Skeist et al. |
| 6,984,897 B2 | 1/2006 | Skeist |
| 7,004,724 B2 | 2/2006 | Pierce et al. |
| 7,011,598 B2 | 3/2006 | Flamang et al. |
| 7,019,413 B2 | 3/2006 | Kinoshita |
| 7,023,160 B2 | 4/2006 | Virtanen et al. |
| 7,042,109 B2 | 5/2006 | Gabrys |
| 7,042,110 B2 | 5/2006 | Mikhail et al. |
| 7,042,128 B2 | 5/2006 | Zepp et al. |
| 7,045,925 B2 | 5/2006 | Frager et al. |
| 7,049,719 B2 | 5/2006 | Wobben |
| 7,061,133 B1 | 6/2006 | Leijon et al. |
| 7,075,192 B2 | 7/2006 | Bywaters et al. |
| 7,081,696 B2 | 7/2006 | Ritchey |
| 7,084,520 B2 | 8/2006 | Zambrano et al. |
| 7,088,029 B2 | 8/2006 | Hiramatsu |
| 7,098,551 B2 | 8/2006 | Wobben |
| 7,105,941 B2 | 9/2006 | Hua |
| 7,105,975 B2 | 9/2006 | Semones et al. |
| 7,109,599 B2 | 9/2006 | Watkins |
| 7,109,625 B1 | 9/2006 | Jore et al. |
| 7,126,235 B2 | 10/2006 | Bernhoff et al. |
| 7,135,952 B2 | 11/2006 | Harding |
| 7,145,266 B2 | 12/2006 | Lynch et al. |
| 7,154,191 B2 | 12/2006 | Jansen et al. |
| 7,154,192 B2 | 12/2006 | Jansen et al. |
| 7,154,193 B2 | 12/2006 | Jansen et al. |
| 7,166,984 B1 | 1/2007 | Jones et al. |
| 7,170,212 B2 | 1/2007 | Balson et al. |
| 7,180,204 B2 | 2/2007 | Grant et al. |
| 7,186,083 B2 | 3/2007 | Bayly |
| 7,190,085 B2 | 3/2007 | Moehlenkamp |
| 7,190,101 B2 | 3/2007 | Hirzel |
| 7,205,678 B2 | 4/2007 | Casazza et al. |
| 7,215,038 B2 | 5/2007 | Bacon |
| 7,230,361 B2 | 6/2007 | Hirzel |
| 7,231,743 B2 | 6/2007 | Takeuchi et al. |
| 7,245,037 B2 | 7/2007 | Ängquist et al. |
| 7,246,991 B2 | 7/2007 | Bosche |
| 7,253,543 B2 | 8/2007 | Akiyama |

(56) References Cited

U.S. PATENT DOCUMENTS

| | | |
|---|---|---|
| 7,289,329 B2 | 10/2007 | Chen et al. |
| 7,291,956 B2 | 11/2007 | Itoh et al. |
| 7,312,537 B1 | 12/2007 | Walling |
| 7,329,099 B2 | 2/2008 | Hartman |
| 7,332,837 B2 | 2/2008 | Ward et al. |
| 7,345,377 B2 | 3/2008 | Bacon |
| 7,348,705 B2 | 3/2008 | Cai et al. |
| 7,355,309 B2 | 4/2008 | Costin et al. |
| 7,358,624 B2 | 4/2008 | Bacon |
| 7,365,472 B2 | 4/2008 | Hiramatsu |
| 7,372,174 B2 | 5/2008 | Jones et al. |
| 7,375,449 B2 | 5/2008 | Butterfield |
| 7,385,306 B2 | 6/2008 | Casazza et al. |
| 7,385,330 B2 | 6/2008 | Trzynadlowski et al. |
| 7,410,123 B2 | 8/2008 | Nunnally |
| 7,414,331 B2 | 8/2008 | Datta |
| 7,425,771 B2 | 9/2008 | Rivas et al. |
| 7,437,264 B2 | 10/2008 | Pierce et al. |
| 7,439,714 B2 | 10/2008 | Gonzalez et al. |
| 7,446,435 B2 | 11/2008 | Zhang et al. |
| 7,456,534 B2 | 11/2008 | Engstrom |
| 7,468,569 B2 | 12/2008 | Hirzel |
| 7,478,777 B2 | 1/2009 | Wobben |
| 7,482,720 B2 | 1/2009 | Gordon et al. |
| 7,525,228 B2 | 4/2009 | Chuang et al. |
| 7,538,446 B2 | 5/2009 | Bonnet |
| 7,545,052 B2 | 6/2009 | Gonzalez et al. |
| 7,573,173 B1 | 8/2009 | Frownfelter |
| 7,581,921 B2 | 9/2009 | Bagepalli et al. |
| 7,592,766 B2 | 9/2009 | Patel et al. |
| 7,595,574 B2 | 9/2009 | Ritchey |
| 7,612,463 B2 | 11/2009 | Cullen et al. |
| 7,633,770 B2 | 12/2009 | Datta et al. |
| 7,640,648 B1 | 1/2010 | Rittenhouse |
| 7,646,126 B2 | 1/2010 | Trzynadlowski et al. |
| 7,646,132 B2 | 1/2010 | Halstead |
| 7,646,178 B1 | 1/2010 | Fradella |
| 7,656,135 B2 | 2/2010 | Schram et al. |
| 7,687,932 B2 | 3/2010 | Casazza et al. |
| 7,692,357 B2 | 4/2010 | Qu et al. |
| 7,710,081 B2 | 5/2010 | Saban et al. |
| 7,714,479 B2 | 5/2010 | Seneff et al. |
| 7,723,891 B2 | 5/2010 | Rittenhouse |
| 7,750,522 B2 | 7/2010 | Gizaw et al. |
| 7,755,244 B2 | 7/2010 | Ley et al. |
| 7,781,932 B2 | 8/2010 | Jansen |
| 7,808,149 B2 | 10/2010 | Pabst et al. |
| 7,816,833 B2 | 10/2010 | Nair |
| 7,821,164 B2 | 10/2010 | Laskaris et al. |
| 7,830,057 B2 | 11/2010 | Gieras |
| 7,851,965 B2 | 12/2010 | Calley et al. |
| 7,852,643 B2 | 12/2010 | Zhang et al. |
| 7,854,198 B2 | 12/2010 | Groening et al. |
| 7,888,839 B2 | 2/2011 | Gabrys et al. |
| 7,888,904 B2 | 2/2011 | Mularcik |
| 7,893,555 B2 | 2/2011 | Casazza et al. |
| 7,919,879 B2 | 4/2011 | Flannery et al. |
| 7,923,853 B2 | 4/2011 | Lewis |
| 7,923,886 B2 | 4/2011 | Calley et al. |
| 7,928,592 B2 | 4/2011 | Wagoner et al. |
| 7,939,959 B2 | 5/2011 | Wagoner et al. |
| 7,944,068 B2 | 5/2011 | Wagoner et al. |
| 8,040,011 B2 | 10/2011 | Mueller et al. |
| 8,097,970 B2 | 1/2012 | Hyvarinen |
| 8,115,348 B2 | 2/2012 | Hsu et al. |
| 8,138,620 B2 | 3/2012 | Wagoner et al. |
| 8,178,992 B1 | 5/2012 | Meller |
| 8,186,956 B2 * | 5/2012 | Numajiri et al. ............ 416/147 |
| 8,217,533 B2 | 7/2012 | Jones et al. |
| 8,222,762 B2 | 7/2012 | Borgen |
| 8,222,792 B2 * | 7/2012 | Platon et al. ............... 310/266 |
| 8,343,009 B2 * | 1/2013 | Berger et al. ............... 475/337 |
| 8,362,731 B2 | 1/2013 | Smith et al. |
| 8,373,307 B2 | 2/2013 | Sihler et al. |
| 8,426,995 B2 | 4/2013 | Langel |
| 8,716,913 B2 | 5/2014 | Kvam et al. |
| 8,823,241 B2 | 9/2014 | Jore et al. |
| 2003/0155829 A1 | 8/2003 | McMullen et al. |
| 2004/0021437 A1 | 2/2004 | Maslov et al. |
| 2004/0041409 A1 * | 3/2004 | Gabrys ......................... 290/55 |
| 2004/0069901 A1 | 4/2004 | Nunnally |
| 2005/0120856 A1 | 6/2005 | Duford et al. |
| 2006/0055265 A1 | 3/2006 | Zalusky |
| 2006/0087198 A1 * | 4/2006 | Kang et al. .................. 310/268 |
| 2006/0202584 A1 | 9/2006 | Jore et al. |
| 2007/0152536 A1 | 7/2007 | Chuang et al. |
| 2007/0290582 A1 * | 12/2007 | Han et al. ................... 310/68 R |
| 2008/0088200 A1 | 4/2008 | Ritchey |
| 2008/0100166 A1 | 5/2008 | Stahlhut et al. |
| 2008/0100174 A1 | 5/2008 | Stahlhut et al. |
| 2008/0292467 A1 | 11/2008 | Borgen |
| 2009/0015020 A1 | 1/2009 | Stiesdal |
| 2009/0134629 A1 | 5/2009 | Stiesdal |
| 2009/0295231 A1 | 12/2009 | Gaffney et al. |
| 2010/0253272 A1 | 10/2010 | Stiesdal et al. |
| 2011/0006600 A1 | 1/2011 | Fontana et al. |
| 2011/0133461 A1 | 6/2011 | Hjort |
| 2011/0193349 A1 | 8/2011 | Borgen et al. |
| 2011/0241630 A1 | 10/2011 | Ritchey et al. |
| 2011/0273048 A1 * | 11/2011 | Jore et al. .................. 310/156.37 |
| 2011/0291413 A1 | 12/2011 | Wamble, III et al. |
| 2011/0298310 A1 | 12/2011 | Ross et al. |
| 2012/0104894 A1 | 5/2012 | Van Den Bossche et al. |
| 2012/0155131 A1 | 6/2012 | Moreno-Castaneda et al. |
| 2012/0175962 A1 | 7/2012 | Zhan et al. |
| 2012/0200177 A1 | 8/2012 | Atkinson et al. |
| 2012/0217746 A1 | 8/2012 | Groendahl et al. |
| 2012/0221159 A1 | 8/2012 | Olesen |
| 2012/0243274 A1 | 9/2012 | Feng et al. |
| 2012/0262095 A1 | 10/2012 | Smith et al. |
| 2013/0015703 A1 | 1/2013 | Rouse et al. |
| 2013/0119802 A1 | 5/2013 | Smith et al. |
| 2014/0152136 A1 | 6/2014 | Duford et al. |

FOREIGN PATENT DOCUMENTS

| | | | |
|---|---|---|---|
| EP | 1607583 | | 12/2005 |
| EP | 1684399 A2 | | 7/2006 |
| EP | 1732011 | | 12/2006 |
| EP | 2237398 A1 | | 10/2010 |
| EP | 2369720 | | 9/2011 |
| FR | 2924285 | | 5/2009 |
| GB | 1 129 290 A | | 10/1968 |
| JP | 59 122361 A | | 7/1984 |
| JP | 10-285894 A | | 10/1998 |
| KR | 10-2009-0066369 | | 6/2009 |
| WO | WO 98/20595 | | 5/1998 |
| WO | WO 01/94779 | | 12/2001 |
| WO | WO 02/33254 A1 | | 4/2002 |
| WO | WO 2007/043894 A1 | | 4/2007 |
| WO | WO 2008014584 A1 * | 2/2008 | ............ H02K 11/04 |
| WO | WO 2010/083054 | | 7/2010 |
| WO | WO 2012/059109 A2 | | 5/2012 |
| WO | WO 2012/092964 A1 | | 7/2012 |
| WO | WO 2012/092965 A1 | | 7/2012 |
| WO | WO 2012/092967 A1 | | 7/2012 |

OTHER PUBLICATIONS

International Search Report and Written Opinion for International Application No. PCT/US2012/041062, mailed on May 15, 2013, 18 pages.

International Search Report and Written Opinion for International Application No. PCT/US2012/033236, mailed on Apr. 9, 2013, 13 pages.

Office Action for Chinese Application No. 201080004779.4, mailed Feb. 6, 2013.

International Search Report and Written Opinion for International Application No. PCT/US2010/000112, mailed Mar. 16, 2010.

* cited by examiner

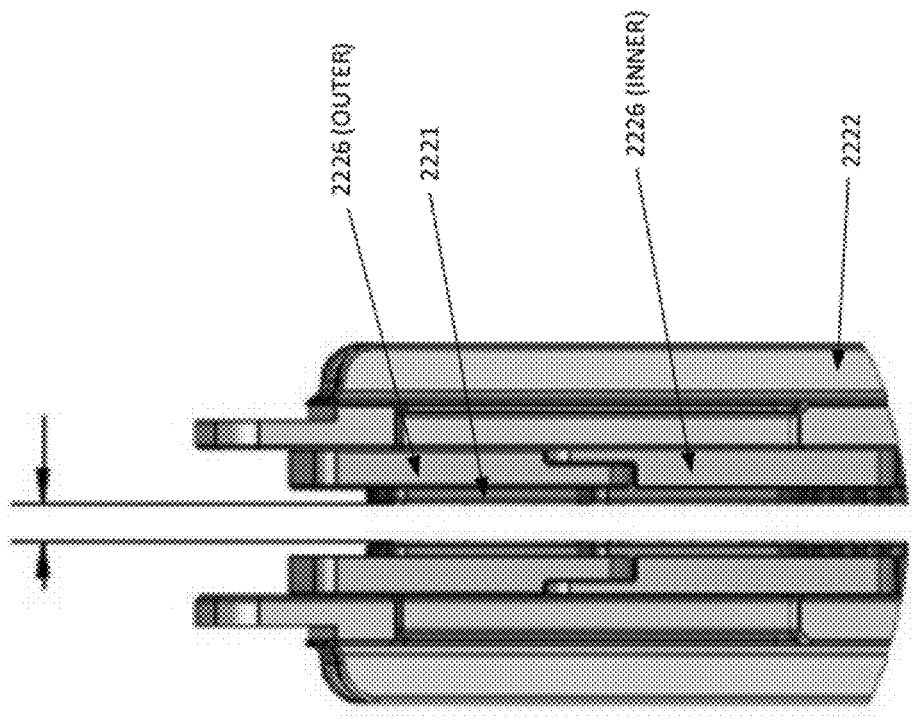
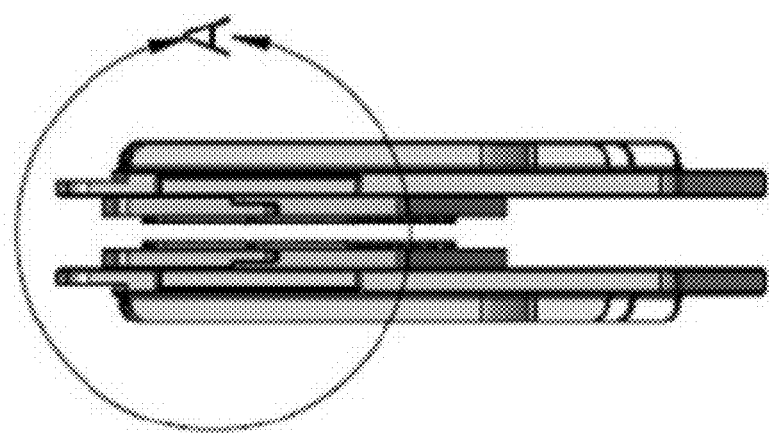
FIG. 19

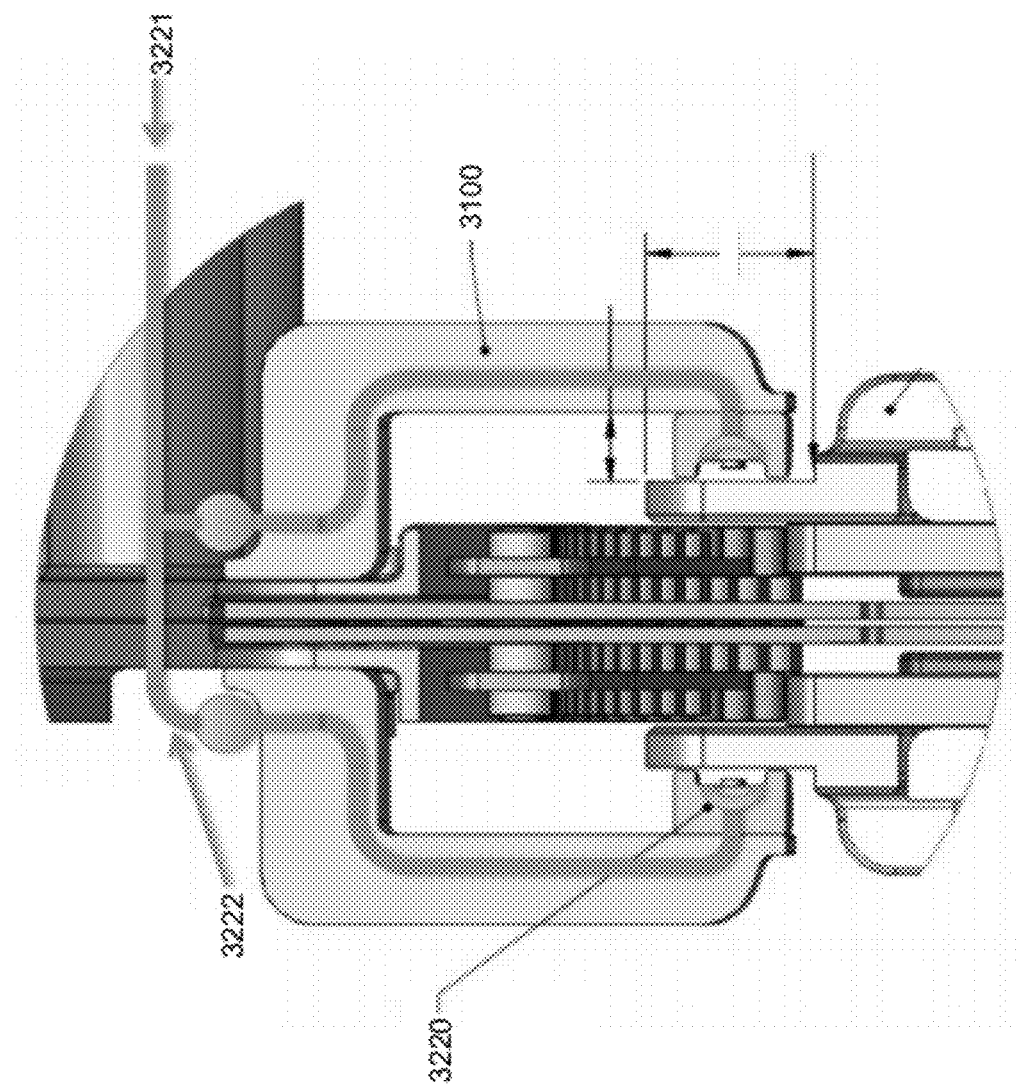

SYSTEMS AND METHODS FOR IMPROVED DIRECT DRIVE GENERATORS

PRIORITY

The present application claims priority to commonly owned and assigned provisional application No. 61/350,850, filed Jun. 2, 2010, entitled "Systems and Methods for Improved Direct Drive Generators," and provisional application No. 61/517,040, filed Apr. 12, 2011, entitled "Air Gap Control System," both of which are incorporated herein by reference.

RELATED APPLICATIONS

The present application is related to commonly owned and assigned application no. PCT/US2010/000112, entitled "Segmented Stator for an Axial Field Device," which is incorporated herein by reference.

FIELD OF THE INVENTION

The present invention relates to electrical generation devices, including stator/rotor design and assembly, and systems and methods for support structure. The field of the invention includes the design, manufacturing and operation of rotating electromagnetic machines—typically called electric motors or electric power generators.

BACKGROUND OF THE INVENTION

In principle there are two main types of drive trains used in wind turbines. The first type, as shown in FIG. 1, is the more traditional type of turbine comprising a gearbox attached between a main rotor shaft and a generator of the wind turbine. The second type is a gearless type, where the gearbox and the conventional generator are substituted by a multipolar generator, or so-called direct drive generator.

The size and design of a direct drive generator is influenced by its rotational speed and by the desired power output. Assuming constant rotational speed, the two primary factors in power output are the amount of active material and the radial distance of the active material. Accordingly, for a desired or optimal power output it is possible to reduce the necessary amount of active material by increasing the diameter of the direct drive generator. Thus, it is advantageous for direct drive generators with low rotational speeds, such as direct drive generators used in hydro and wind turbines, to have a large outer diameter.

While the large outer diameter has advantages, it also causes numerous issues for direct drive generators. Among other problems, the large outer diameter causes problems with transporting, lifting, assembling, repairing, and replacing the direct drive generator. These problems are due not only to the size of the device (which significantly impacts transport) but also the weight of the direct drive generator. For example, for typical rotating electric machines, the air-gap (the distance between rotor and stator) is kept no larger than a few millimeters in order to avoid excessive magnetization requirements. In order to closely maintain this air-gap, in conventional rotating electric machines the rotating and stationary parts of the machine are relatively stiff, structurally, on an individual basis. In addition, the support structure, commonly a bearing system is also very stiff. An additional constraint is that the components that affect the shape and dimensions of the parts facing the air gap between the rotating and stationary parts must be produced and assembled with a high degree of precision as the nominal air gap of such machines is typically less than 0.375" on a diameter that can approach 144". Additionally, the heavy weight of a multi-megawatt generator of conventional design necessitates additional infrastructure support in the turbine tower and related components, which adds cost and complexity.

As partial solutions to these problems, there have been suggestions on dividing the parts of the generator:

In WO 98/20595 A1 a stator for a rotating electric machine is disclosed comprising a stator core and a winding. The stator core is provided with stator teeth extending radially inwards towards a rotor. Each stator tooth is configured as a number of tooth sections joined axially into a stator tooth plank. That stator tooth planks are fitted together side-by-side thus forming a section of the stator core. This construction makes the transport of parts of the rotating electric machine to the site of erection partially easier because the stator can be assembled on site. However, this construction requires a stator housing having relatively large outer dimensions.

From U.S. Pat. No. 4,594,552, an armature winding of a split stator is known. The split stator has a slotted core divided by at least two circumferentially-spaced split lines to facilitate the assembly and the disassembly of the split stator. The armature winding comprises armature coils in the slots of the stator core connected to provide poles and arranged to provide a plurality of armature coils divided at the split lines. Connecting and disconnecting means are provided to connect and disconnect the armature coils when the split stator is assembled and disassembled, respectively. This construction, however, also requires a stator housing having relatively large outer dimensions.

U.S. Pat. No. 5,844,341 describes an electric generator to be driven by a low speed device such as wind turbine. The generator consists of one or more rotor rings of many permanent magnets of alternating polarity and coaxial stator rings of many laminated yokes, each yoke defining slots to locate coils. The yokes and coils form modules which are supported by beams relative to the rotor rings. The drawbacks of this configuration are that the electromechanical properties in this form of modular construction, with single polar pairs separated by air gaps, may be disadvantageous; that a possible dismantling of a single stator module can require that the whole generator has to be opened in situ thus implying risk of humidity, dirt, etc.; and that it may be cumbersome if the stator module has to be taken out in a disadvantageous direction.

U.S. Pat. No. 6,781,276 B1 describes a generator for a wind turbine comprising a stator and a rotor. The stator has a number of stator modules that are individual and which may be installed, repaired and dismantled individually and independently of each other. This generator has no part larger than the air gap diameter. But even if no part is larger than the air gap diameter, the largest element to be transported still has a substantial size, given that the rotor is a single piece. In its completed form, this rotor is fitted with strong permanent magnets and needs to be covered by a nonmagnetic layer, e.g., wood or polystyrene of a certain thickness, during transportation. And while the dimensions of the rotor are smaller than the dimensions of the finished generator, it is still, at maybe 5 m diameter and 1.5 m length, a very substantial piece of equipment to transport.

U.S. Patent Publication No. 2009/0134629 describes a generator for a wind turbine comprising ring-segmented-shaped stator segments and ring-segment-shaped rotor segments. The stator and rotor are separated by a radial air gap wherein each ring-segmented-shaped stator segment is located radially outward from the ring-segment-shaped rotor segments. By using a ring shaped stator and ring shaped rotor, the invention requires axial width in order to provide the amount of active material desired at a certain diameter. Some further reduction in weight is described by reducing the supporting structure that limits the axial movement of the rotor and stator.

Although present devices are functional, they are not sufficiently efficient, effective or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed herein.

The present invention can provide a system and method for reducing the weight and size of transportable components of a direct drive generator. In an exemplary embodiment, a direct drive or directly driven axial flux generator is provided, the generator comprising a stator having at least one stator element for power generation and a rotor rotatable around a center axis of the generator having at least one rotor element for power generation; the generator having an axial air gap between the stator element and rotor element, wherein the at least one stator element and the at least one rotor element are located at substantially the same radial distance from the center axis so as to allow for electrical generation during their relative motion. The generator may further comprise arc-shaped axially connectable stator supports, the stator elements being axially and circumferentially attached to the arc-shaped supports of the stator, wherein junctions between the arc-shaped supports of the stator and stator elements are located substantially at a position on the circumference of a radius which is substantially larger than the center axis of the generator; with the complete assembled generator having the appearance of a disc-shaped ring having a very large, somewhat open center with a spoked or other similar connecting structure.

In a preferred embodiment, the present invention can include a direct drive generator made with permanent magnets attached to the rotor and with a segmented iron-less stator made using printed circuit board manufacturing processes or some other iron-less stator, such as wire-wound coils. This type of generator is preferred because the permanent magnets allow for a smaller machine and the iron-less stator allows a cog-free operation and alleviates the disadvantages of magnetic attractive forces between rotor and stator, such disadvantages including extra load on bearings, difficulties in maintaining gaps between rotor and stator, and difficulties in assembly on site. In exemplary embodiments, the axial gap between the rotating rotor elements and the stationary stator elements is maintained by means that allow a flexible non-rigid construction. This flexible, detachable, segmented system allows a complete large diameter generator to be transported in sections and assembled on site. Additionally, the axial-gap maintenance means eliminates the need for heavy, rigid supports that are usually required to maintain electromagnetic gaps in conventional machines. Furthermore, the axial flux generator incorporates a segmented stator made from multi-layered printed circuit boards and a segmented iron rotor and permanent magnets to generate permanent magnetic flux. Furthermore, the invention concerns a wind turbine incorporating such a direct drive generator.

In another embodiment, the present invention comprises a direct-drive axial flux generator comprising an arc-shaped, sectioned stator having at least one stator element operative for the electrical power generation and an arc-shaped, sectioned rotor having at least one rotor element operative for the electrical power generation, the generator having an axial air gap between the stator element(s) and the rotor element(s), wherein the stator(s) and rotor(s) are assembled and constructed together in transportable sections, along with supporting elements of the stator sections and rotor sections. The stator element(s) and rotor element(s) are located substantially at the same radius in relation to the center axis of the generator. That is, the stator element(s) and rotor element(s) are positioned to overlap radially, at least partially, in order for power generation. According to the invention, the stator of the generator is comprised of arc-shaped, sectioned components including supporting structure and stator element(s) and rotor element(s). The stator as a whole comprises a plurality of single, manageable sections, the sections being attached to each other in a detachable way.

In a preferred embodiment, the connections in particular, between the arc-shaped supporting elements and the arc-shaped stator elements, are non-destructively detachable. The assembly and the disassembly of the stator, rotor, and support structure, and thus of the generator, on the site of erection are simplified. In the case of a wind turbine, the whole mounted generator may be lifted into the nacelle using a crane. Alternatively, the generator pieces may be lifted into the nacelle, with the nacelle on the ground or on the tower, for assembly. The significantly lighter and manageable parts and smaller pieces of the generator can be carried into the nacelle where the generator can be assembled, repaired or disassembled.

According to an embodiment of the invention, the rotor of the generator is made up of a plurality of arc-shaped rotor sections, each rotor section having a one or more magnets affixed to its surface. Said rotor sections are attached by arc-shaped rotor supports, wherein the detachable junctions between adjacent arc-shaped sections are located substantially at positions on the circumference at an outer radius in relation to the center axis of the generator. The radial positions are substantially the same to allow for power generation. The arc-shaped rotor supports and the rotor elements built as a completely assembled generator can have a substantially open-centered disk-shaped configuration, preferably with a truss-shaped supporting structure. The support structure can be attached to a center shaft or to the rim of a fixed support structure that sits at the largest diameter of the generator and that is attached to another stationary support structure inside the turbine nacelle. The rotor as a whole also comprises a plurality of single manageable elements and segments which are typically attached to each other in a detachable way. The connections between the arc-shaped supporting elements of the rotor and the rotor elements are preferably non-destructively detachable. As a consequence, the transport of the generator is simplified. The rotor, along with the stator, can be transported in parts wherein each part has lesser dimensions and a lower weight than a fully-assembled generator. In particular, the dimensions of an arc-shaped rotor support, along with the stator and rotor elements, is preferably significantly smaller than the diameter of the completely assembled generator.

In an embodiment of the invention, the junctions of the stator sections and the junctions of the rotor sections are located substantially at the same circumferential position in relation to the center axis of the generator, which is advantageous for assembly and disassembly of the generator.

By arcuately sectioning the stator, rotor, and support structure into at least two sections, the overall dimensions of the transported assemblies are within easily shippable sizes. According to an embodiment of the invention, each shippable section is comprised of multiple smaller stator sections and rotor sections attached to an arc-shaped supporting element such that assemblies are easily shippable and ready to assemble on site. Thereby, the arc-shaped stator, rotor, and support sections form a complete generator in a complete circular shape once assembled and connected at junctions located in at least two positions at the circumference of the generator.

According to one variation of the invention, an arc-shaped stator section may comprise a stator element for electrical generation, a supporting component to hold the stator element, and a connection component to connect the supporting component to the supporting component. Each of the stator element, supporting component, and connection component may be arc-shaped in order to facilitate connection with adjacent arc-shaped stator sections. The connection component may be arranged on the outer circumference of the supporting component. Moreover, the invention may further comprise a first joining element to connect the arc-shaped stator section to an adjacent arc-shaped stator section on a first side, and a second joining element to connect the arc-shaped stator element to an adjacent arc-shaped stator element on a second side.

In another embodiment, the present invention further describes an arc-shaped rotor section that may be used in conjunction with, or separately from a sectioned stator. The arc-shaped rotor section may comprise a rotor element for electrical generation, a supporting component for holding and supporting the rotor element, a connection component to connect the supporting component to a rotor element. The rotor element, supporting component, and connection component may all be arc-shaped in order to facilitate connection with adjacent arc-shaped rotor sections. In one embodiment, the rotor elements may extend radially outward from the connection component and supporting component. In another embodiment, the rotor elements may extend radially inward, such that the rotor elements are free floating on the side that is radially inward.

In an embodiment of the invention, each rotor element is at least partially arranged axially on either side of a stator element. It is also possible that two or more rotor elements are at least partially arranged in axial stacks, wherein the axial stack if formed by alternating stator elements and rotor elements. Thereby the stator elements and the rotor elements for power generation are arranged oppositely to each other with an intermediate air gap. For example, a stator section and two rotor sections can be assembled to form one rotor/stator/rotor unit. Likewise, a stator element and two rotor elements can be assembled to form one rotor/stator/rotor unit. As additional stators (and/or stator components) and rotors (and/or rotor components) are combined, they could follow the same basic pattern. Alternative patterns, such as rotor/stator/rotor/rotor/stator/rotor or rotor/stator/stator/rotor could also be used.

In a further development of the invention, a stator section and rotor section(s) are able to be at least temporarily supported against each other. Preferably each stator section comprises a first supporting removable shim and each rotor section comprises a second supporting removable shim, wherein the first supporting removable shim of a first stator section and the second supporting removable shim of a corresponding first rotor section are able to be at least temporarily supported against each other. Preferably each stator section connection element of a stator section comprises at least one first supporting removable shim and each rotor connection element of an arc-shaped rotor section comprises at least one second supporting removable shim. By means of the supporting removable shim, a rotor section is able to rest on a stator section when the generator and the sections are transported, assembled or disassembled. Through the use of shims, an air gap remains between the stator elements and the rotor elements. As a consequence the transport, assembly and disassembly are simplified.

According to another embodiment of the invention, a stator section comprises at least one stator element made from a multi-layered printed circuit board, as defined in patent application number PCT/US2010/000112 as a stator segment. And a rotor section comprises at least one, but typically a plurality, of permanent magnet(s) and associated back iron as a rotor element(s). In order to avoid confusion with the terminology in PCT/US2010/000112, which is incorporated herein by reference, the present application uses the term "stator sections" to refer to arc-shaped portions of a stator structure. A stator section comprises a stator support, at least one stator element for electrical generation (which may be a printed circuit board stator segment as described in PCT/US2010/000112), and other stator components.

In an embodiment of the invention, the stator sections, the arc-shaped stator supports, the rotor sections, and the arc-shaped rotor supports comprise circumferential structures which allow for axial mounting of the stator elements and supporting elements. Thereby the circumferential axial flanges preferably extend substantially in the directions of the axial flux and preferably extend substantially axially in relation to the center axis of the main shaft. In this way the stator and rotor sections can be comparatively simply attached to the respective arc-shaped supporting elements.

In another exemplary embodiment, the present invention incorporates a sectioned easily shippable support structure to which a number of detachable, multi-layered, printed circuit board stator segments and an associated set of detachable rotor sections. Preferably, the rotor sections, to which permanent magnets are affixed, are axially positioned on each side of the stator elements (in this case, multi-layered, printed circuit board stator segments) at a specified axial gap, which is maintained by a gap control means during operation after the generator is assembled and installed into the turbine. The shippable support structure and associated stator and rotor components are designed to be easily assembled on the site of turbine erection to form a complete operating generator. One embodiment of the generator is approximately eight meters in diameter as a complete assembly, but is transported in quadrants that are no greater than four meters in the vertical dimension, thus allowing transportability.

In another embodiment, the invention consists of maintaining a clearance between the rotating and stationary parts of rotating electromagnetic machines, such as a direct drive generator, by purposely making one of the rotating or the stationary parts structurally "soft" or compliant, and the other relatively stiff, then providing a device or mechanism to establish and always maintain the minimum clearance desired by transmitting a force in a suitable direction from the stiff member as it encroaches on the desired minimum clearance, to the "soft" member, thereby pushing the soft member away to maintain the desired clearance. Some of the approaches for establishing and maintaining the minimum clearance distance between the moving rotor to the stator support structure involve either mechanical (i.e., contacting) devices (e.g., rollers or low coefficient-of-friction pads), pneumatic devices, magnetic devices, electromagnetic devices, or combinations thereof. In order for a magnetic or electromagnetic device to be used to maintain the clearance and get around the physics that precludes such a scheme from working on conventional machines, the stator should not contain ferromagnetic materials. Such stators are known in the industry as "air core" stators because the volume of the stator responds to magnetic fields in the same way as air responds.

As previously stated, the above-described embodiments and implementations are for illustration purposes only. Numerous other embodiments, implementations, and details of the invention are easily recognized by those of skill in the art from the following description.

BRIEF DESCRIPTION OF THE DRAWINGS

Various objects and advantages and a more complete understanding of the present invention are apparent and more readily appreciated by reference to the following Detailed Description when taken in conjunction with the accompanying Drawings wherein:

FIGS. 2-8 depict the direct drive generator in conjunction with a wind turbine;

FIGS. 16-19 illustrate aspects of a rotor element used for power generation consistent with the present invention;

FIG. 31 illustrates an air gap control system using an air bearing consistent with an embodiment of the present invention;

DETAILED DESCRIPTION

In the following detailed description, and in the attached drawings, the present invention is described relative to a wind turbine. This is for description only and is not intended to limit the scope or use of the present invention. The present invention provides a generator, and components thereof, wherein the transport of the generator, the construction of the generator, and/or the repair of the generator is simplified.

While it is a further object of the invention to incorporate the described generator into a wind turbine, the present invention is not limited to wind turbines.

Referring first to FIGS. 2-8, depicted are various external views of a direct drive generator 1000 consistent with an embodiment of the present invention. A generator (housing) 1100 is shown attached to a hub 1200, wherein the hub 1200 is configured to hold blades for a wind turbine. The hub 1200 attaches to the generator (housing) 1100 by a rotor hub casting 1210. On the other side, the generator (housing) 1100 is attached to a main bearing support casting 1300. Within the nacelle 1400, a tower attach casting 1500 is configured to attach to a turbine tower (not shown) or other infrastructure support. The diameter and width of the generator (housing) 1100 will vary based on design considerations, including transportation, construction and operational concerns.

The size limit for the largest component in direct drive generators depends upon several economic factors—including the transportation cost. Consider a rotor as an example. A one-piece rotor will often be produced in a large steel casting facility. While these facilities often produce very large components for industries such as ship building, the casting facility for these industries is often on-site or nearby so there isn't added cost or complexity for transporting the castings. For other industries, however, such as the wind turbine industry, the steel casting facility is typically not on-site or nearby. Accordingly, the generator and/or the generator components will have to be transported from the production facility to the assembly plant and from the assembly plant to the wind farm. Thus, in certain industries the transportability of the components and the cost of transportation become important factors.

In the United States, an approximate limit on height is around 4.2 to 4.9 meters due to the need to fit under highway overpasses and bridges. When the finished generator size is greater than the size that can be trucked across the country, the generator needs to be designed for segmentation and assembly on-site. Moreover, because certain pieces, such as the stator, rotor(s), and housing have very large diameters, it is likely that these components will also need to be produced in pieces or sections. The pieces can then be assembled on-site, or assembled into subassemblies where the subassemblies are shipped to the installation location and the final generator assembly is completed on-site.

Figure 1:
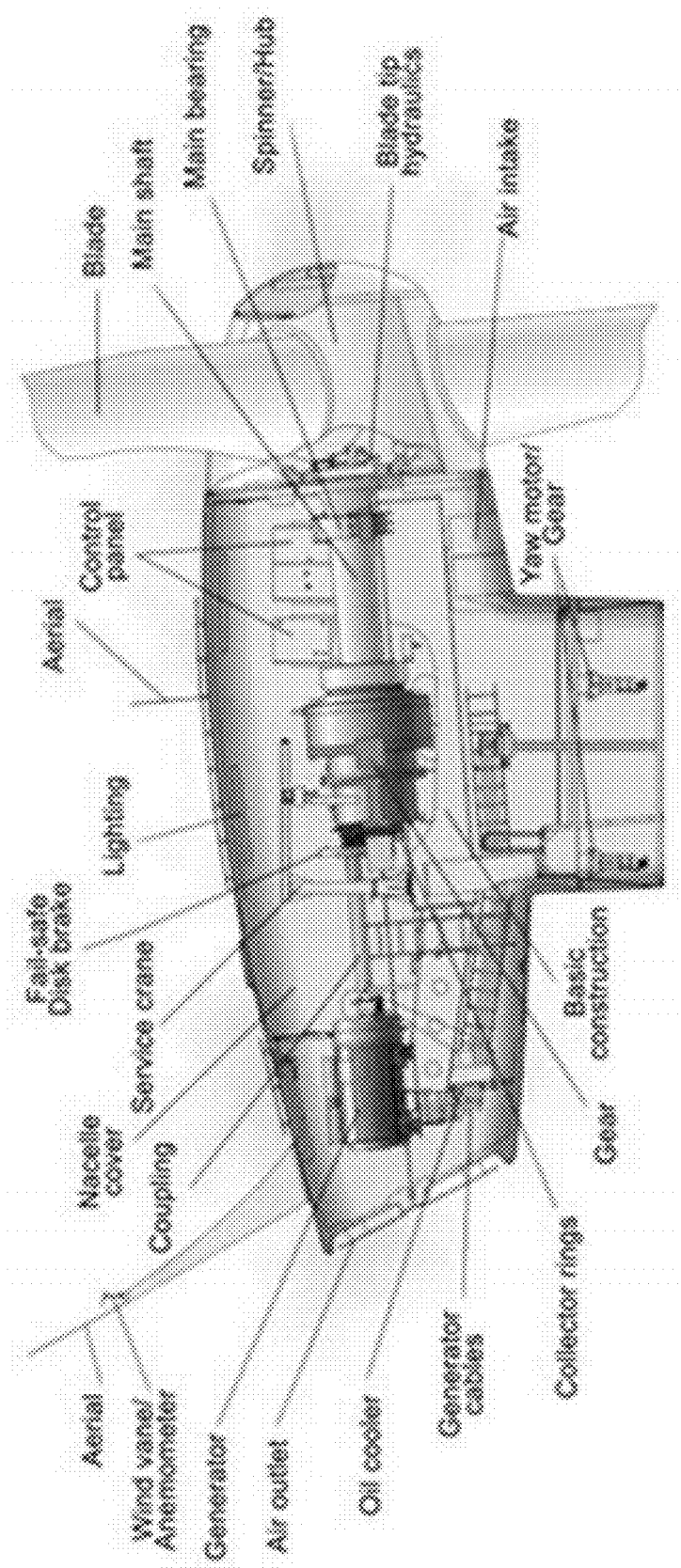
FIG. 1 depicts a geared drivetrain design for a wind turbine.
Figure 2:
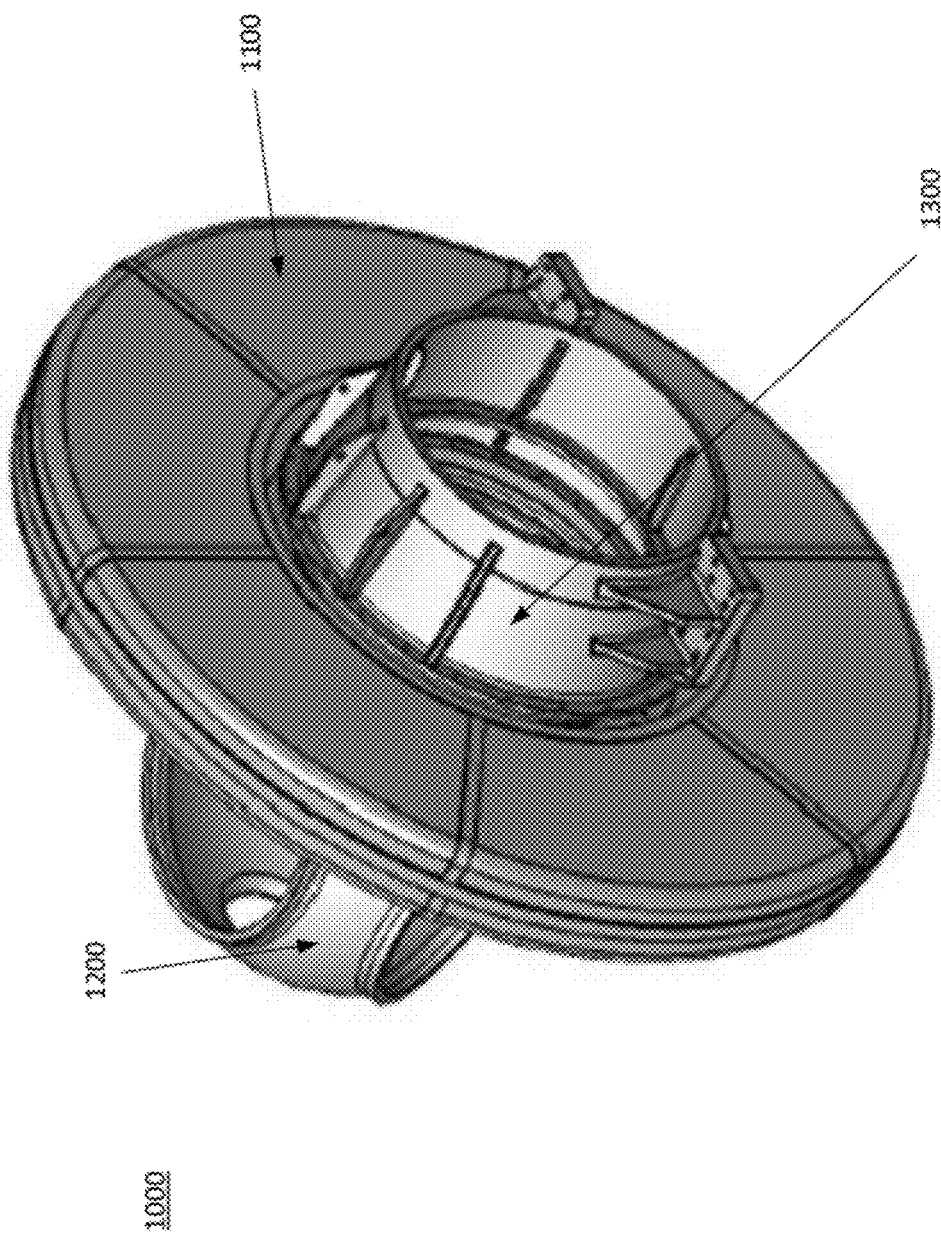
FIGS. 2-8 depict various views of a direct drive generator consistent with the present invention. Without intent to limit the present invention
Figure 3:
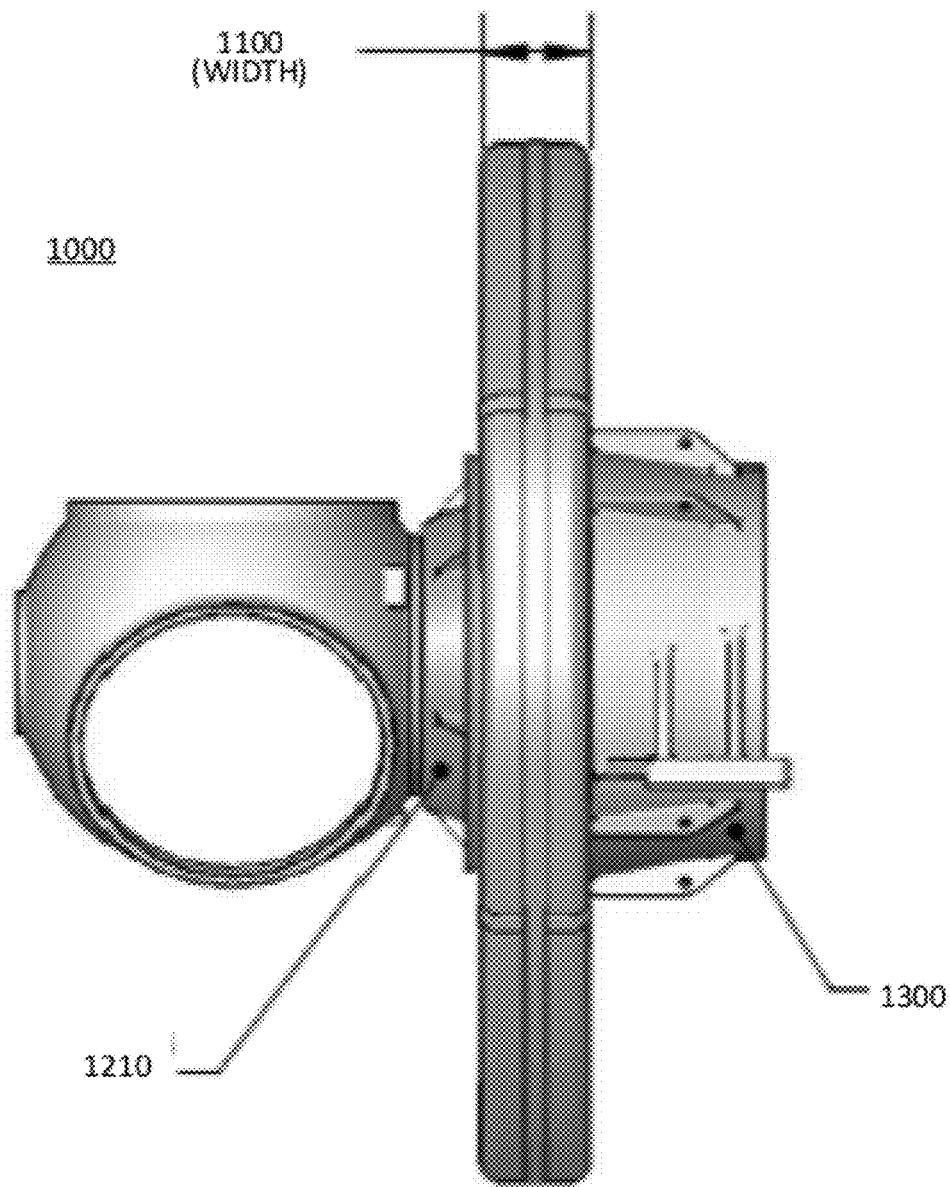
Figure 4:
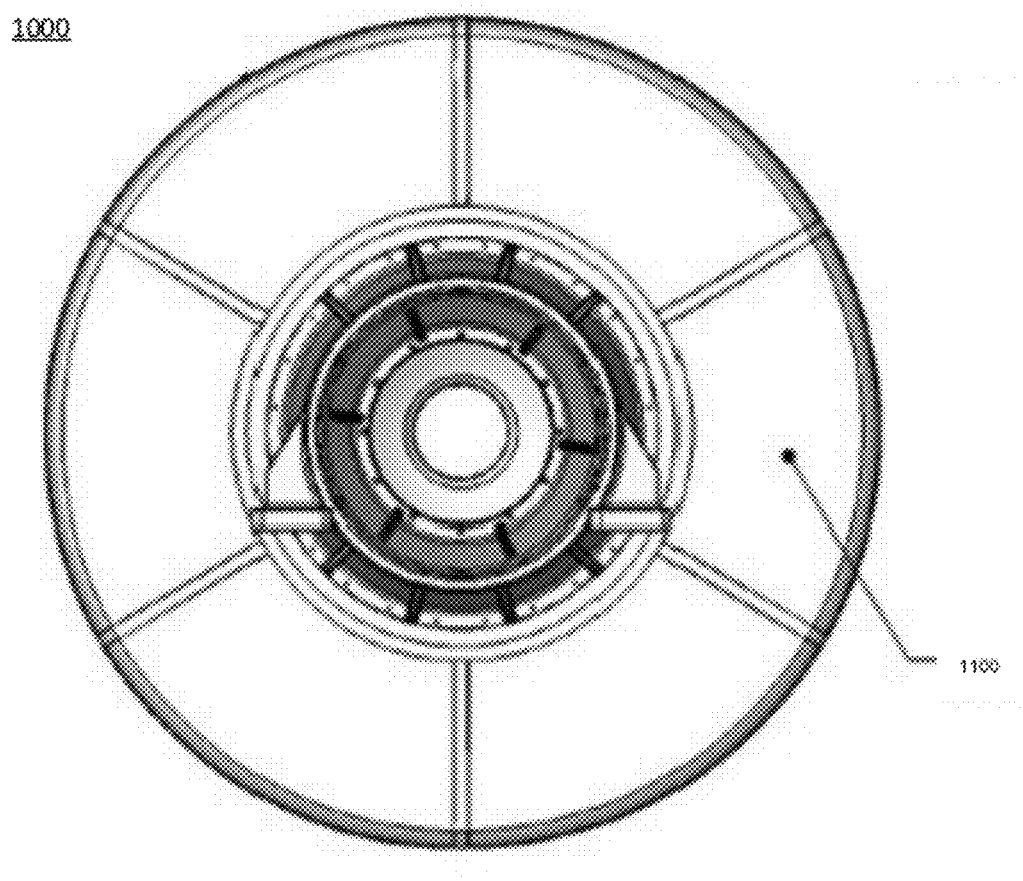
Figure 5:
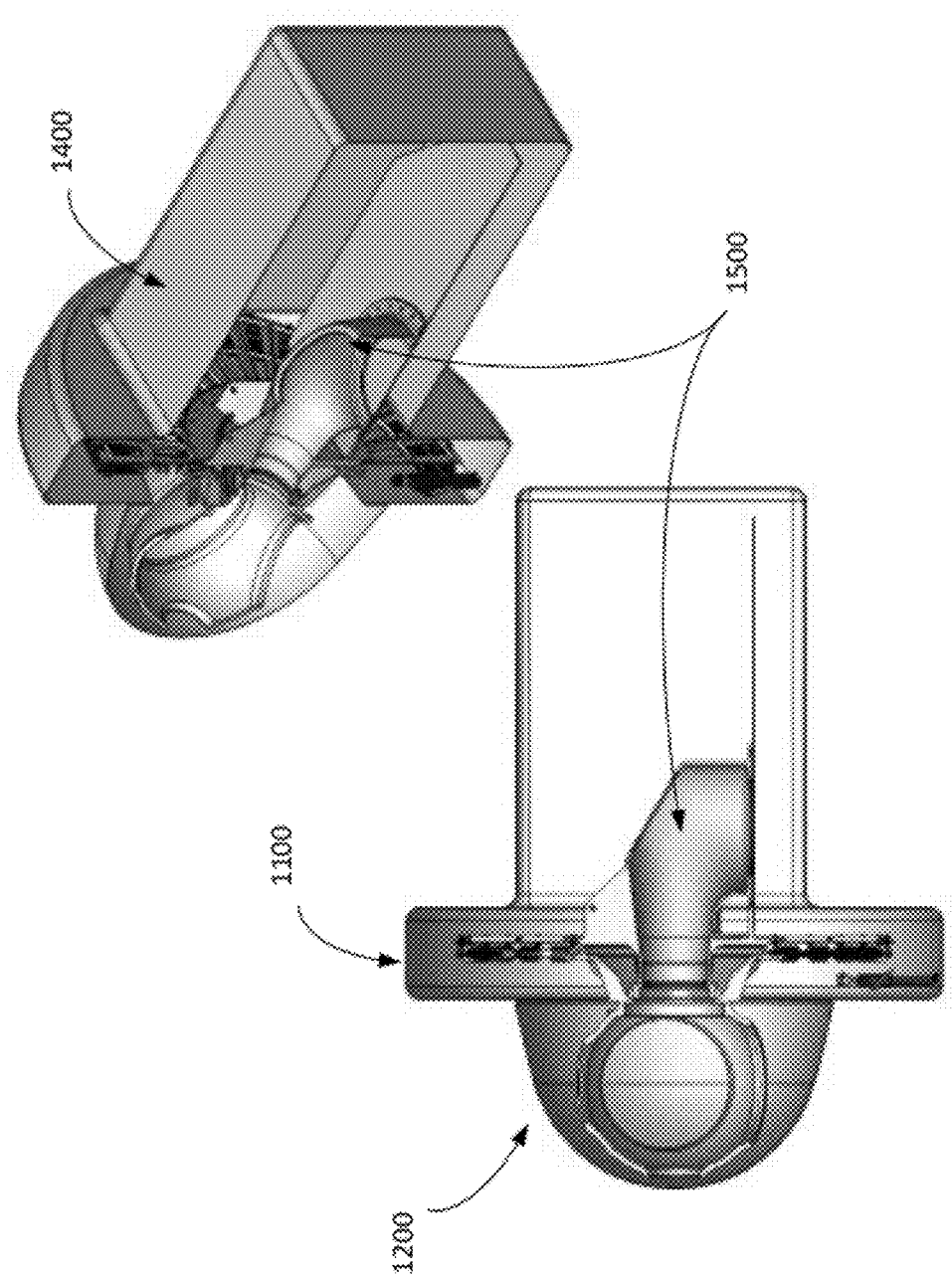
Figure 6:
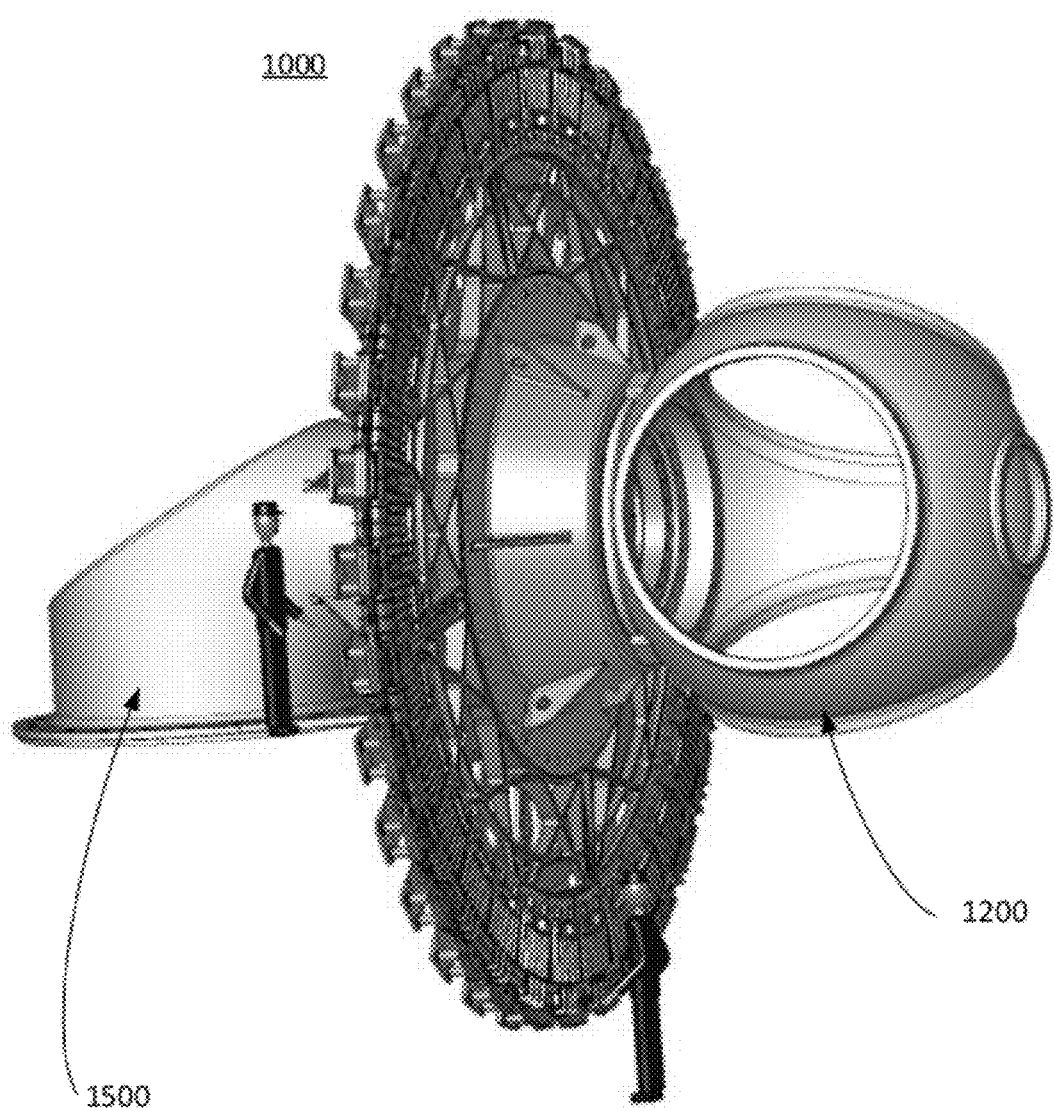
Figure 7:
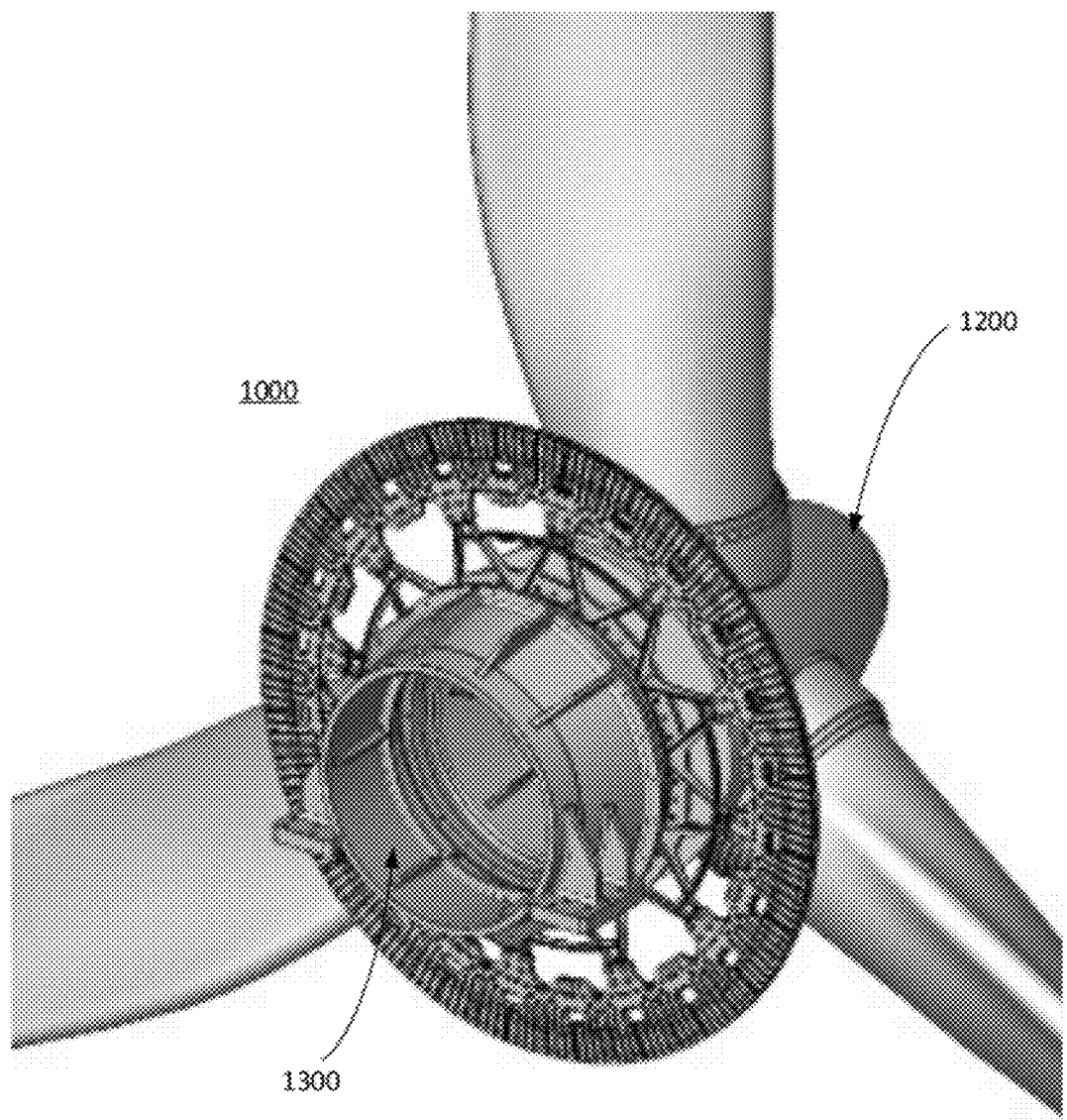
Figure 8:
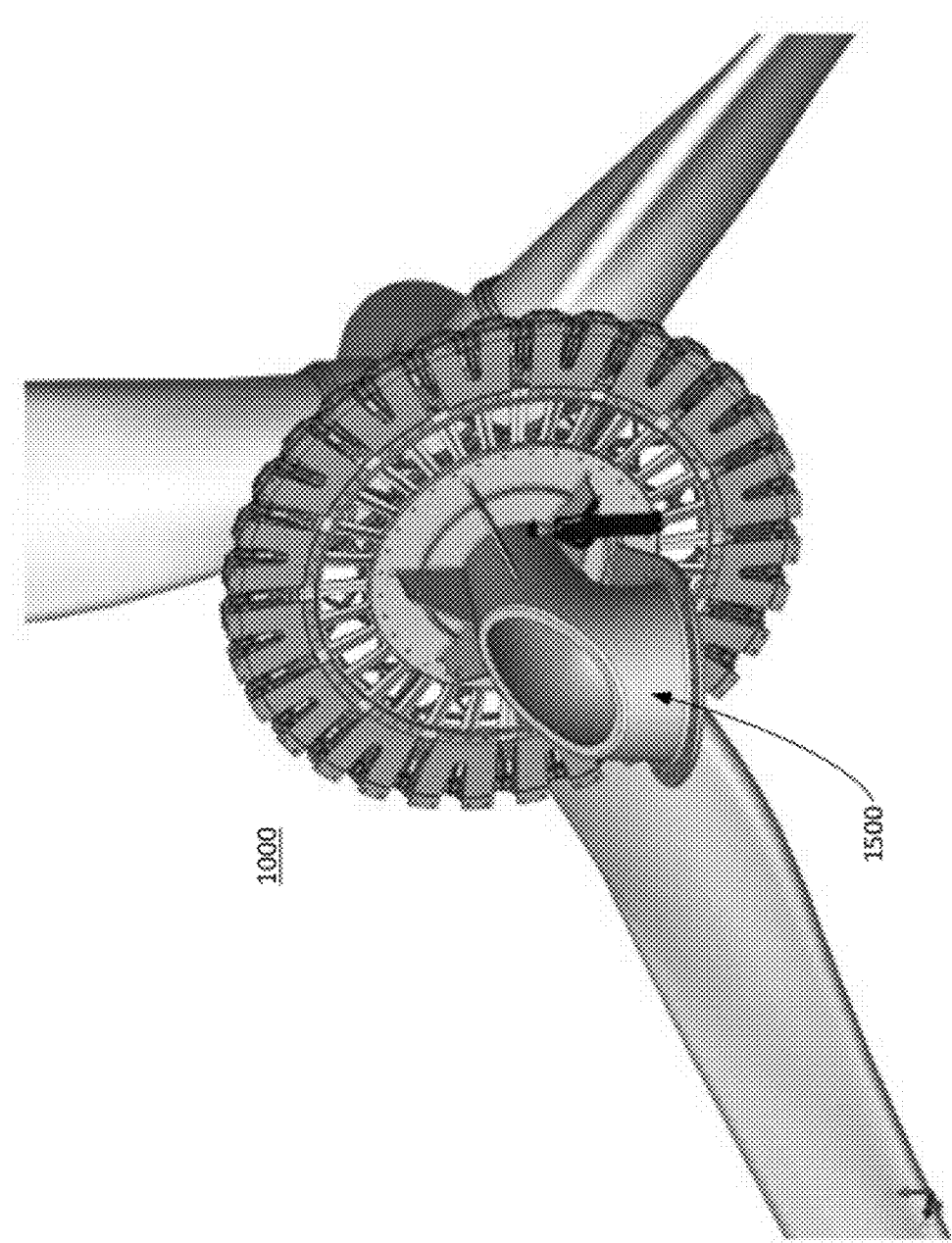

For purposes of illustration and example, the direct drive generators 2000 in FIGS. 5, 6 and 8 have an approximate diameter of 8.7 meters—which is over the trucking limit for the United States. In this example, for the low speed and high torque of a wind turbine, a direct drive generator 2000 preferably has a large diameter. However, it would be prohibitively expensive (and maybe impossible in some cases) to transport the fully assembled generator from the assembly plant to the wind farm. Similarly, transportation of a one-piece stator, one-piece rotor, one-piece support structure or one-piece housing would also be prohibitively expensive.

Accordingly, one embodiment of the present invention is a direct drive generator with segmented or sectioned components, including a sectioned stator and/or a sectioned rotor, to reduce the height dimension for purposes of transportation. In addition, the reduced size of the each component provides for reduced weight during lifting and assembly. The present disclosure describes use of a sectioned stator and/or a sectioned rotor for an axial flux motor or generator, allowing the stator and/or rotor portions of the generator to be produced in smaller pieces. The smaller size makes them less costly to transport and also facilitates any machining of the stator and/or rotor sections that may be required. The sectioned stator and rotor allow for partial assembly of the stator and/or rotor in the assembly plant. The stator and/or rotor subassemblies may then be transported to their final destination (e.g., the wind farm) for final assembly on-site during installation.

Figure 9:
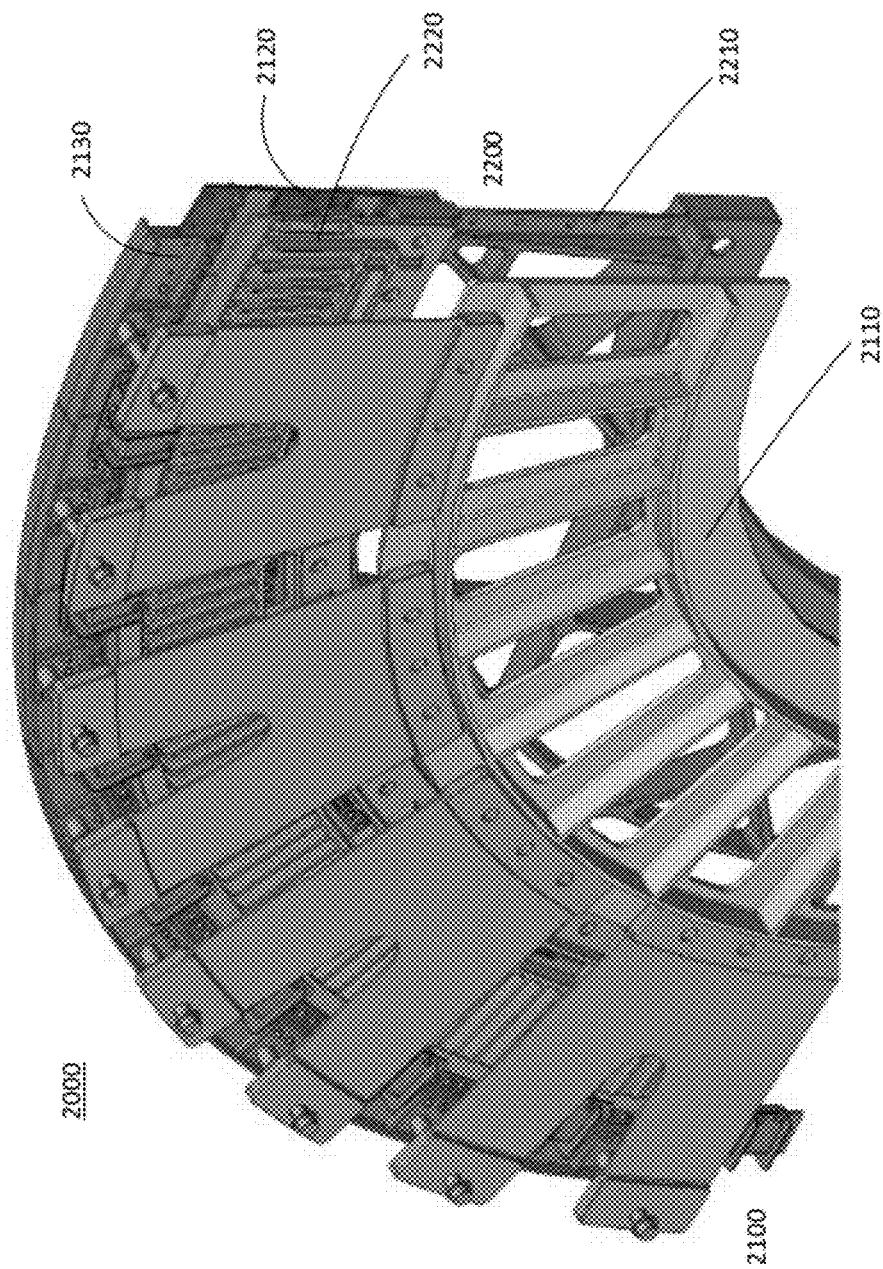
FIG. 9 illustrates an embodiment of an assembly for a direct drive generator consistent with one embodiment of the present invention

FIG. 9 illustrates an embodiment of an assembly 2000 for a direct drive generator consistent with one embodiment of the present invention. In this embodiment, the assembly comprises an arc-shaped stator section 2100 and an arc-shaped rotor section 2200. The arc-shaped stator section 2100 includes a stator support 2110 for connecting to and supporting the stator element(s) 2120. In FIG. 9, the stator element(s) 2120 is shown to extend radially inward from the stator support 2110. The stator element 2120 extends radially inward between two rotor elements 2220 (the second rotor element is not shown in FIG. 9) which extend radially outward from the rotor support 2210. In order to provide improved ease of use and operation, the stator section 2100 may comprise a stator support connector 2130 that connects to the stator element(s) 2120. Likewise, the rotor section 2200 may comprise a rotor support connector 2230 to connect to the rotor element(s) 2220 to the rotor support 2210.

Figure 10:
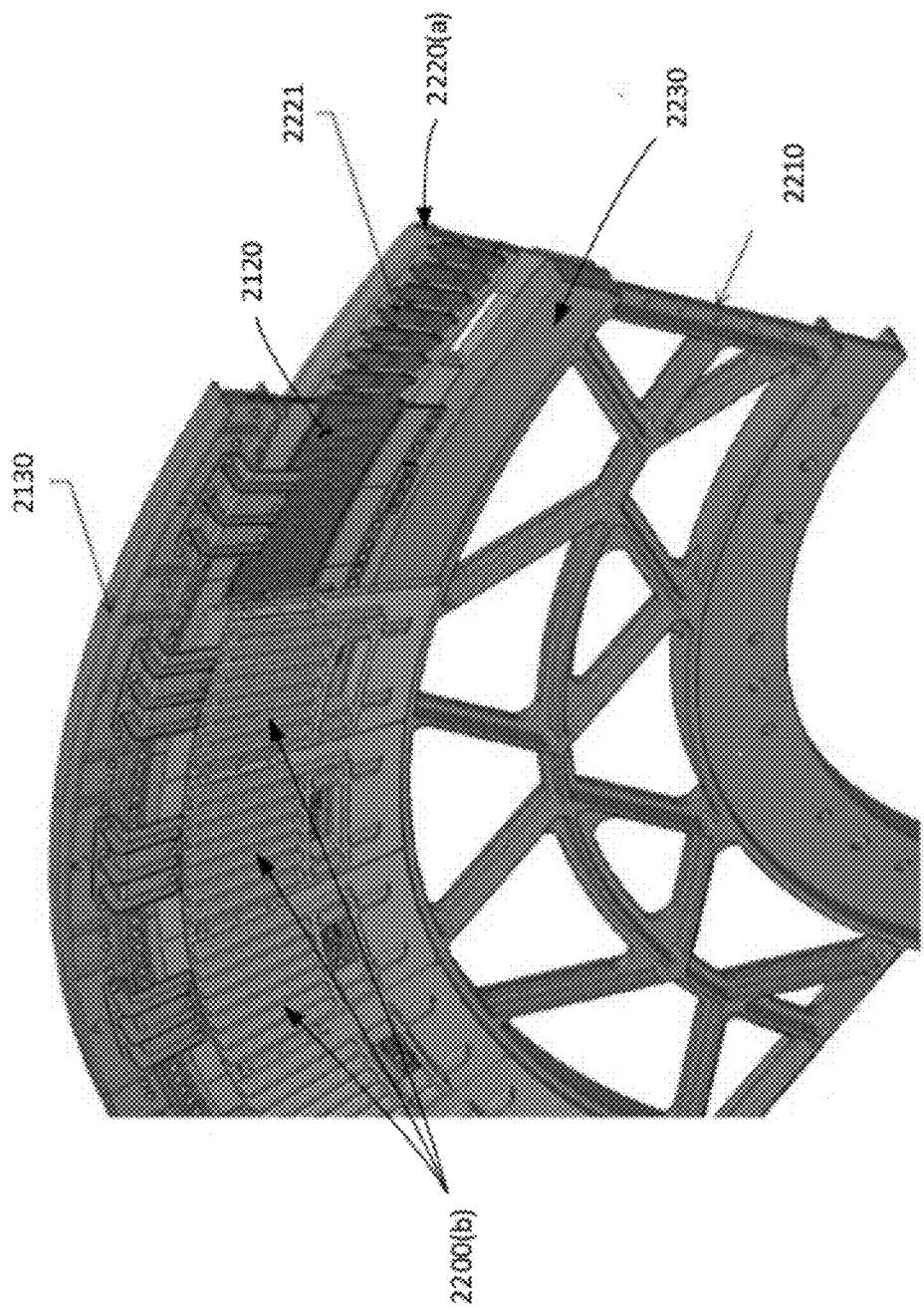
FIGS. 10-12 illustrate various views of a rotor section consistent with the present invention

FIG. 10 illustrates a rotor section 2200 consistent with the one in FIG. 9, as well as a stator element 2120 positioned between two rotor elements 2220 for electric power generation. The rotor elements 2220 may comprise a first rotor element 2220(a) on one side of the stator element 2120 and an opposing rotor element 2220(b) on the other side of the stator element 2120. This can help generate an axial-flux during relative movement of the rotor elements 2220 to the stator element(s) 2120. The rotor elements 2220 in this embodiment are connected to the rotor connector 2230, which is connected to the rotor support 2210. As shown, in one embodiment the rotor elements 2220 can include magnets 2221 and magnet carriers 2222, which are configured for connection with a rotor support 2210, wherein the rotor support provides a mechanical connection from the rotor elements 2220 to the main bearing (and from the main bearing to the turbine hub, and from the turbine hub to the turbine blades). In one embodiment, a large diameter bearing arrangement with a stationary race may be used to attach the rotor support (frame) 2210 and the turbine hub. The bearing arrangement may comprise an attachment to the stationary main support casting and a rotating flange portion that attaches to the rotor frame (support) structure. Not shown in FIG. 10 is the stator support for holding the stator element(s) 2120 at the outer diameter.

Figure 11:
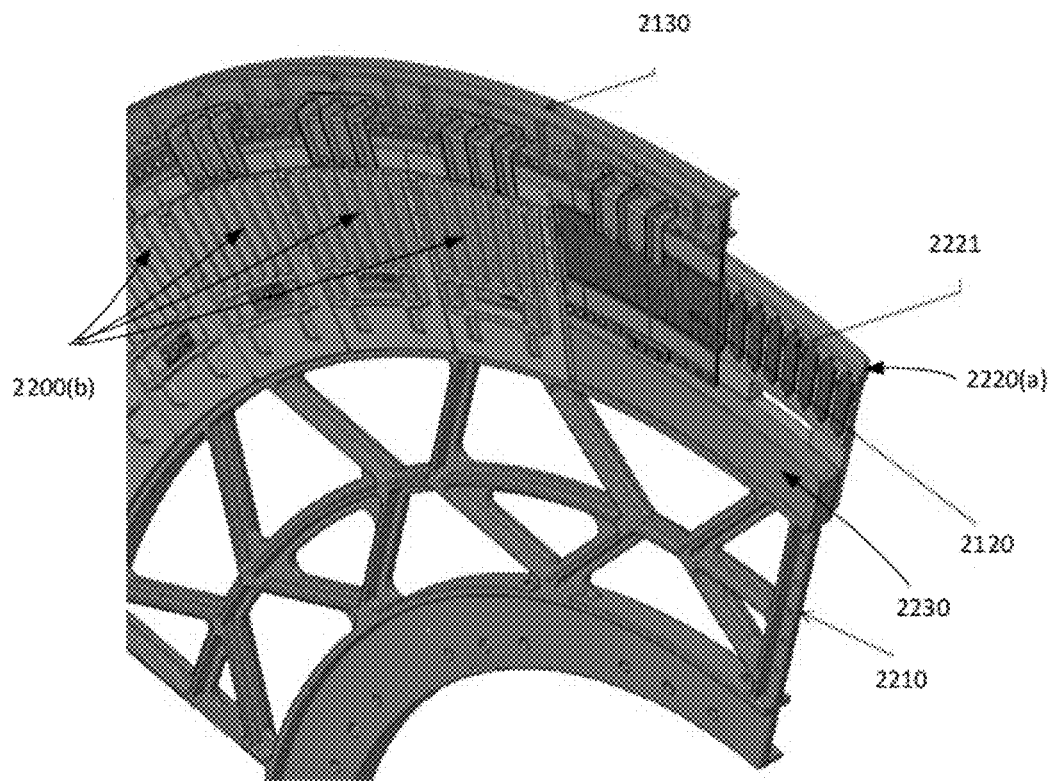
Figure 12:
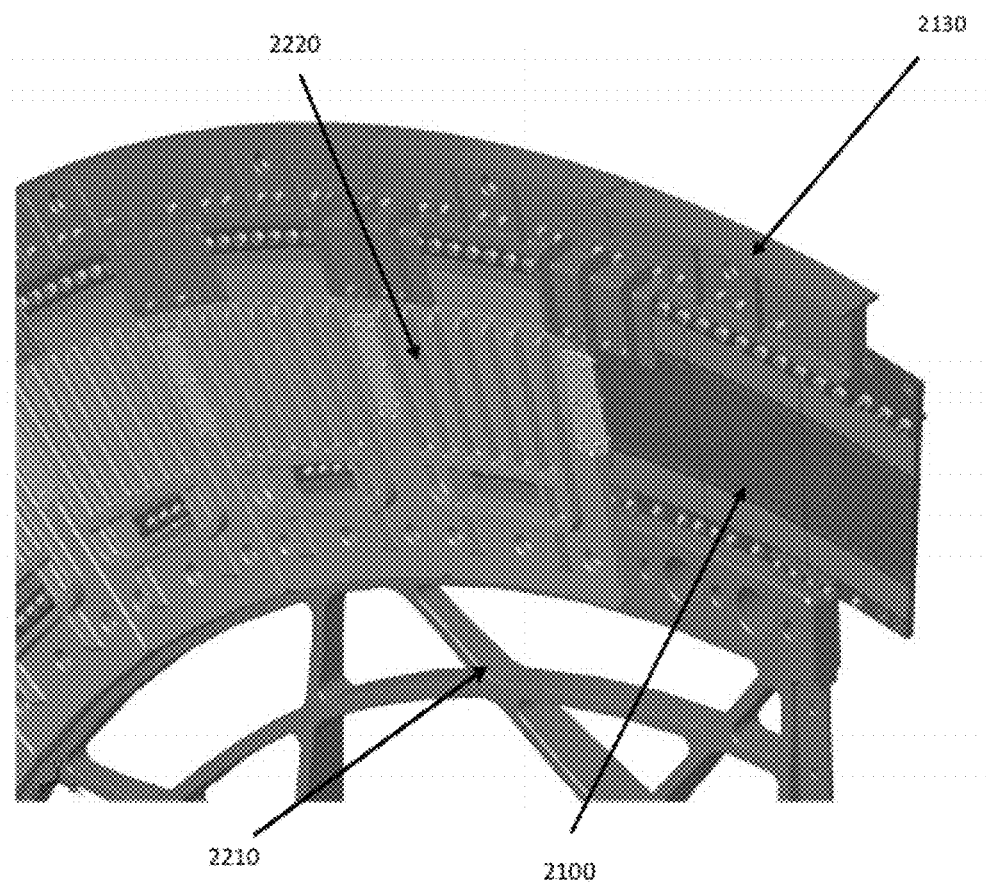

FIGS. 11-12 shows further views of the stator element(s) 2120 and rotor element(s) 2220. As described in application PCT/US2010/000112, a segmented printed circuit board (PCB) stator may be used as, or as part of, the stator element(s) in the present invention. The PCT/US2010/000112 patent application is incorporated fully with the present disclosure. The PCB stator may be segmented such that numerous PCB stator segments are attached to a single stator section 2100.

Figure 13:
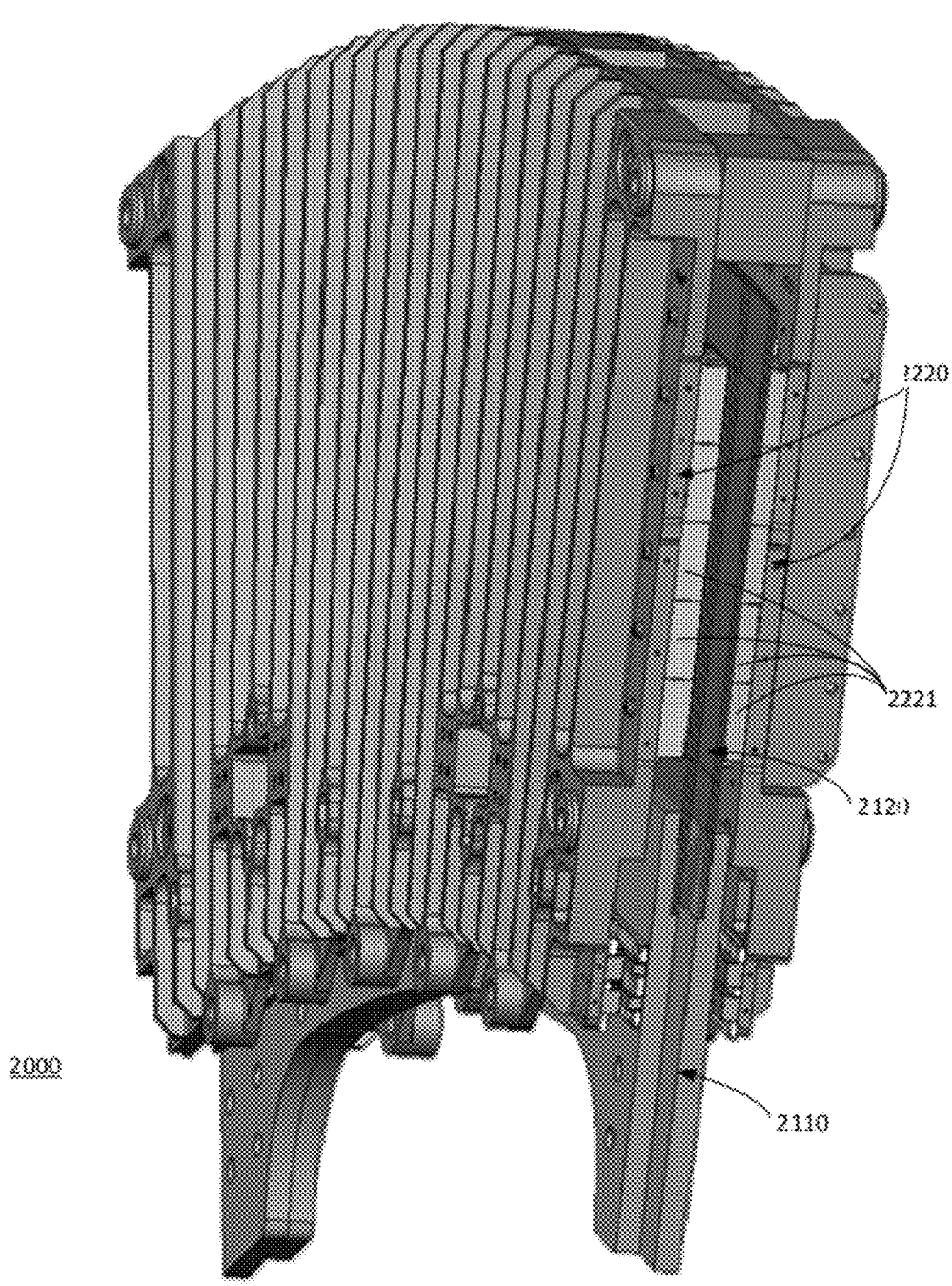
FIG. 13 illustrates an embodiment of an assembly for a direct drive generator consistent with one embodiment of the present invention
Figure 14:
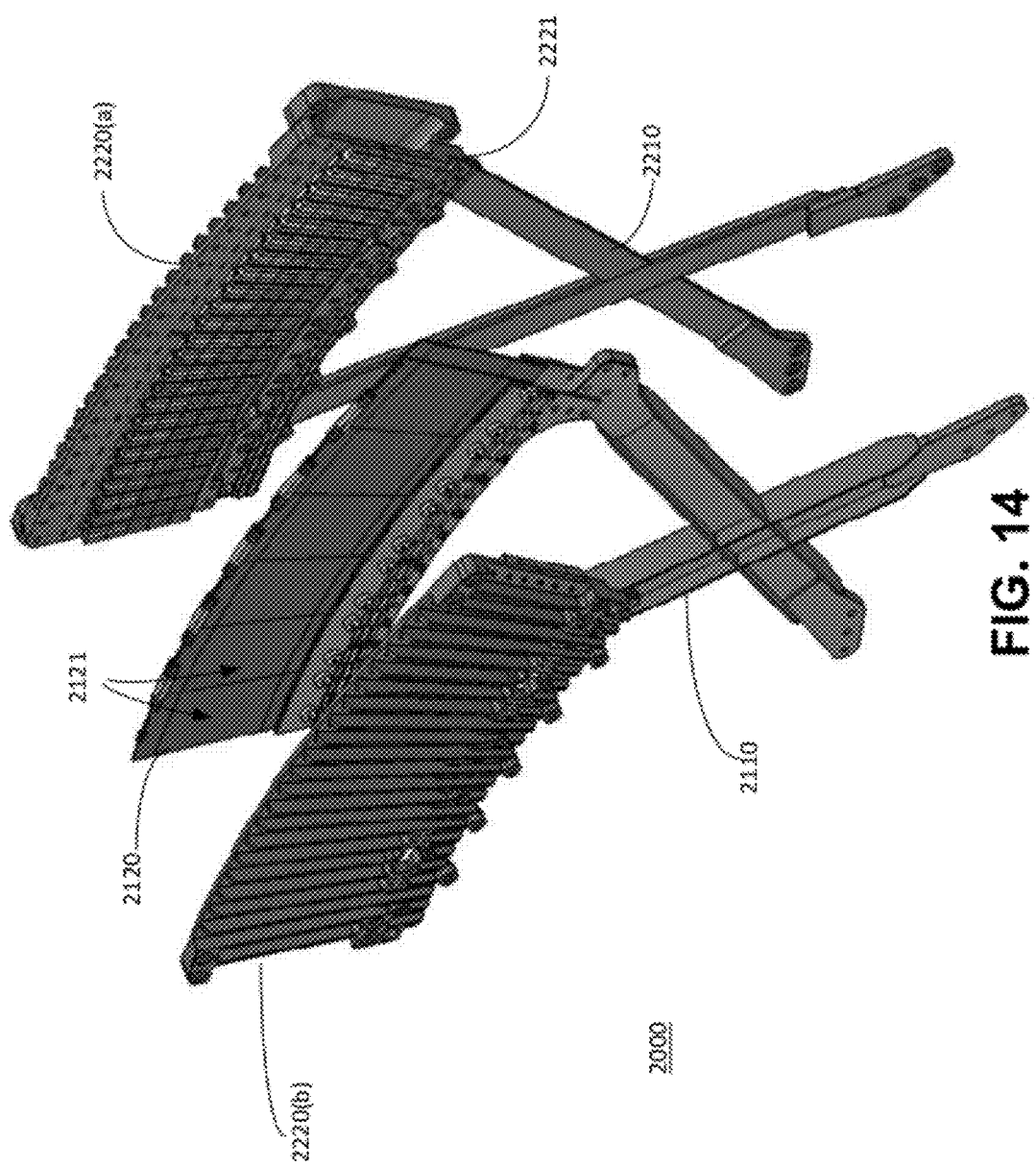
FIG. 14 illustrates an exploded view of an assembly for a direct drive generator consistent with one embodiment of the present invention
Figure 15:
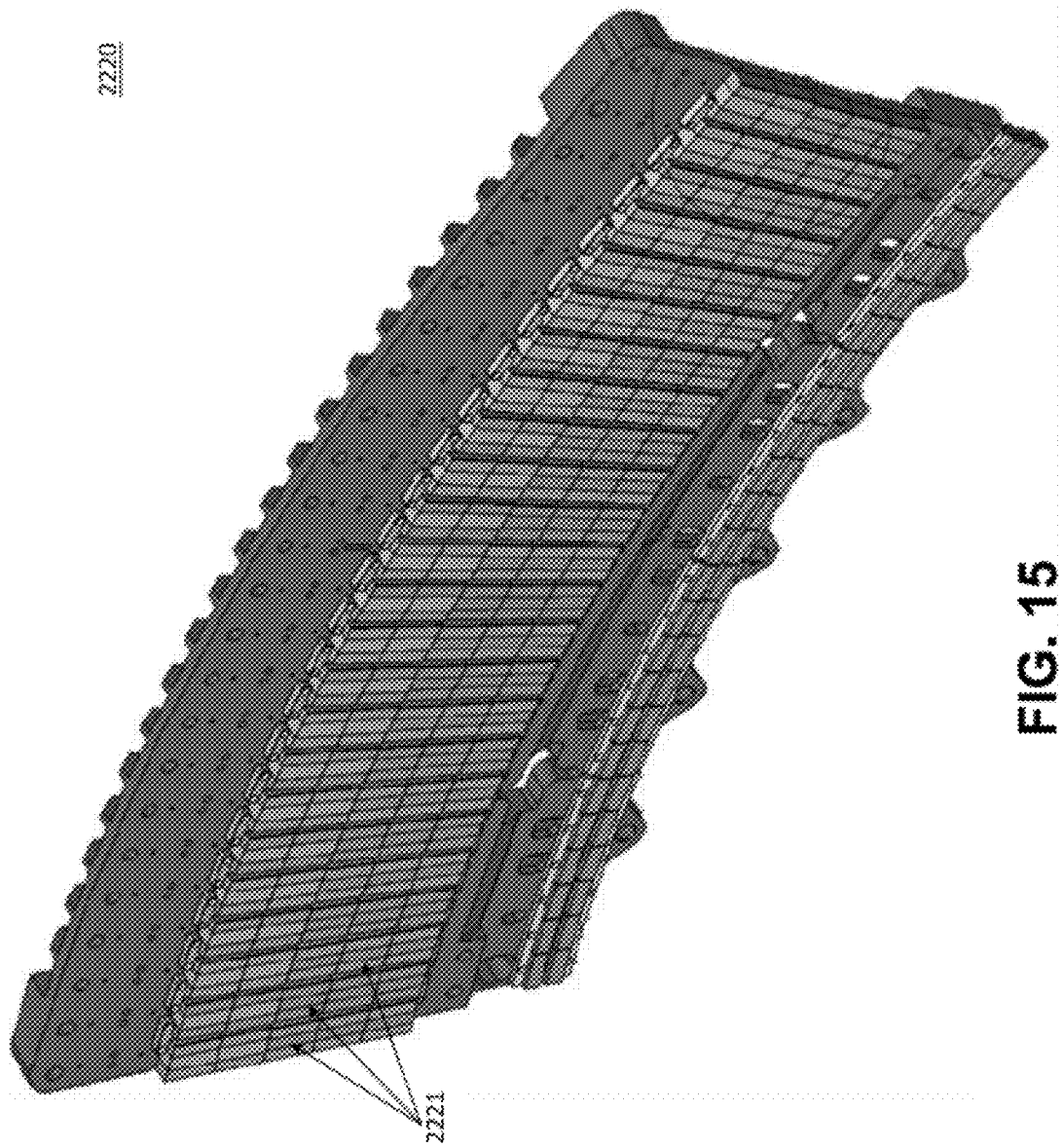
FIG. 15 illustrates a rotor section consistent with the assembly in FIGS. 13 and 14

In another embodiment, as shown in FIGS. 13-15, the stator element(s) 2120 may extend radially outward from a stator support 2110; and the rotor element(s) 2220 may extend radially inward from a rotor support 2210. Starting with FIG. 13 it shows a side view of an assembly consistent with the present invention, wherein the stator element 2100 extends radially outward between two rotor elements 2200. In this example, the stator element 2100 comprises a PCB stator and the rotor element comprises rotor magnets 2221. FIG. 14 shows an exploded view of the assembly from FIG. 12. FIG. 14 illustrates the stator support 2110 connected to the stator element 2120. In addition, the rotor support 2210 are shown connected to the rotor elements 2220. As shown, the stator support is connected to a first rotor element 2220(a) on the right in FIG. 14. At the outside diameter, that structure will be connected to an opposing rotor element 2220(b). In operation, each of the first and opposing rotor elements 2220(a) and 2220(b) may comprise magnets to direct flux in the axial direction from the magnet poles on one rotor to the magnets of opposite polarity on the opposing member. The stator element 2120 in this embodiment comprises a segmented PCB stator. A section of the rotor section 2200 from FIGS. 13-14 is shown enlarged in FIG. 15. The magnets 2221 are mounted to a magnet carrier 2222.

The rotor frame structure may be a bolt-together assembly, a welded assembly, or cast pieces that are put together with the magnet carriers to make the transportable rotor sub assemblies. In one embodiment, the present invention may comprise rotor quadrants assembled and shipped to the installation site. In another embodiment, six (6) rotor segments may be used. The selection of the number of segments will depend, in part, on the maximum desired height.

Figure 16:
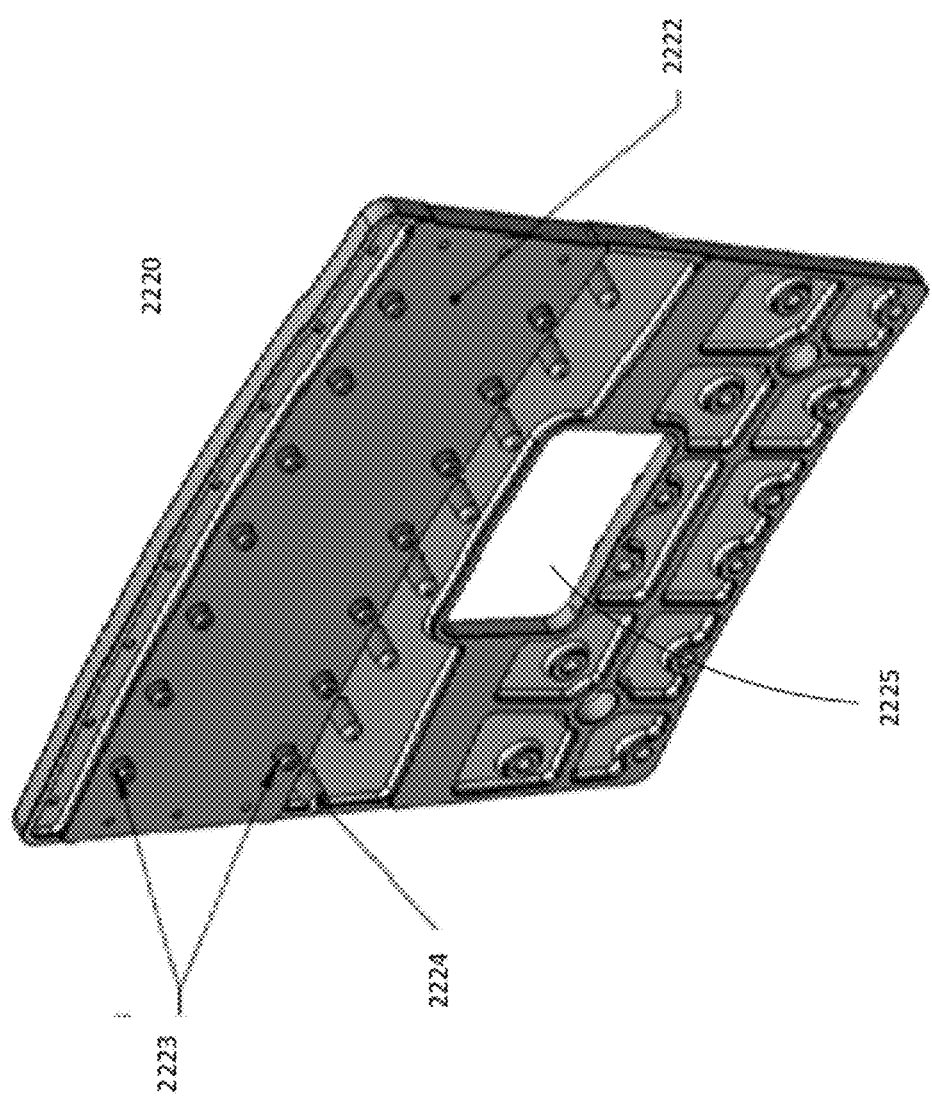

FIGS. 16-20 depict features of rotor elements 2220, including magnet carriers 2222 and magnets 2221, that may be used consistent with the present invention. Referring first to FIG. 16, illustrated is the backing of a magnet carrier 2222 consistent with embodiments of the present invention. The magnet carrier is preferably cast from alloy steel with a number of steel pins 2223 and aluminum pins 2224 that can hold a non-ferrous retainer for the magnets 2221. A number of permanent magnets are placed upon the steel carrier. The magnets 2221 can be held in position by pins or by non-ferrous retainer(s) that keep the magnets 2221 separate from each other and keep them from sliding off the carrier during rotation. The magnets 2221 are held axially to the carrier by the holding force of the permanent magnet to the steel in the carrier 2222. Also shown is an access window 2225 that can be used to provide an opening to the stator once assembled.

Figure 17:
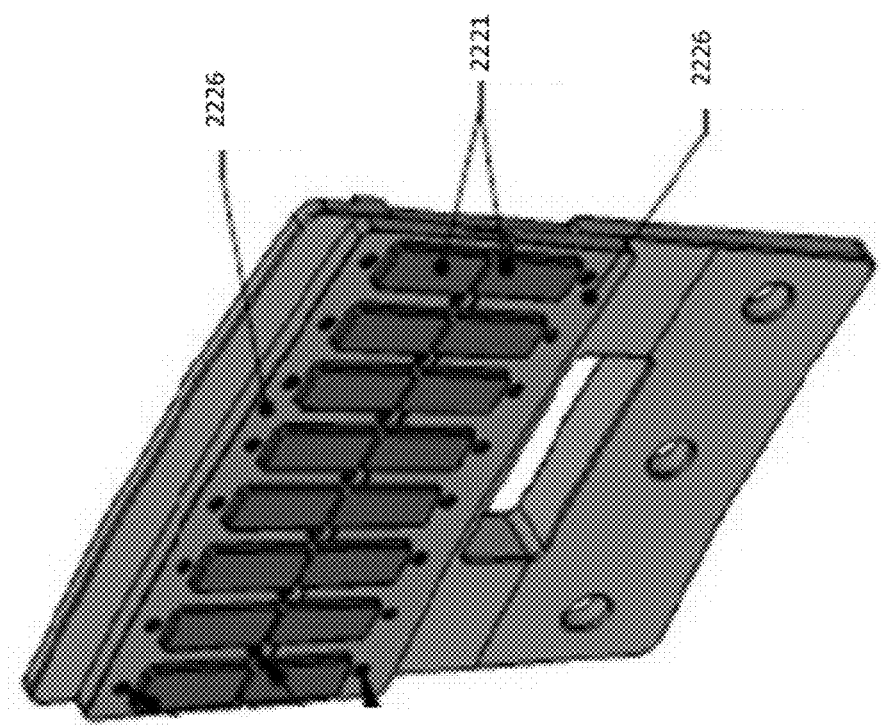

FIG. 17 shows a magnet carrier 2222 that comprises non-ferrous molded retainers 2226 that keep the magnets 2221 apart and restrain them from moving radially outward due to centrifugal force and radially inward due to gravity or shock during shipping and installation. In FIG. 17, each magnet is made up of two magnet segments. The magnets 2221 are preferably one-piece but manufacturing limitations may require that the poles be made of two or more pieces. Handling of large magnetized magnets is also not an easy task so placing a number of smaller pieces on the steel magnet carriers can make the assembly process safer and less expensive.

Figure 18:
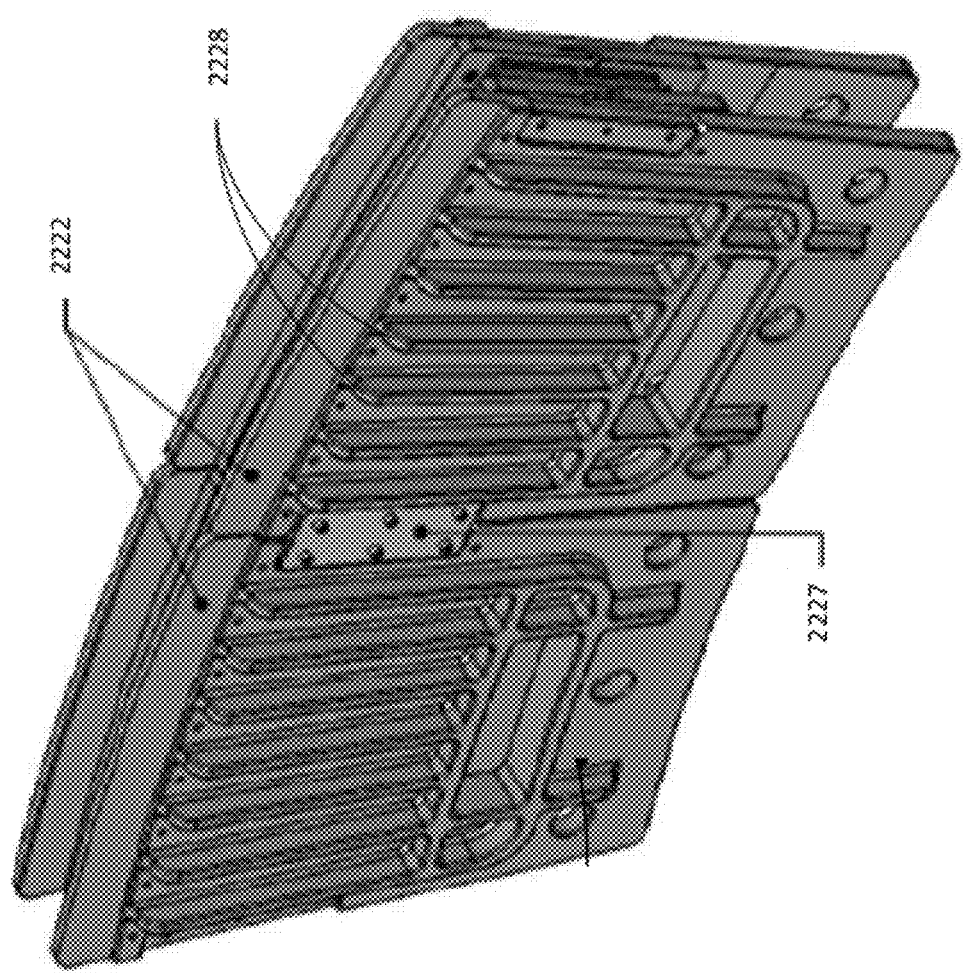

FIGS. 18-19 depicts two pairs of rotor elements 2220 that are shown in relative positions where they provide the magnetic gap for the stator (and preferably for a PCB stator). In FIG. 18 the magnet carriers 2222 comprise non-ferrous retainers 2226 as described relative to FIGS. 17 and 18. It should be noted that that the relative thickness of the magnets 2221 and the retainers 2226 should not be limited in view of the drawings. In some embodiments, the magnets 2221 are thicker than the non-ferrous magnet retainers 2226.

Figure 20:
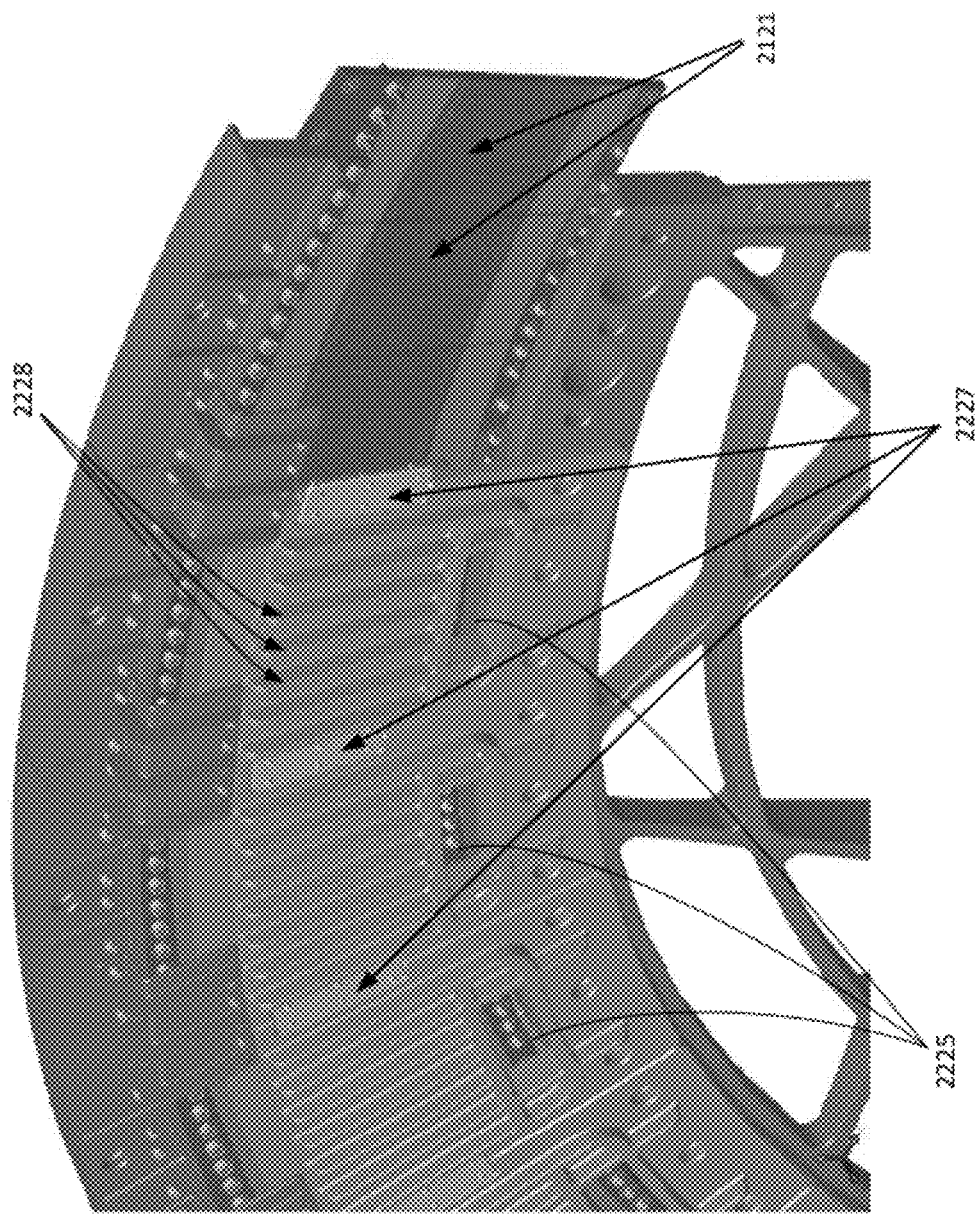
FIG. 20 illustrates a rotor section consistent with the present invention

FIG. 20 illustrates one embodiment of how the magnet carriers 2222 may be positioned in an assembly as discussed for FIGS. 9-11. In some embodiments, the magnet carriers may have splice plates 2227 that mechanically fasten the adjacent magnet carriers together and also to provide a flux path for the magnet circuit which is carried by the steel of the magnet carriers directly in contact with the permanent magnets. The drawings also show stiffening ribs 2228 on the back of the magnet carriers and an access window 2225 for maintenance of components on the stators.

Figure 21:
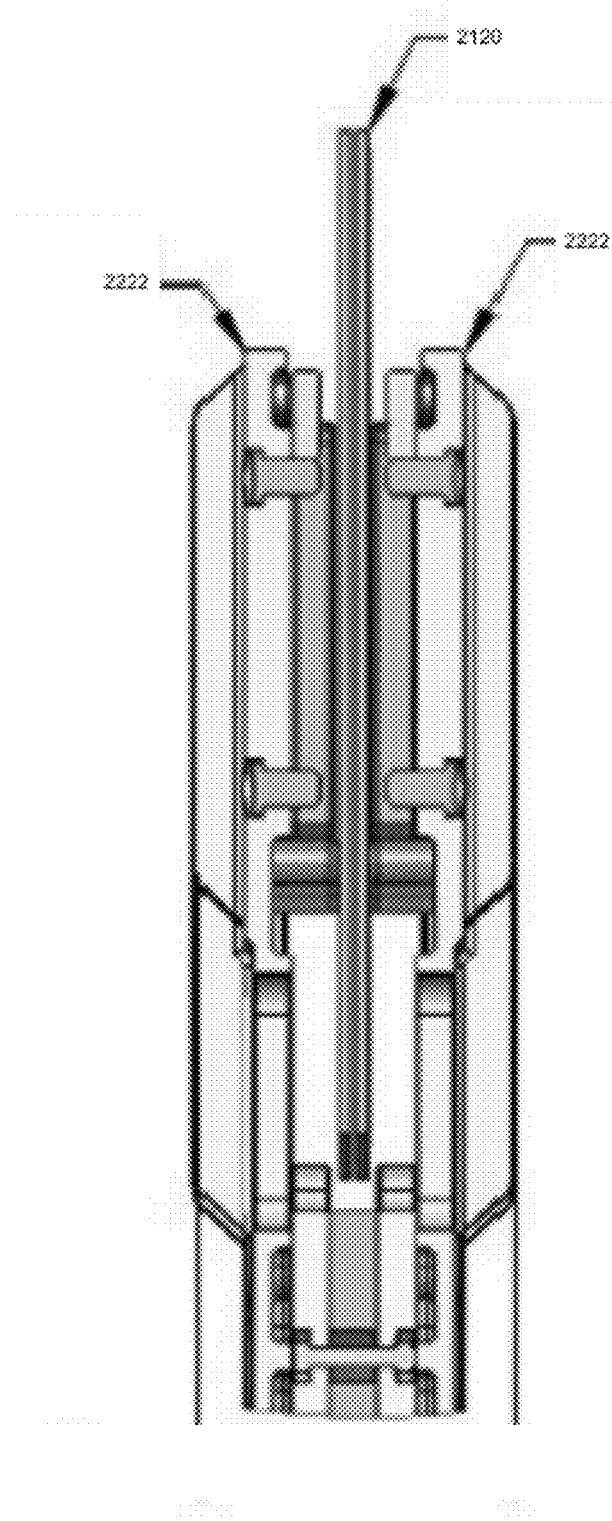
FIG. 21 shows a side view of a stator element in position between the magnet carriers of two rotor elements consistent with an embodiment of the present invention.
Figure 22:
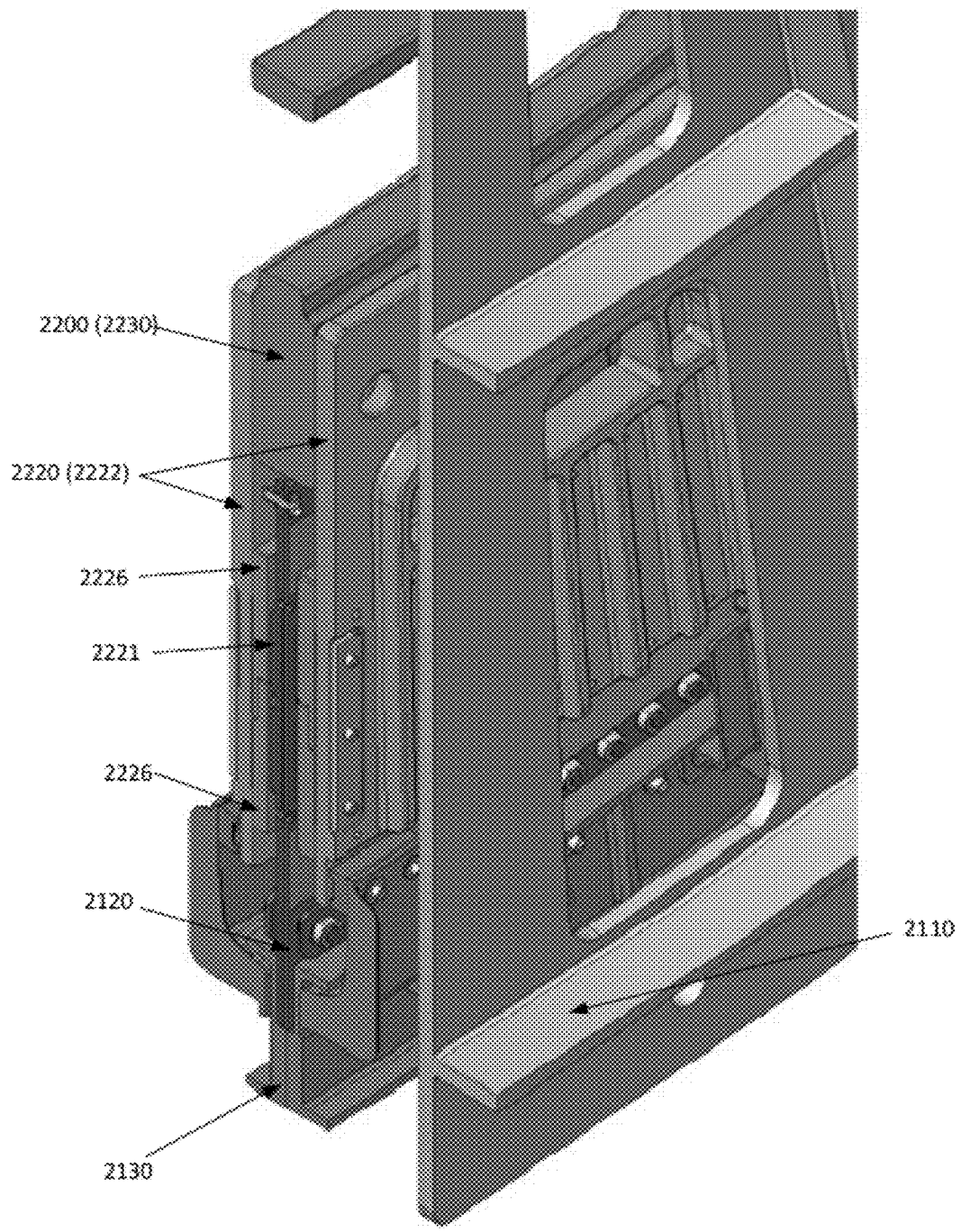
FIG. 22 illustrates an embodiment of an assembly for a direct drive generator consistent with one embodiment of the present invention

FIG. 21 shows a side view of a stator element 2120 in position between the magnet carriers 2222 of the rotor elements 2220. FIG. 22 provides a view (outer edge of generator is toward the bottom of the image in this view) of the stator element 2120 between the rotor elements 2220. This view illustrates how the distance between the magnet carriers 2222 is maintained by overlapping the inner ends of the carriers over a portion of the rotor support structure. The carriers are preferably bolted to the rotor support. The magnetic attraction of the magnets on opposing carriers necessitates assembly fixtures to hold the carriers in position as they are bolted to the rotor support structure.

Figure 23:
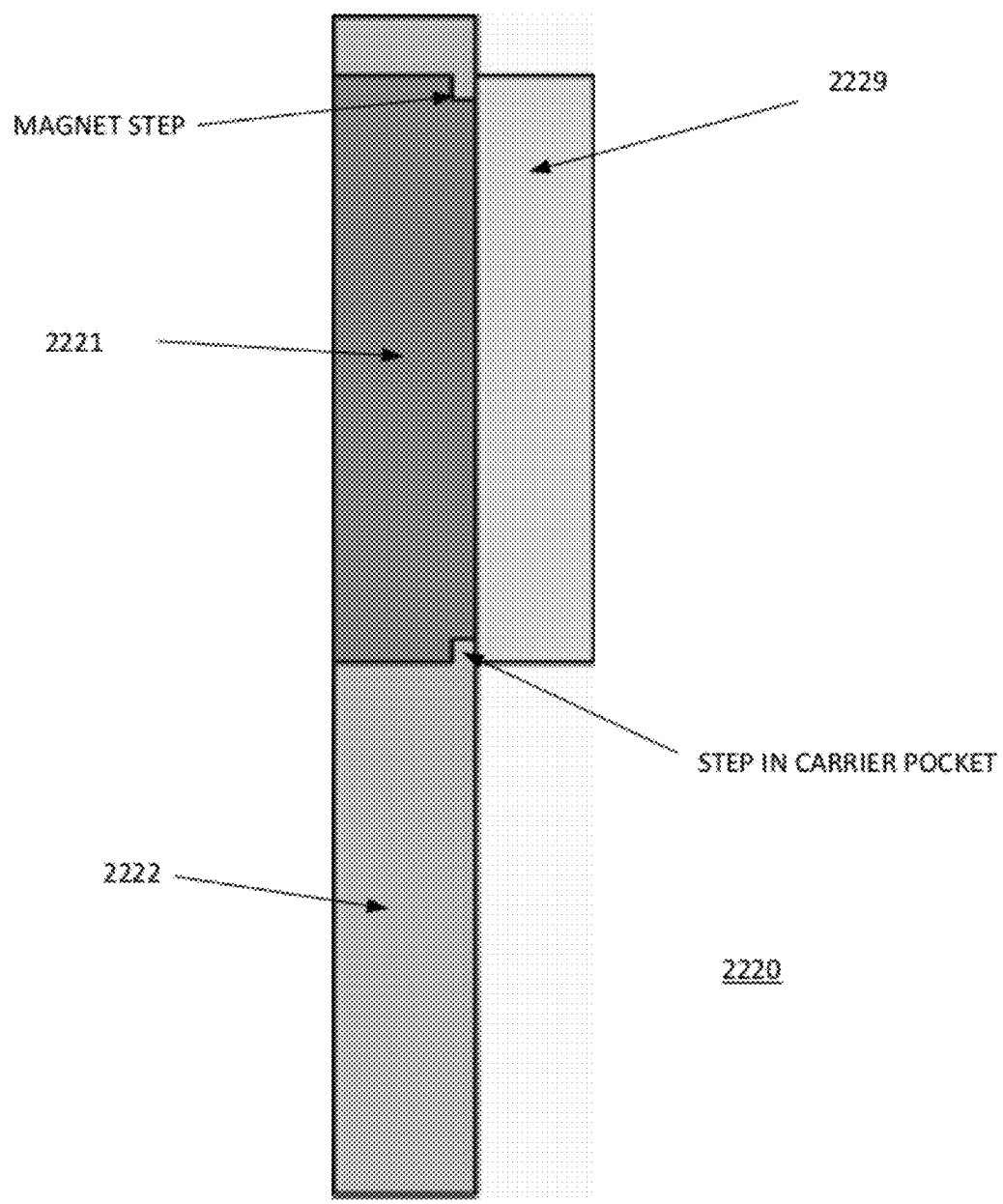
FIGS. 23-24 illustrate exemplary magnet carriers consistent with the present invention.
Figure 24:
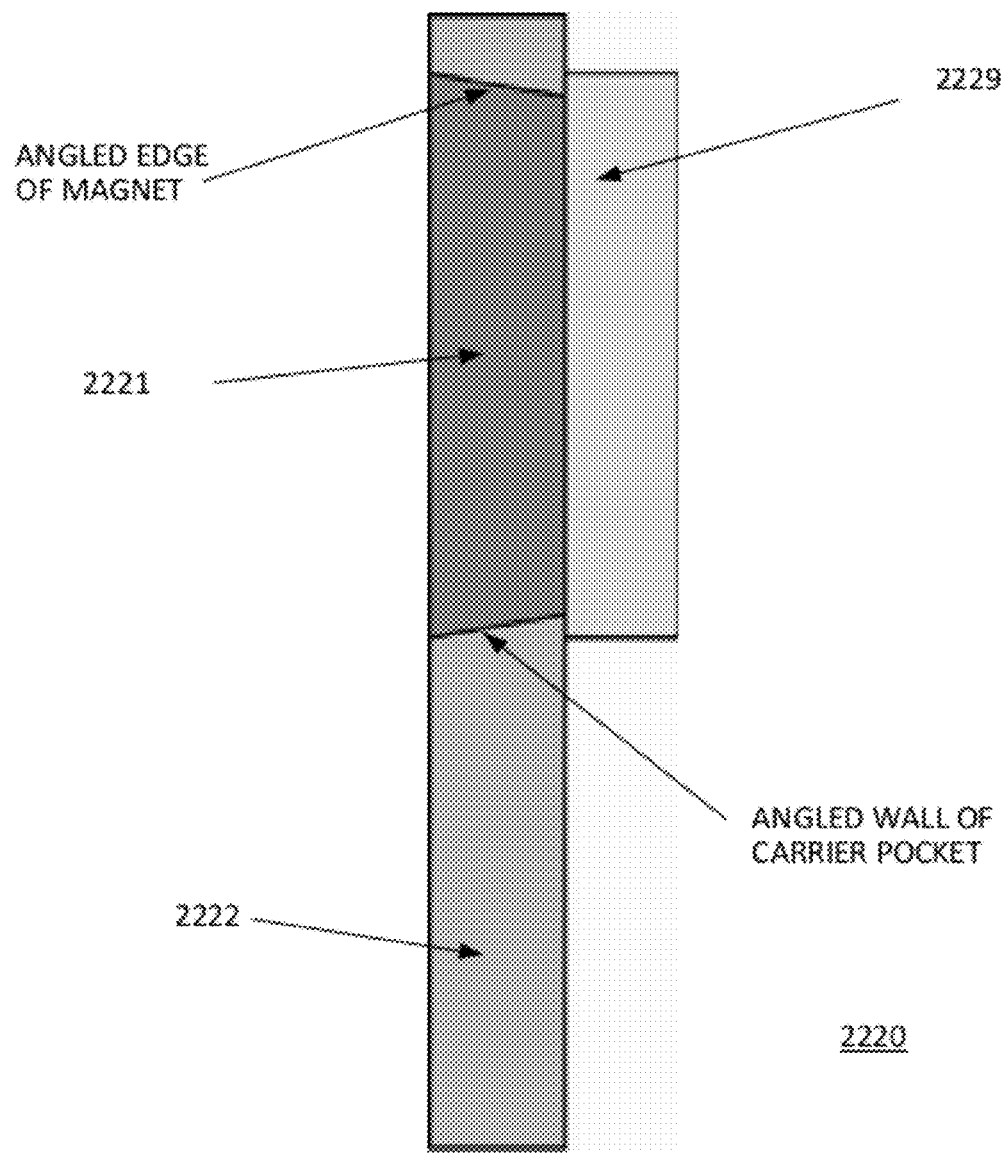

Referring now to FIGS. 23 and 24, there are exemplary embodiments of magnet carriers 2222 that may be used consistent with the present invention. The magnet carriers 2222 are preferably cast of a non-ferrous material such as aluminum. The magnet carriers have molded pockets to receive the permanent magnets 2221. Multiple ferrous flux return plates 2229 attach to the back sides of the magnet carriers. The flux return plates 2229 may be fastened to the magnet carriers 2222 with bolts or may be held in place by the attractive force of the magnets 2221. The flux return plates 2229 for each rotor may also be made as a single piece. The magnet carriers 2222, magnets 2221, and flux return plates 2229 are preferably designed with features that use the magnetic force of the magnets to the flux return plates to retain the magnets in the pockets of the magnet carriers. The magnets optionally may have a step or an inclined surface which mates with a complementary feature in the pocket of the magnet carrier. The attraction of the magnet to the flux return plate holds the magnet against the step or inclined surface to provide a force to hold the assembly together. In some embodiments, the back iron plate may be bolted to the carrier to provide additional strength and to provide greater simplicity of design and construction. This allows magnets to be dropped into a pocket and held against the back iron plate.

The cross-section view in FIG. 23 shows a stepped surface along two edges of the magnet 2221 and a step in the magnet carrier 2222. The step feature of the magnet carrier 2222 is trapped by the attractive force of the magnet 2221 holding the flux return plate 2229 to the back of the magnet carrier. In FIG. 24 there is another cross-section which shows two edges of the magnet 2221 formed or machined at an angle with the two mating sides of the magnet pocket of the magnet carrier having the same angle. The attractive force of the magnet 2221 for the flux return plate 2229 holds the magnet into the pocket against the angled surface.

Figure 25:
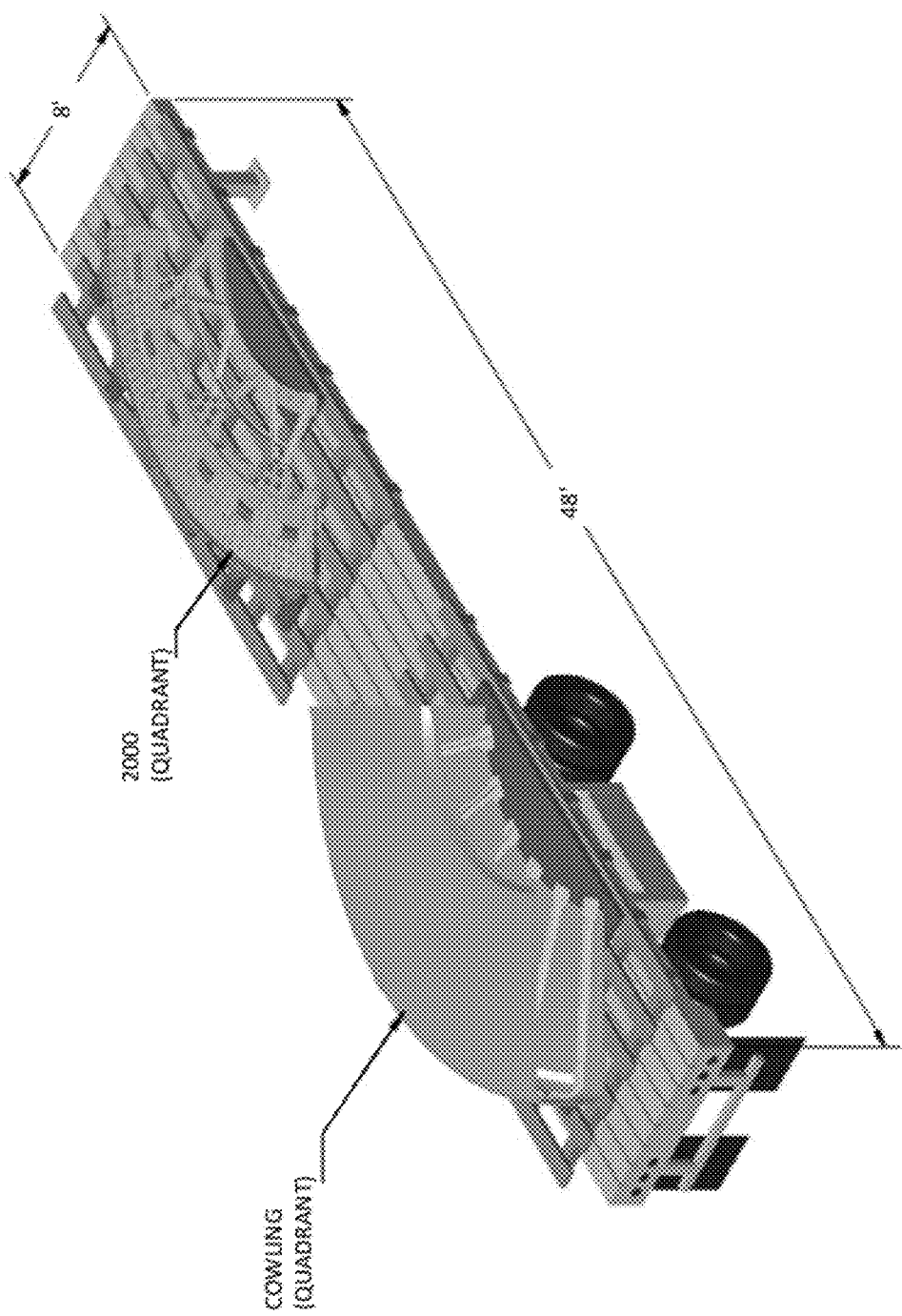
FIG. 25 illustrates the transportability of an assembly for a direct drive generator consistent with the present invention.

As discussed, one advantage of the present invention is improved transportability. As shown in FIG. 25, by dividing the direct drive generator into sections (quadrants are shown), the resulting assemblies or components have smaller dimensions that make them more easily transportable.

Figure 26:
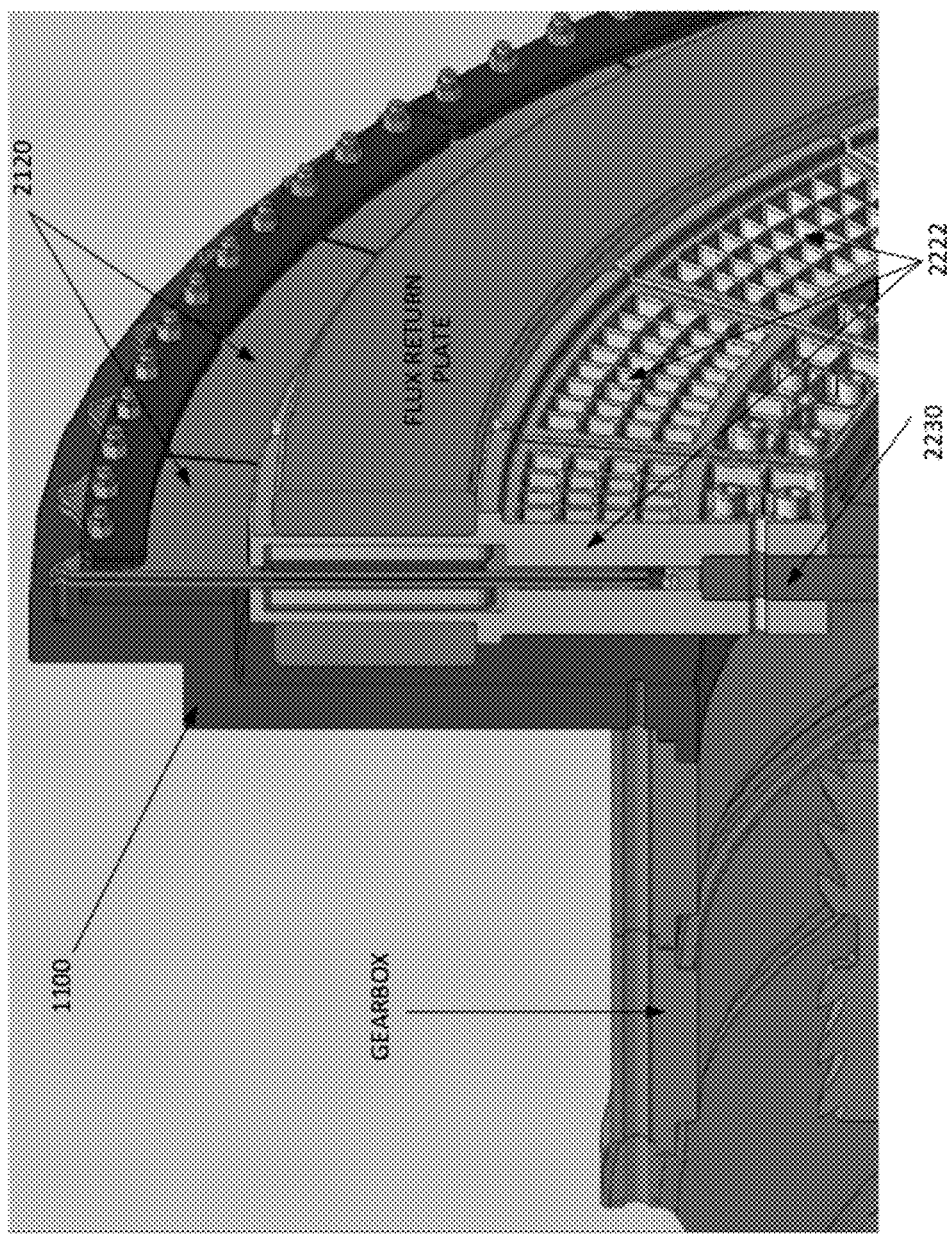
FIGS. 26-27 illustrate cross-section views of a medium-speed gear box generator attached to a compound planetary gearbox
Figure 27:
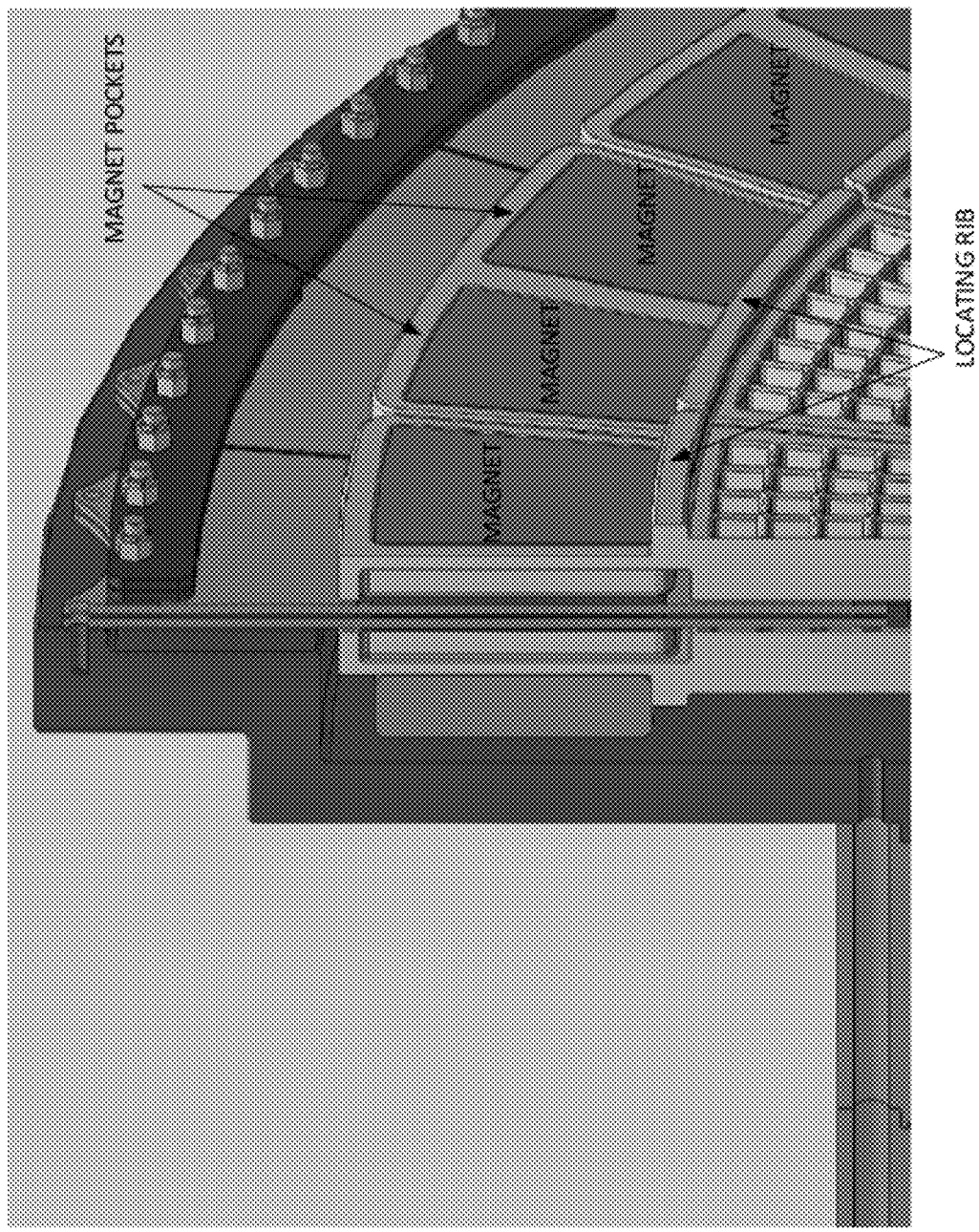

In FIGS. 26-27 there are cross-section views of a medium-speed gear box generator attached to a compound planetary gearbox. The gearbox attaches to the wind turbine hub and blades. The right side housing is removed to give a view of the rotor plate, magnet carriers and flux return plate. In the close-up view of FIG. 27, the right-hand rotor is shown with one flux return plate removed to show the magnets. The magnet carriers may also be formed with a feature to help position the flux return plate such as the locating rib shown in this view.

Now referring to FIGS. 28 to 35 there are drawings to show and describe the inventive concept of exploiting a relatively rigid structure to guide the position of a relatively soft structure in a rotating electromagnetic machine. The space between the stiff structure and soft structure forms a physical "air gap" (not to be confused with the electromagnetic air gap in permanent magnet machines) between the stationary and rotating parts. In one embodiment, a rigid rotor is used to guide a relatively soft (in the direction that controls air gap size) stator (or visa versa in some other concepts) to maintain an inviolate minimum air gap in a rotating electric machine. The invention addresses selecting structural stiffness values of elements of a rotating machine so that the operating clearance between stationary and rotating parts is established by the basic geometry and then maintained by having the stiffer member control the relative position of the less stiff member during operation. The invention further addresses minimizing the forces that need to be applied to achieve the desired location of the less stiff member. This latter feature is accomplished by transmitting forces from the stiffer member to a mounting structure for the less stiff member. Transmitting forces between the stiffer member and the less stiff member can be accomplished using contact or non-contact forces.

Figure 28:
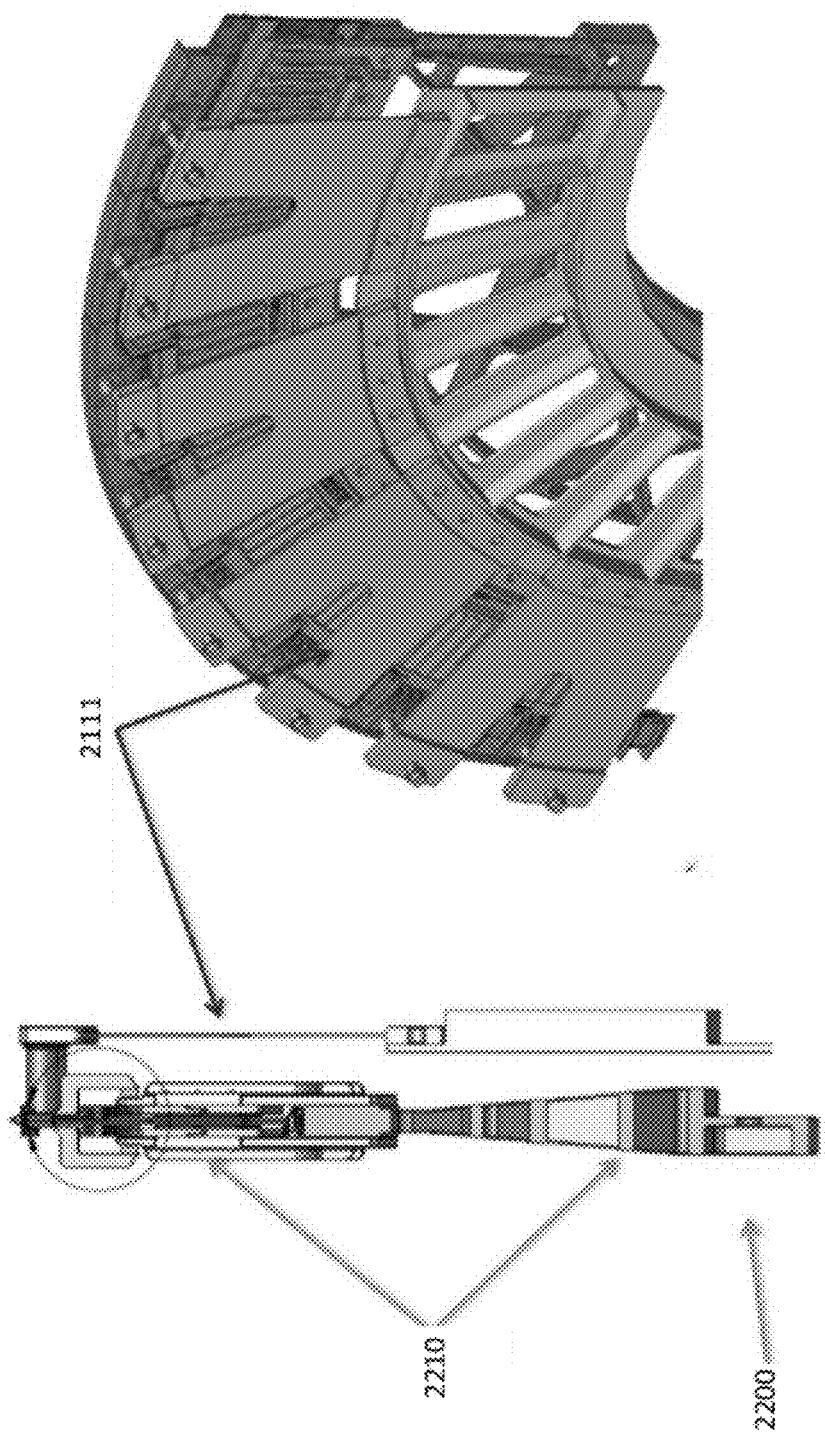
FIG. 28 illustrates an assembly for a direct drive generator consistent with an embodiment of the present invention

Referring first to FIG. 28 there is a view of an exemplary physical air gap system consistent with the present invention. In FIG. 28 the flex beams 2111 are part of the stator support 2110 and can be made as stiff or soft as needed by adjusting its axial thickness and cross sectional shape. In one embodiment, the flex beams 2111 are stiff in torsion to react to the torque of the machine, but soft in the axial direction to allow axial motion to follow the rotor axial movement (from manufacturing and assembly tolerances as well as dynamic responses to external forces applied during operation) to maintain a minimum physical (axial) air gap between the rotor and the stator. The rotor structure in this embodiment is shown to be substantially thicker and has relatively high axial stiffness.

Figure 29:
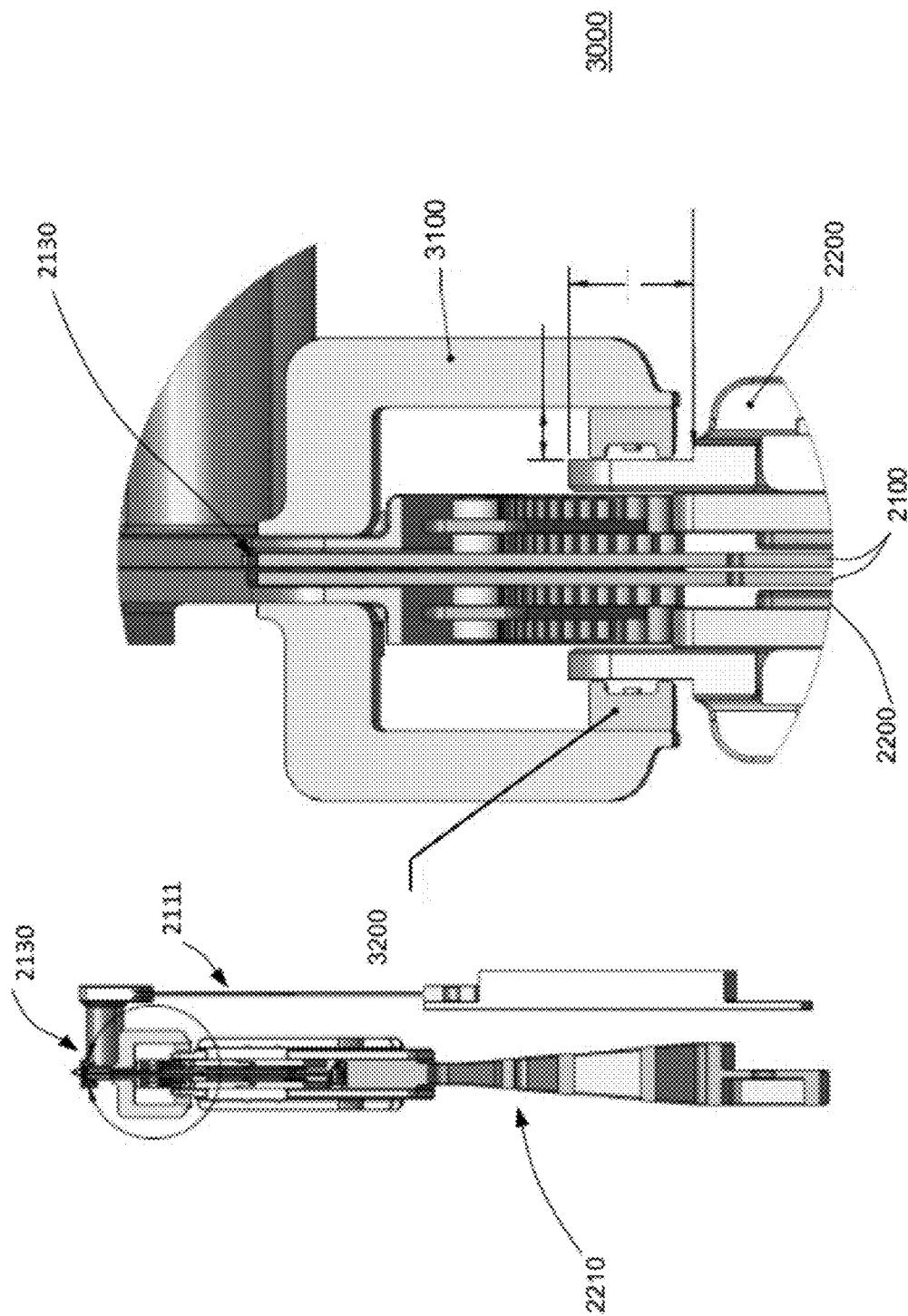
FIG. 29 illustrates an air gap control system consistent with embodiments of the present invention.

FIG. 29 shows an enlarged view of the portion of the device where the stator element 2120 and rotor element 2220 (the portions of the device which generate electricity due to their relative movement) overlap radially. The axial air gap between the stator element 2120 and the rotor element 2220 (which are cutoff in the figure) is also shown. In order to form and maintain the axial air gap, one embodiment of an axial gap maintenance system 3000 consistent with the present invention is shown. The axial gap maintenance system 3000 includes a stationary outrigger 3100, wherein the stationary outrigger is configured such that at least a portion of the stationary outrigger is proximate to the rotor section, and a force transmission device 3200. As shown and described herein, various force transmission methods and devices may be used to transmit force between the stationary outrigger and the rotor. The present invention, however, is not dependent on any single device or method. Pneumatic, magnetic, electromagnetic, and mechanical devices and methods—and various combinations of magnetic, electromagnetic, mechanical and pneumatic devices and methods may be employed by various embodiments consistent with the present invention to provide control of the air gap between the rotor and the stator. The device or method for transmitting the gap controlling forces can be solely mechanical, passive magnetic, active magnetic, pneumatic or any combination of active and passive magnetics in combination with pneumatic, mechanical, or pneumatic and mechanical. The objective of the invention disclosed herein is to use a stiffer structure in a rotating electromagnetic machine to guide a softer structure so the two never collide during operation. The method for the stiffer structure to transmit the forces necessary to move the softer structure to the desired location in operation are varied and form the basis for the preferred and alternate embodiments.

Figure 30A:
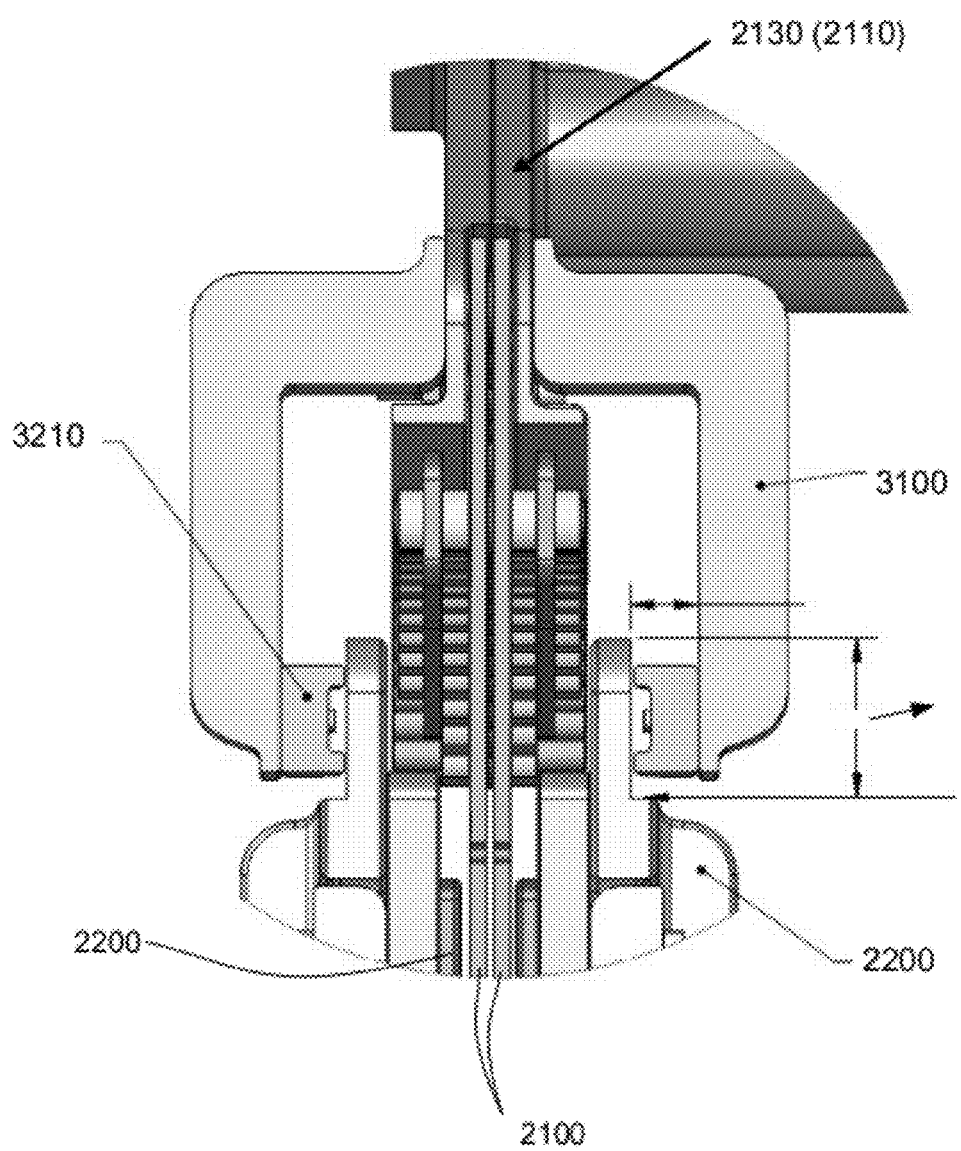
FIG. 30A illustrates an air gap control system using a mechanical device consistent with an embodiment of the present invention.
Figure 30B:
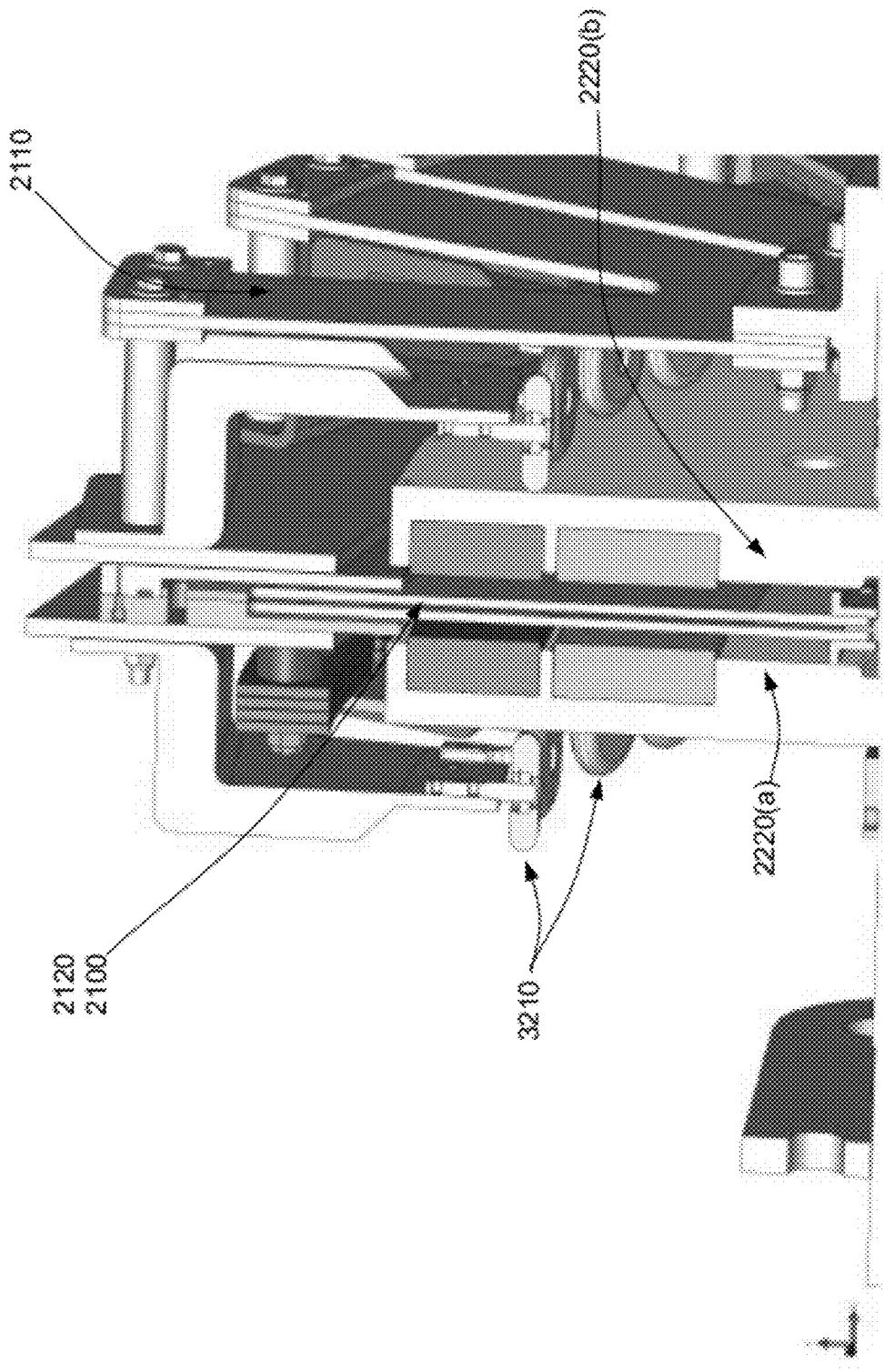
FIG. 30B illustrates an air gap control system using a mechanical device consistent with another embodiment of the present invention.

In FIG. 30 there is an embodiment using a mechanical device to transmit force between the stiffer and softer structures. In particular, a mechanical arrangement is shown wherein a guide rail 3210, or guide pad, is used. While the mechanical device has certain advantages, such as simplicity, it presents certain problems as well. For example, the material composition of the guide rail 3210 must be such that it can handle transition from a non-contact state to a contact state at full operating speed. In addition, it is preferred that any contact with the rotor create as little drag as possible, so as to not waste energy. Finally, in order to reduce and hopefully minimize maintenance costs, it is preferred that the material be durable and be able to operate for a significant period. In a preferred embodiment, the present invention includes a mechanical device comprising low friction and impact resistant material(s) configured to provide an axial gap force well before the active areas of the rotor and stator come into contact, and then, if the rotor/stator continues to move, mechanically pushes the rotor/stator out of the way.

One option for reducing or eliminating mechanical contact is to use a pneumatic device to provide pressured air. FIG. 31 depicts an embodiment wherein the force transmission device 3200 has been modified to act as an air bearing 3220. Using an air supply line 3221, including an air supply manifold 3222, pressurized air can be used to maintain the axial air gap. Compressed air is supplied to each caliper where it is distributed to the air bearing pads. In order to provide a backup mechanism, the air bearing pads 3220 may be integrated with the mechanical guide pads 3210 previously described. In this embodiment, the guide pads 3210 may be configured to operate better under lower speed and stopped conditions—when the pressurized air mechanism may be less effective.

Figure 32:
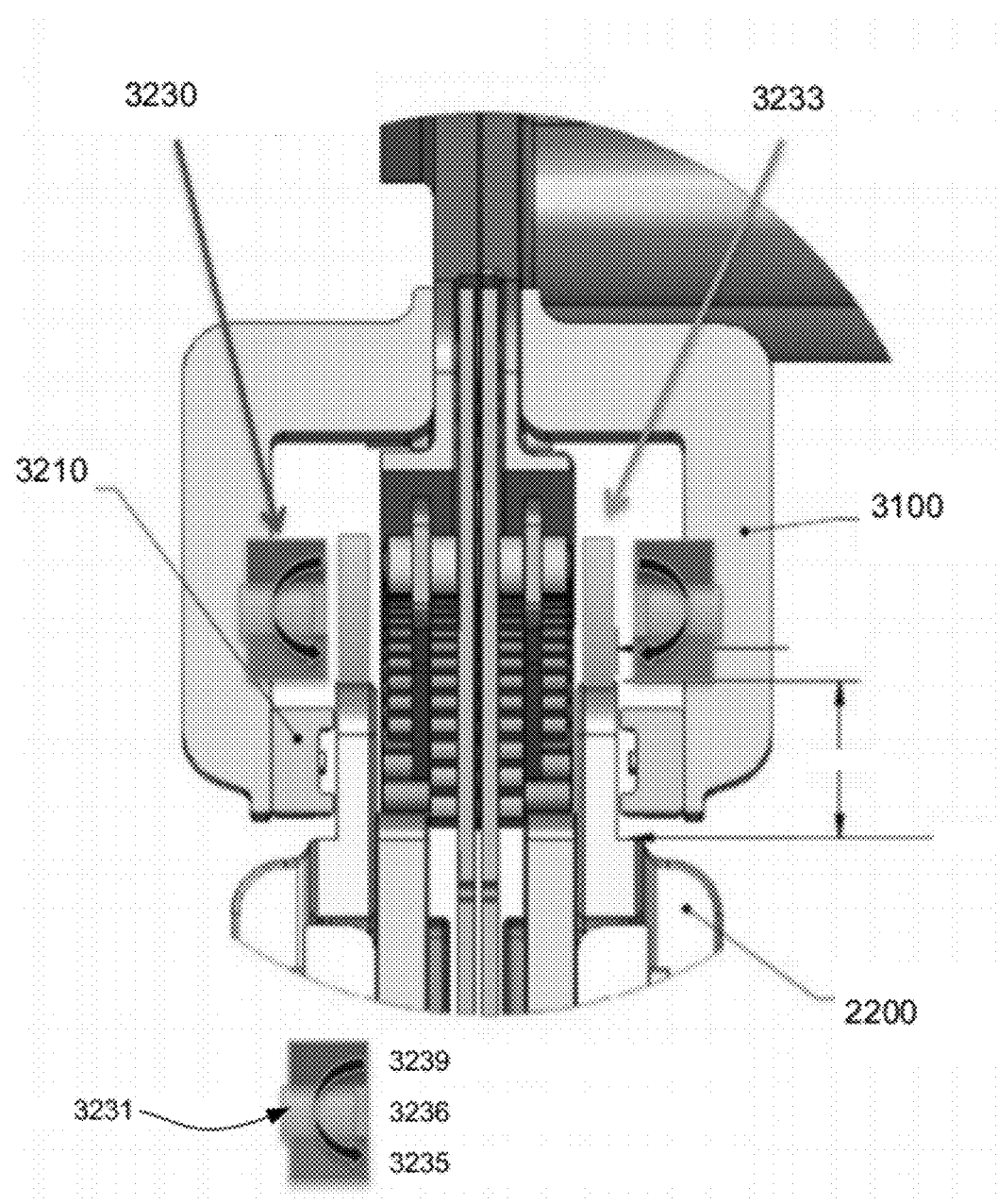
FIG. 32 illustrates an air gap control system using magnetic bearings consistent with an embodiment of the present invention.
Figure 33:
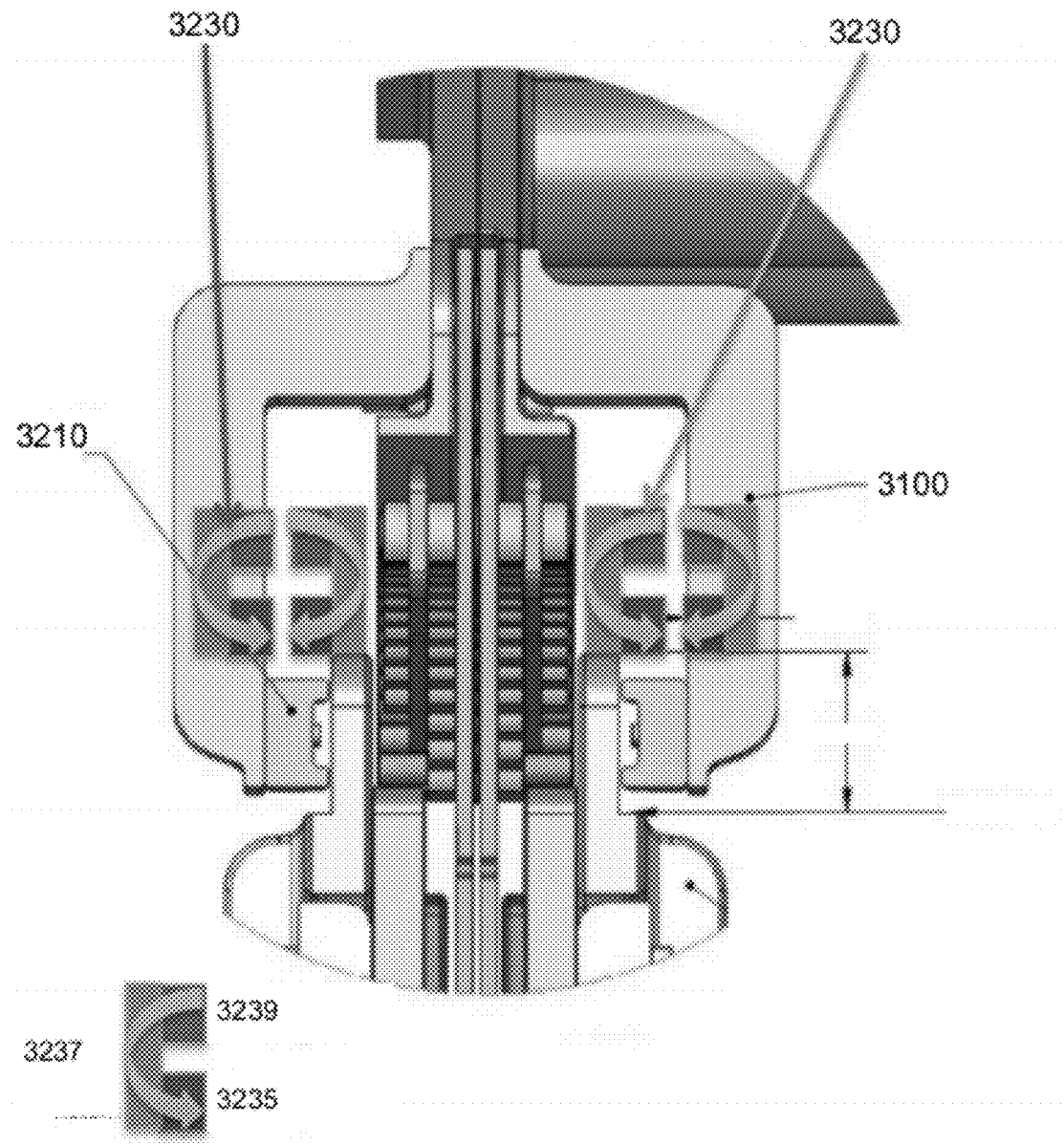
FIG. 33 illustrates an air gap control system using magnetic bearings consistent with another embodiment of the present invention.

In FIGS. 32-33 magnetic bearings 3230 are used to generate the axial guiding force for maintaining the axial air gap. In FIG. 32 an active magnetic bearing arrangement is used, and in FIG. 33 an inactive, or passive, magnetic configuration is provided.

In the embodiment in FIG. 32, active coils 3231 and position sensors 3232 can be placed on calipers connected to the stationary outrigger 3100. These active coils 3231 are configured to align, at least partially, with a magnetic material 3233 connected to the rotor—such as the steel rotor extensions 3233 for each rotor in FIG. 32. Each of the magnet bearings 3230 may include a south pole piece 3234, a north pole piece 3235, and a proximity sensor that can be used to activate the bearing to adapt to changes in the gap distance. The mechanical guide rails 3210 of FIG. 30 are again shown as a backup to the magnetic system. It should also be appreciated that further combination with other embodiments is possible.

In FIG. 33 opposing sets of magnets 3234, 3235, connected to a flux return material 3237, are configured on the rotor and stator in order to generate the force for maintaining the axial air gap. The magnet calipers 3234, 3235 are preferably configured such that they comprise non-ferrous materials (materials with no iron or without an appreciable amount of iron) so as to minimize interaction with the stator. While FIG. 33 discloses an inactive, or passive, magnetic bearing arrangement, the depicted embodiment may be adapted to a quasi-active embodiment by adding sensor, actuators and control software/hardware. Once again, a mechanical guide rail 3210 may be included as a backup mechanism.

Figure 34:
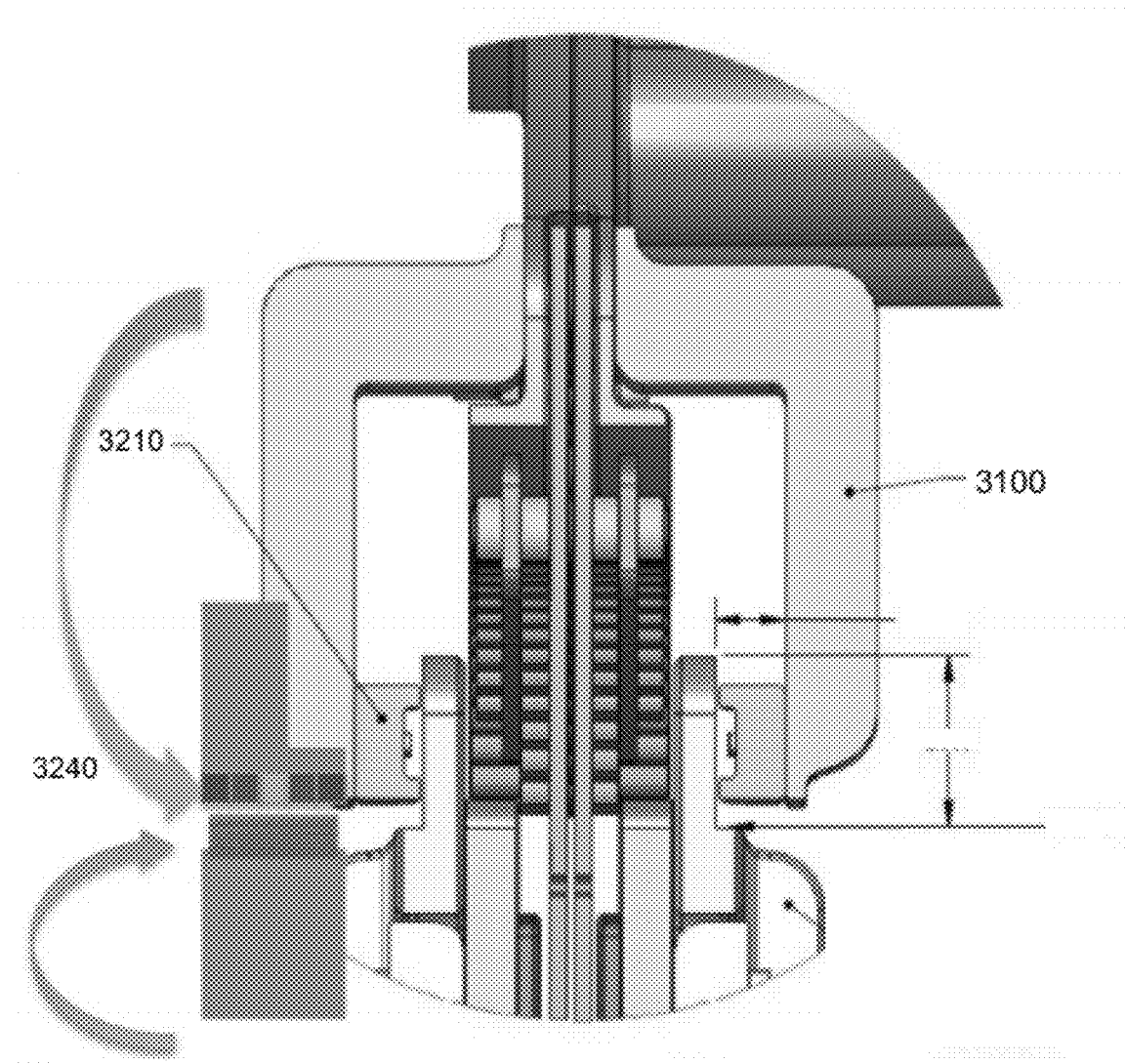
FIG. 34 depicts an air gap control system using a magnetic levitation mechanism for axial air gap control.

FIG. 34 depicts yet another embodiment using a magnetic levitation mechanism 3240 for axial gap control. A null-flux magnetic levitation system may be used wherein a Halbach array of magnets in a non-ferromagnetic bracket are configured to interact with a null flux ladder circuit. In FIG. 34, the Halbach array 3241 is connected to the stationary outrigger 3100, and the null-flux ladder circuit 3242 is connected to the opposing rotor. A potential advantage of this arrangement is that the mag-lev system 3240 only has to be configured on a single side of the assembly, although a mag-lev system 3240 may be added to both side for purposes of backup. Additional backup, such as the guide rails 3210, should be further used in order to maintain air gap control when the device is not in operation or during failure.

Figure 35:
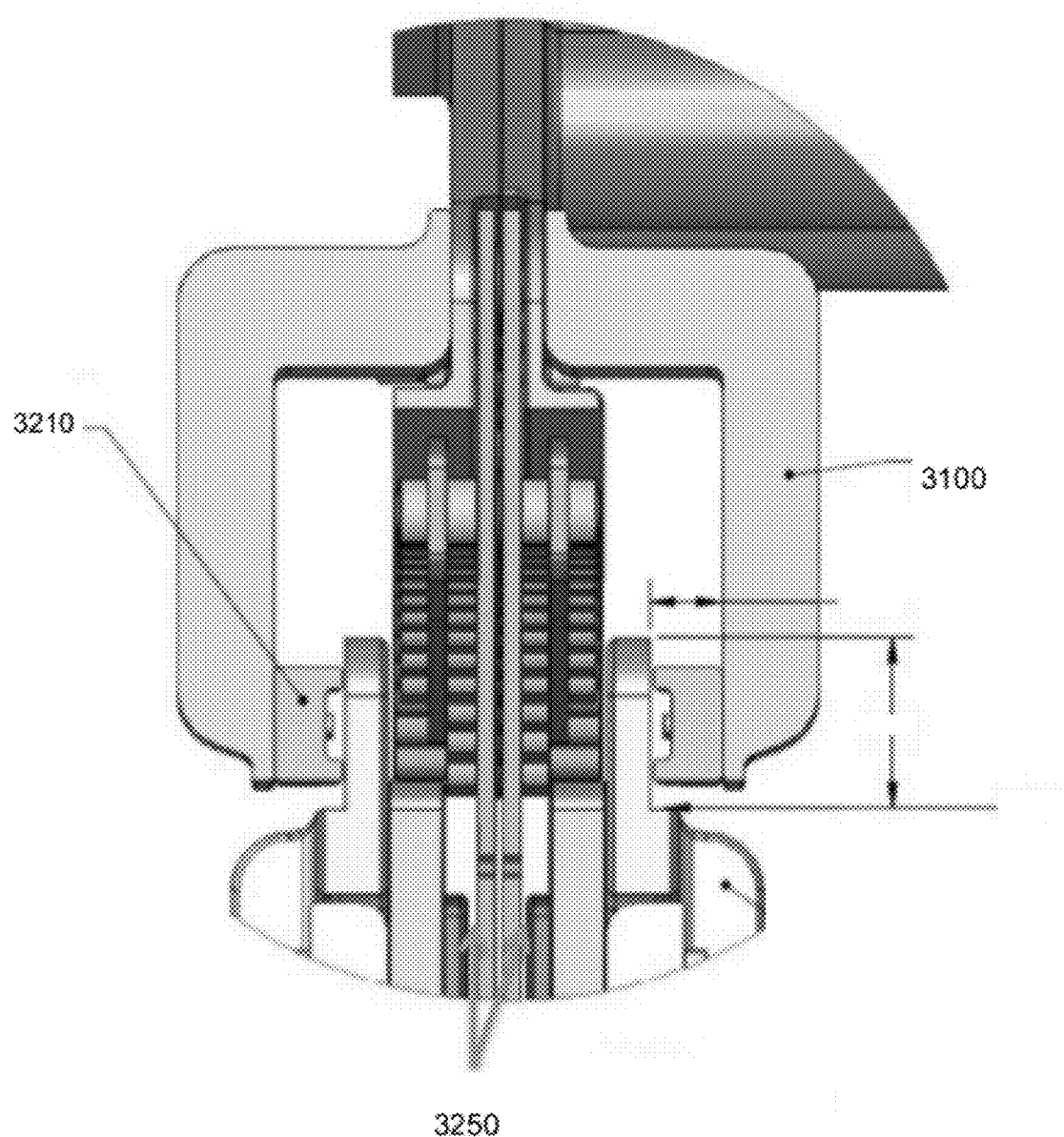
FIG. 35 depicts an air gap control system using an auxiliary stator winding active axial magnetic bearing configuration for axial air gap control.

In a still further embodiment of the invention, FIG. 35 depicts an auxiliary stator winding active axial magnetic bearing configuration 3250. This embodiment includes a set of layers on outside surfaces of a PCB stator that contain a different winding configuration 3250 than the generator windings, set for a slightly different pole count. Each stator board auxiliary winding 3250 can be either joined with buss bars to the next stator—this will form a similar stator segmentation scheme used for the PCB generator—or each auxiliary winding 3250 can be energized independently—to treat each auxiliary board as a separate entity to be moved to avoid contact with the magnets passing by. The back-emf of each auxiliary winding can be measured and compared to determine axial spacing of the stators relative to the rotors. A control system (not shown) may use this information to send AC power to generate an attractive force to the side with the lowest back-emf. As with most active magnetic bearings, the system has the best response when both sides are always slightly energized—to say, half their maximum current rating—so that you get the greatest control authority over the position of the board. It may be noted that this configuration loads the boards, and will actually be more apt to result in board bending at the extreme ends of rotor travel. A backup mechanical system (or other backup system) may be used with this configuration.

Figure 36:
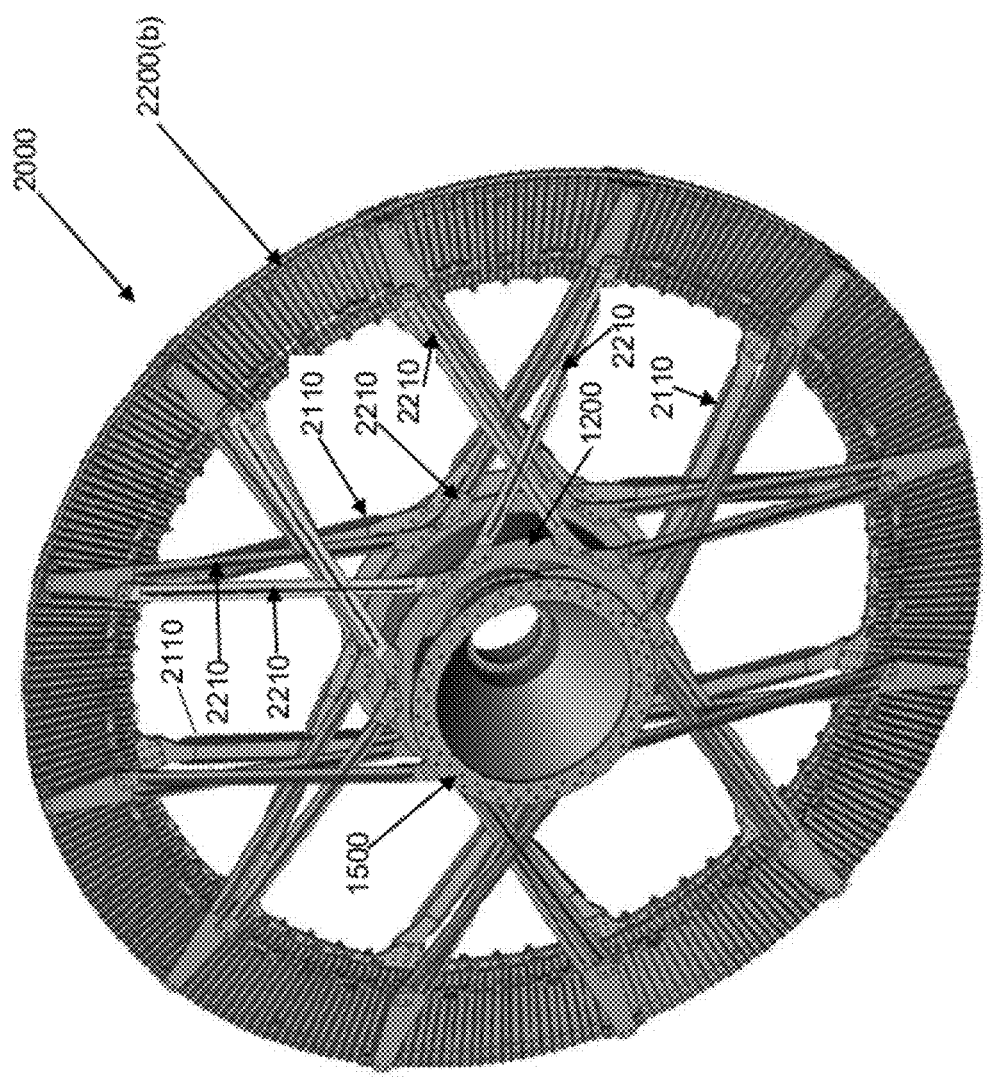
FIG. 36 is a perspective view of a rotor/stator/rotor assembly used with an axial flux motor or generator.
Figure 37:
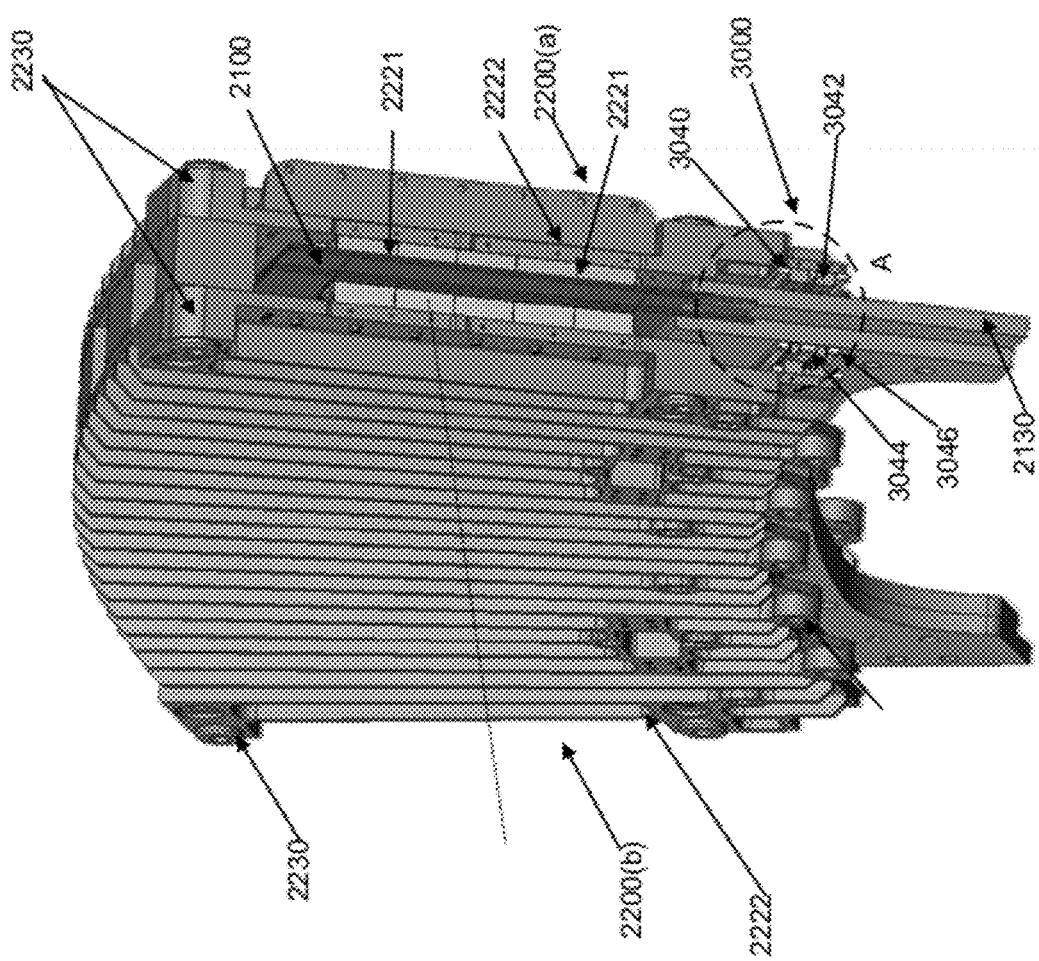
FIG. 37 is an enlarged section view of one section of the rotor/stator/rotor assembly shown in FIG. 36 with the air gap control system mounted thereto.

The air gap control system assembly 3000 according to the present invention may be used in many applications where maintaining a constant gap distance is desired for machine performance or safe operation. By way of example only, the air gap control system 3000 may be used with an axial rotor/stator/rotor assembly 2000 shown in FIG. 36. The rotor/stator/rotor assembly 2000 includes a first sectioned annular rotor 2200(a), an opposing sectioned annular rotor 2200(b) and an annular sectioned stator 2100 as shown in FIG. 37.

The first annular rotor 2200(a) is attached to a rotating rim of a bearing 1400 with structural support members 2210. Hub 1200 is fixedly attached to an axle (not shown) extending through central opening of the stator hub 1500. The opposing annular rotor 2200(b) is attached to the first annular rotor 2200(a) through spacer blocks 2230 located at the outer diameter of the rotor/stator/rotor 2000 assembly, such that the two annular rotor segments 2200(b) and 2200(a) rotate together, and deflect primarily in the axial direction as a single, structurally rigid subassembly. The stator 2100 is attached to stator clamp ring 2130 which is connected to a stationary rim of stationary stator hub 1500 by means of structural support members 2110. Stator hub 1500 is fixedly attached to a support structure and/or housing arrangement (not shown) which further maintains the fixed orientation of the non-rotating components of the rotor/stator/rotor assembly 2000.

Figure 38:
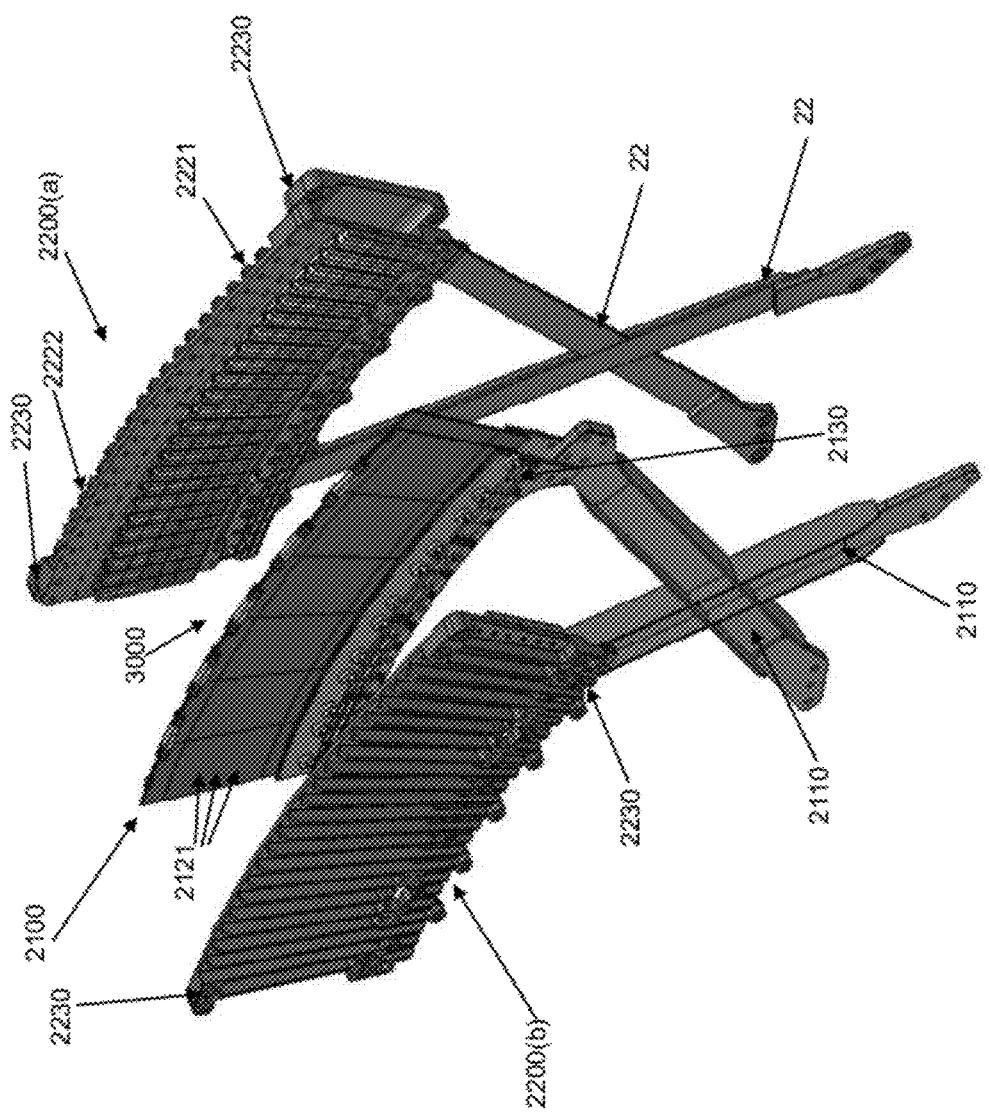
FIG. 38 is an exploded detail view of one segment of the rotor/stator/rotor assembly with parts removed of the rotor/stator/rotor assembly shown in FIG. 36, showing one of the rotors and the stator with the air gap control system mounted thereto.

As shown in FIG. 38, the stator assembly 2100 is manufactured from a printed circuit board similar to the arrangement described in U.S. Pat. No. 7,109,625, with individual segments 2121 similar to that described in Patent Cooperation Treaty Application No. PCT/US2010/000112. The annular rotors 2200(b) and 2200(a) both contain magnet pole assemblies 2221 which direct flux in the axial direction from the magnet poles on one rotor assembly to the magnet poles of opposite polarity on the opposing member.

By means of the structural support members 2210 and 2110, the annular rotors 2200(b) and 2200(a) and the annular stator 2100 are held in relatively fixed axial positions with respect to each other. The air gap control system 3000 exerts a repulsive force between the stator assembly 2100 and the rotor assemblies 2200(b) and 2200(a) such that, if relative deflection between the rotor and stator assemblies were to occur due to external loading or inertial acceleration, the air gap control system 3000 will produce a force that causes the flexible member(s) to maintain a nominal, location, in this case where the stator assembly 2100 is centered between the rotor assemblies 2200(b) and 2200(a).

This primarily axial translation of the stator assembly 2100 results in a relatively uniform gap alignment along the radial direction of the generator or motor such that the gap distance of the inner diameter between annular rotor 2200(a) and annular stator 2100 is kept relatively the same as the gap distance at the outer diameter even if the annular stator 2100 has been subject to axial translation. Similarly, the gap distance of the inner diameter between annular rotor 2200(b) and annular stator 2100 is kept relatively the same as the gap distance at the outer diameter even if the annular stator 2100 has been subject to axial translation. The repulsive forces of the magnets 3040, 3042, 3044 and 3046 of the air gap control system 3000 force the annular stator 2100 to re-center itself between the annular rotors 2200(b) and 2200(a) even in the presence of a constantly applied external force to the rigidly mounted rotor assemblies.

Figure 39:
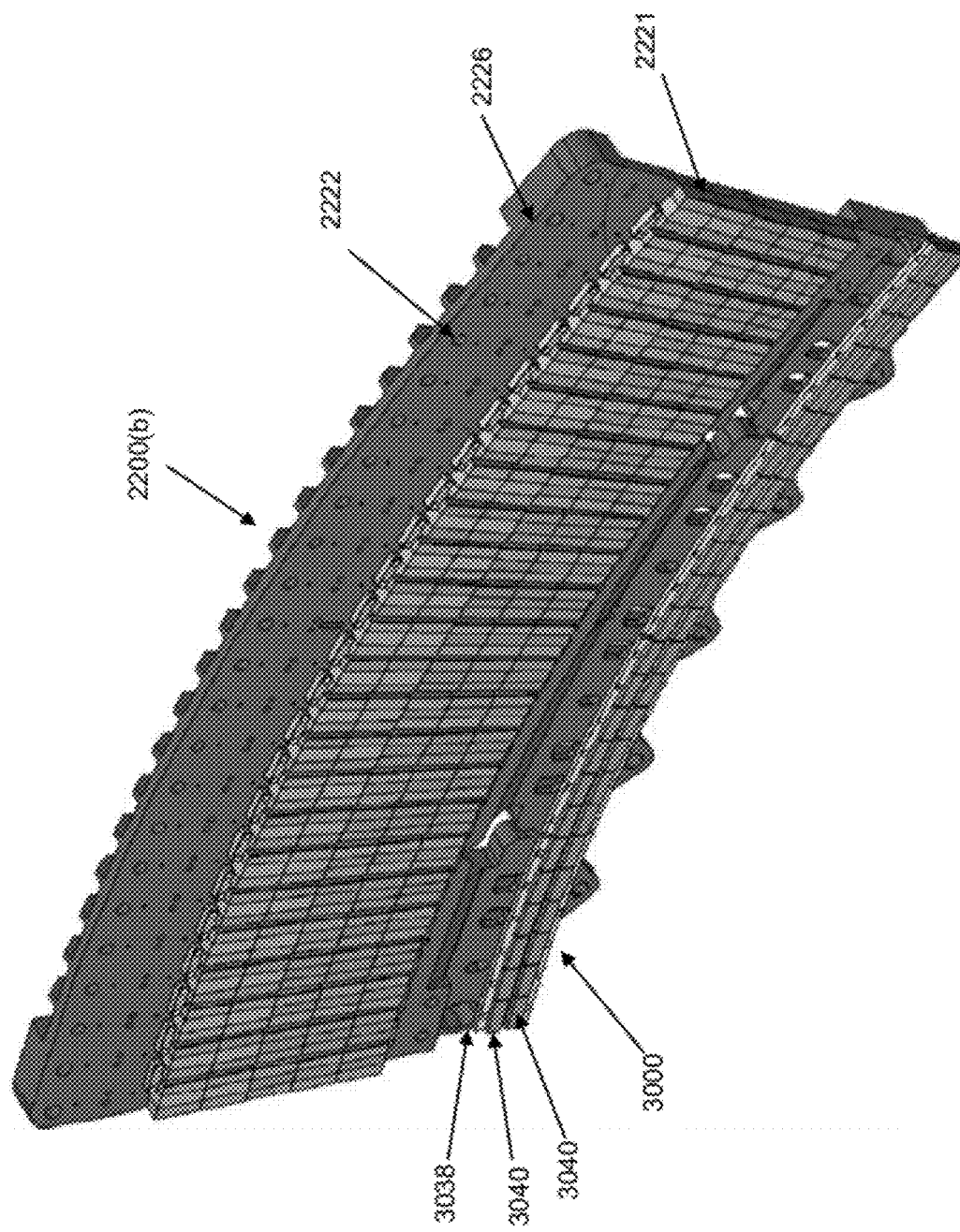
FIG. 39 is an enlarged perspective view of the rotor segment shown in FIG. 37 with the air gap control system mounted thereto.

A section of annular rotor 2200(b) as shown in FIG. 38 is shown enlarged in FIG. 39. The magnet pole assemblies 2221 are mounted to a rotor back iron 2222 with a pole magnet retainer 2226. The rotor mounted portion of the air gap control system 3000 is held in place on the rotor back iron 2222 with air gap control magnet retainers 3038.

Figure 40A:
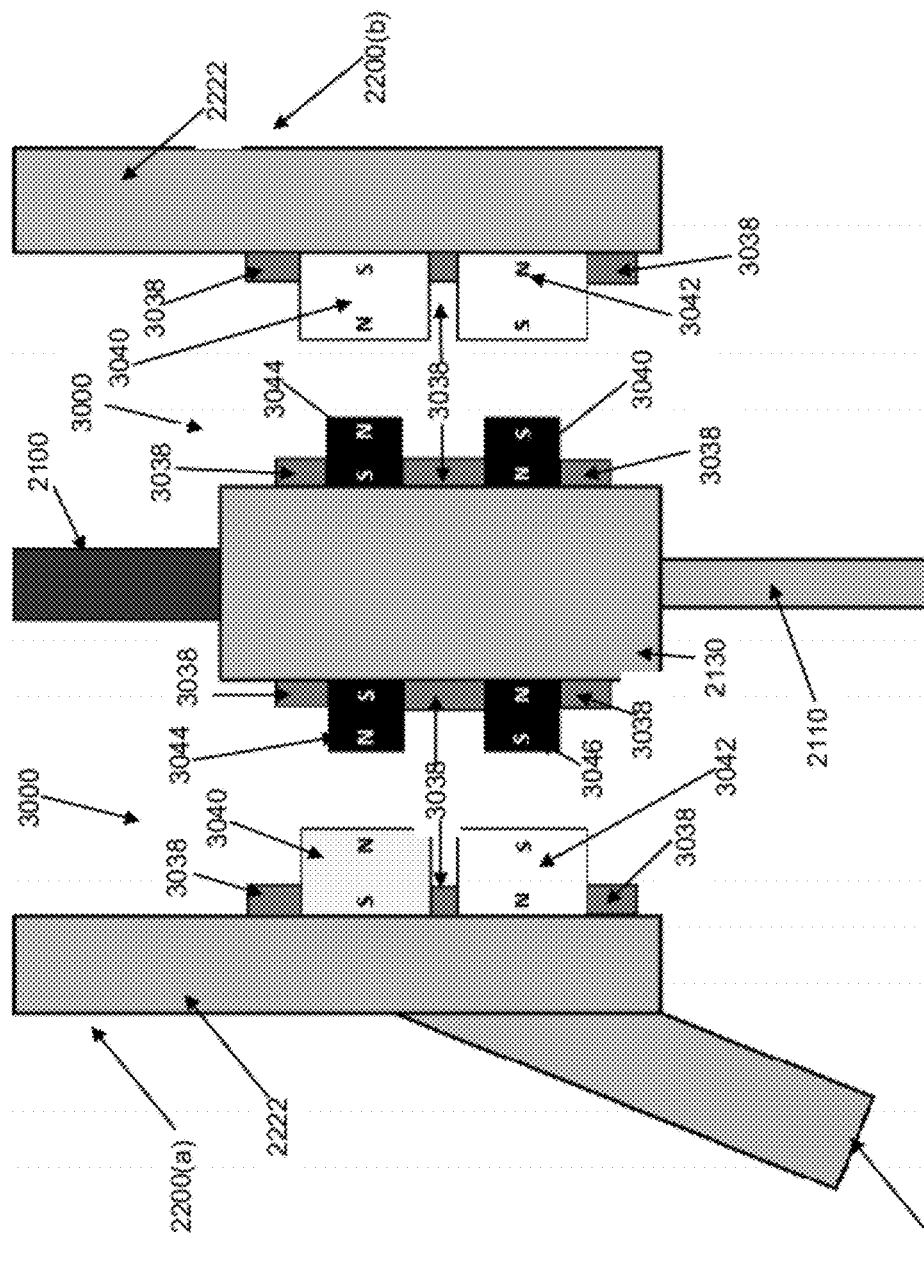
FIG. 40A is a schematic view of the rotor/stator/rotor section shown in FIG. 37 taken at "A" with the air gap control system mounted thereto.

A detail view of the full air gap control system assembly 3000 partially shown in FIG. 37 is shown in FIG. 40A. In the preferred embodiment, the air gap control system assembly 3000 has five unique subcomponents, namely magnet 3040 mounted with its south facing magnet pole against rotor back iron 2222, magnet 3042 mounted with its north facing magnet pole against rotor back iron 2222, magnet 3044 mounted with its south facing magnet pole against stator back iron 2130, and magnet 3046 mounted with its north facing magnet pole against stator back iron 2130, and magnets 3040, 3042, 3044 and 3046 are held in place with magnet retainers 3038. Magnet assemblies 3000 are mounted in a circumferential pattern around the entire inner diameter of the inner face of annular rotors 2200(b) and 2200(a) and circumferentially around the entire inner diameter of both faces of annular stator 2100.

In the preferred embodiment, magnets 3040, 3042, 3044 and 3046 are neodymium-iron-boron (NdFeB) permanent magnets, and per this arrangement, assembly 3000 is equivalent to a two-sided permanent magnet bearing. Because these opposing magnets 3040 and 3044 as well as 3042 and 3046 are placed in a nearly continuous ring around both the rotor assemblies 2200(b) and 2200(a) as well as both faces of the stator assembly 2100, the effect of eddy current drag, which would be induced by an alternating magnetic field at a given location due to the relative motion, is thereby minimized.

Figure 41:
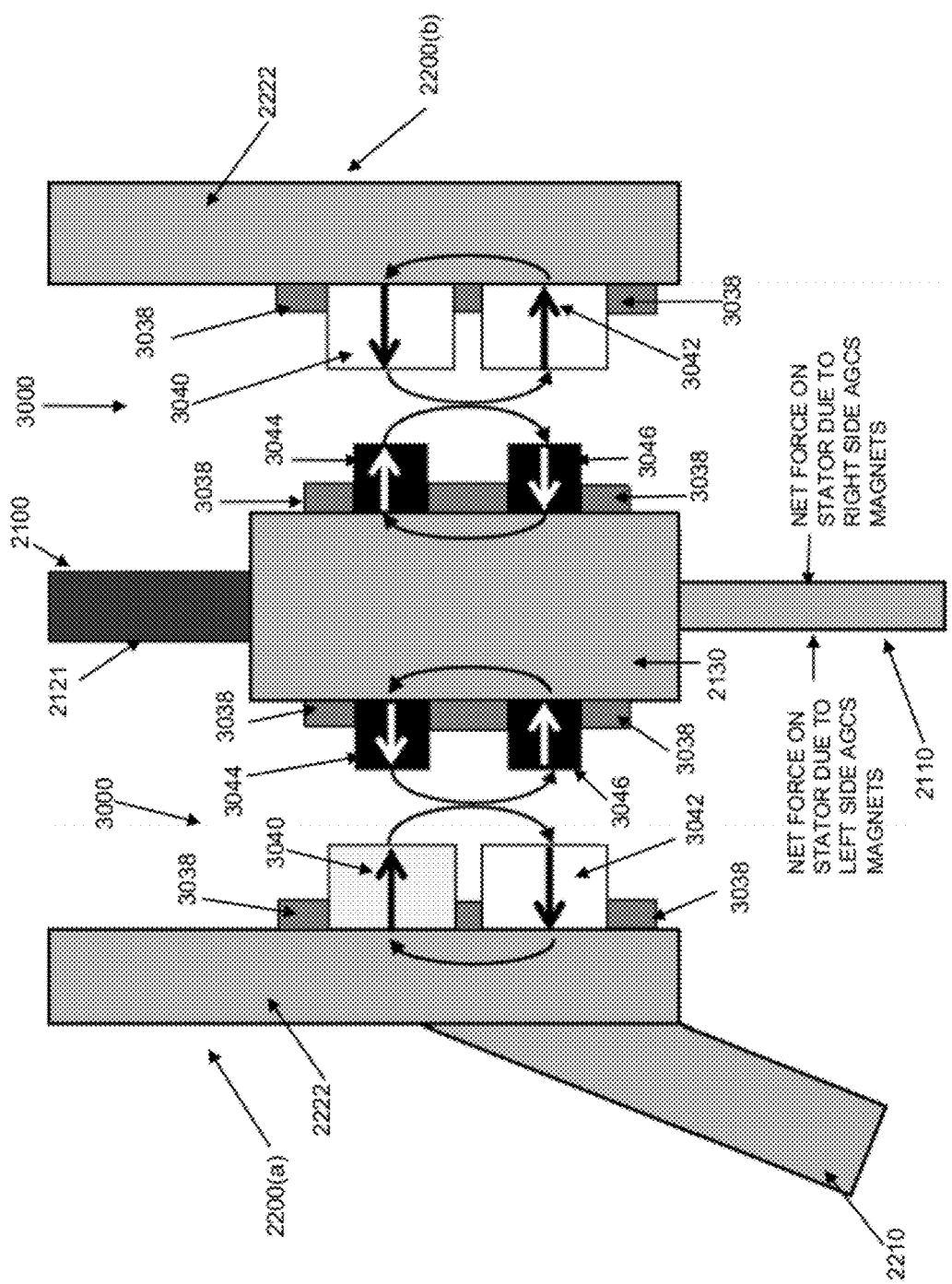
FIG. 41 is a schematic view of the air gap control system arrangement shown in FIG. 40A with the predominant effect of flux represented.

In the present embodiment, rotor back iron 3034 is made from a magnetically permeable material, such as iron or steel, and it provides both a return path for flux to pass from one row of magnets 3042 to the adjacent row of magnets 3040 as well as structural rigidity to react the attractive force between the two annular rotor segments 2200(b) and 2200(a) as shown in FIG. 41. Stator clamp ring 2130 is also made from a magnetically permeable material, which in the vicinity of the air gap control system magnets 3044 and 3046 provides a return path for flux to travel from one row of magnets 3046 to the adjacent row of magnets 3044.

Figure 40B:
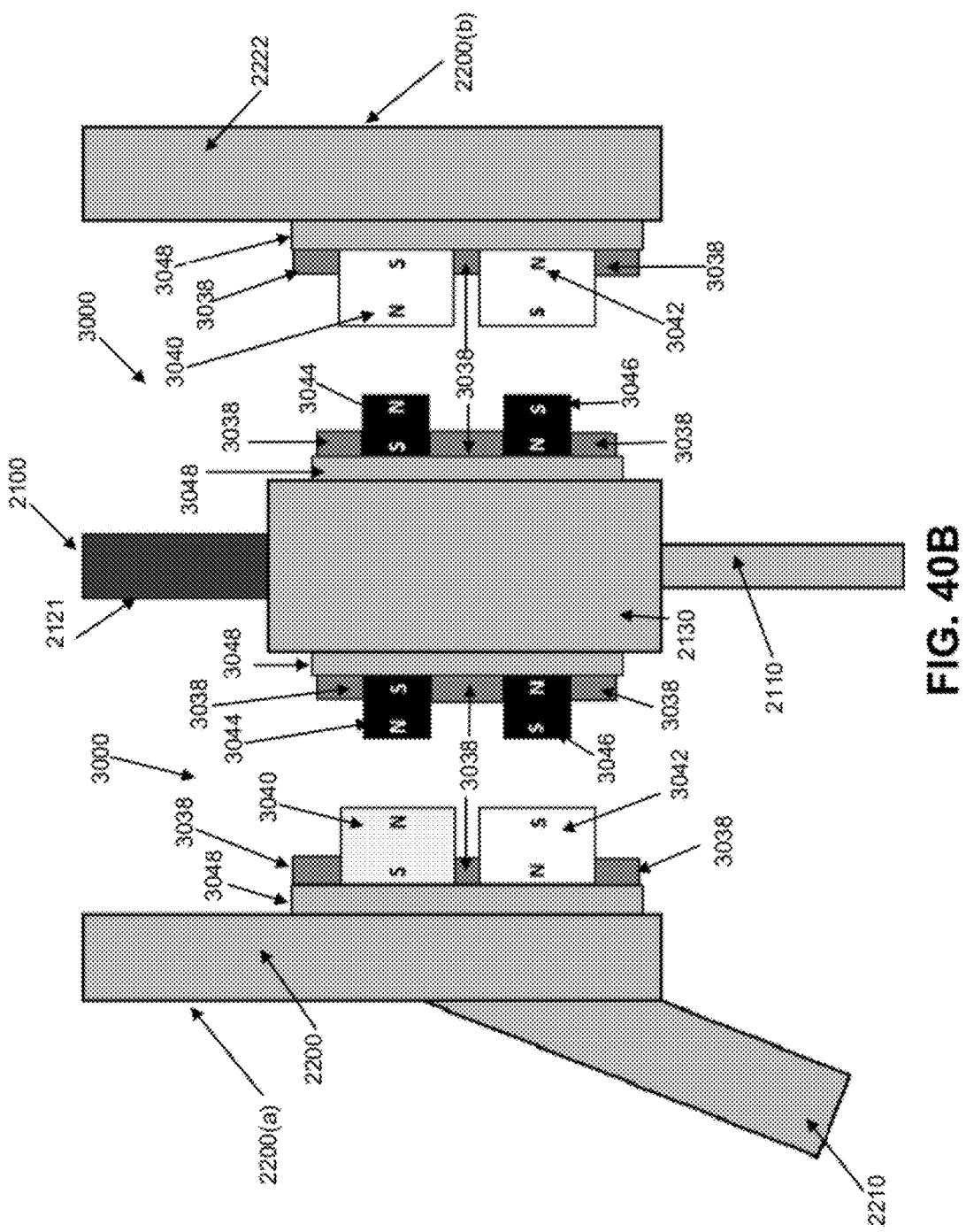
FIG. 40B is a schematic view of the rotor segment/stator/rotor shown in FIG. 37 taken at "A" with the air gap control system mounted in an alternative arrangement thereto.

An alternative assembly 3000 is shown in FIG. 40B, whereby the flux return function for magnets 3044 and 3046 could also be enabled by inserting a small magnetically permeable material segment 3048 directly behind the air gap control magnets 3044 and 3046 and retainers 3038 to provide an independent flux return path. These may be separately installed in a stator clamp ring 2130 and rotor 3034 which, in the vicinity of the air gap control magnets, may be composed of a relatively impermeable material, such as aluminum, austenitic stainless steel, or plastic.

The magnets 3040 and 3044 are oriented in such a manner that the polarity of axially opposing magnets is in opposite directions. Magnets 3042 and 3046 are also oriented in such a manner that the polarity of axially opposing magnets is in opposite directions. This arrangement results in magnet pairs 3040 and 3044 as well as 3042 and 3046 that have identical polarity facing either side of a physical gap. Through this arrangement, there is a repulsive force between magnet pairs 3040 and 3044 as well as 3042 and 3046, and this force is known to increase as magnet pairs are brought more closely together by reducing the physical gap. In the nominal, equilibrium position shown in FIG. 41, the repulsive forces on either side of the stator assembly 2100 are equal and opposite, resulting in no net force on the stator assembly 2100 within the gap and a centering in between rotors 2200(*b*) and 2200 (*a*).

The air gap control system 3000 is designed in such a manner that the axial location of the stator 2100 is nominally centered between annular rotors 2200(*b*) and 2200(*a*), and any relative deflection of the stator 2100 with respect to either of the rotor assemblies 2200(*b*) or 2200(*a*) induces a centering force that acts to return the stator to its nominally centered location between rotor assemblies.

Figure 42:
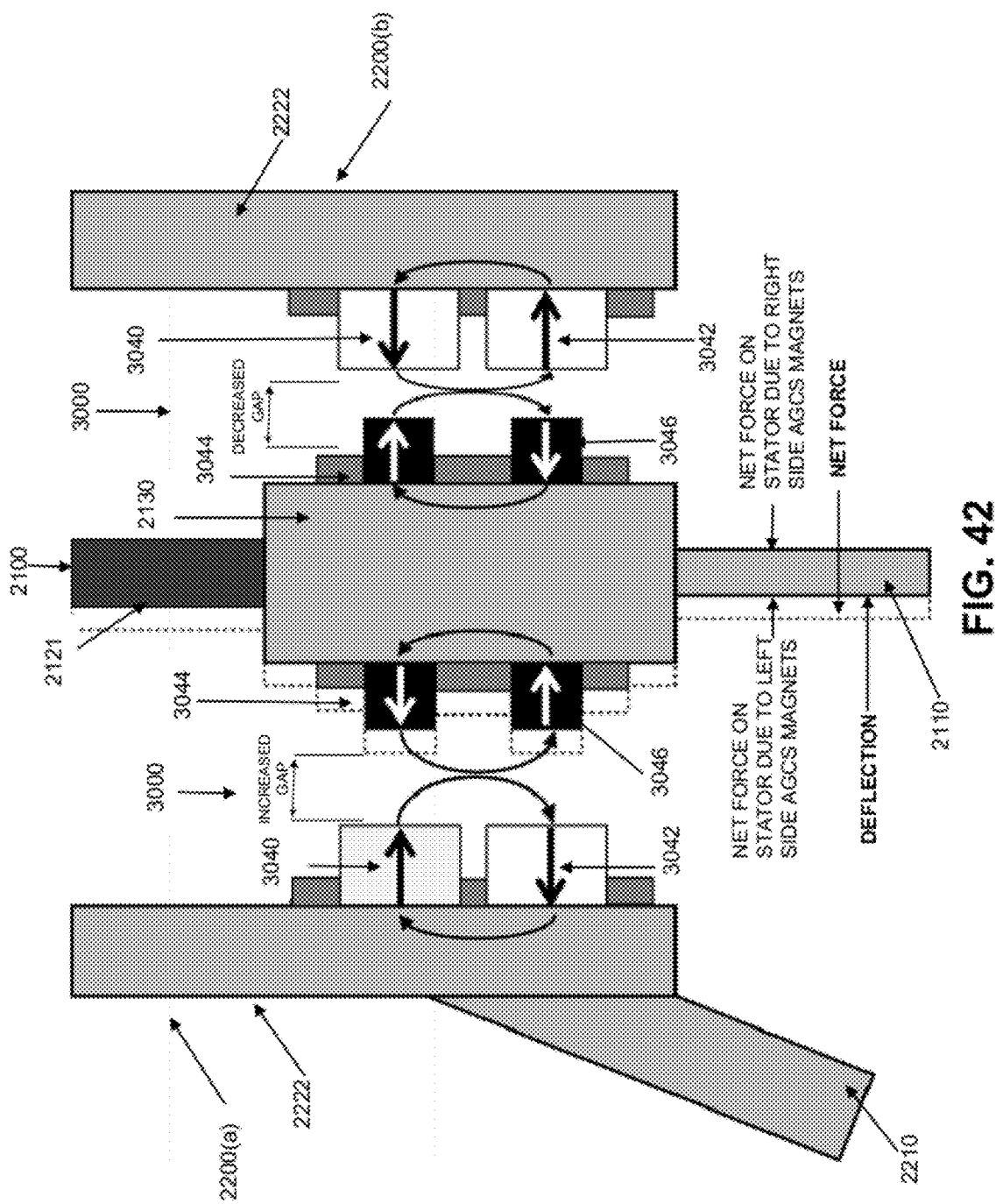
FIG. 42 is a schematic view showing the air gap control system arrangement according to the present invention wherein the stator assembly shown in FIG. 41 has distorted due to an external force.
Figure 43:
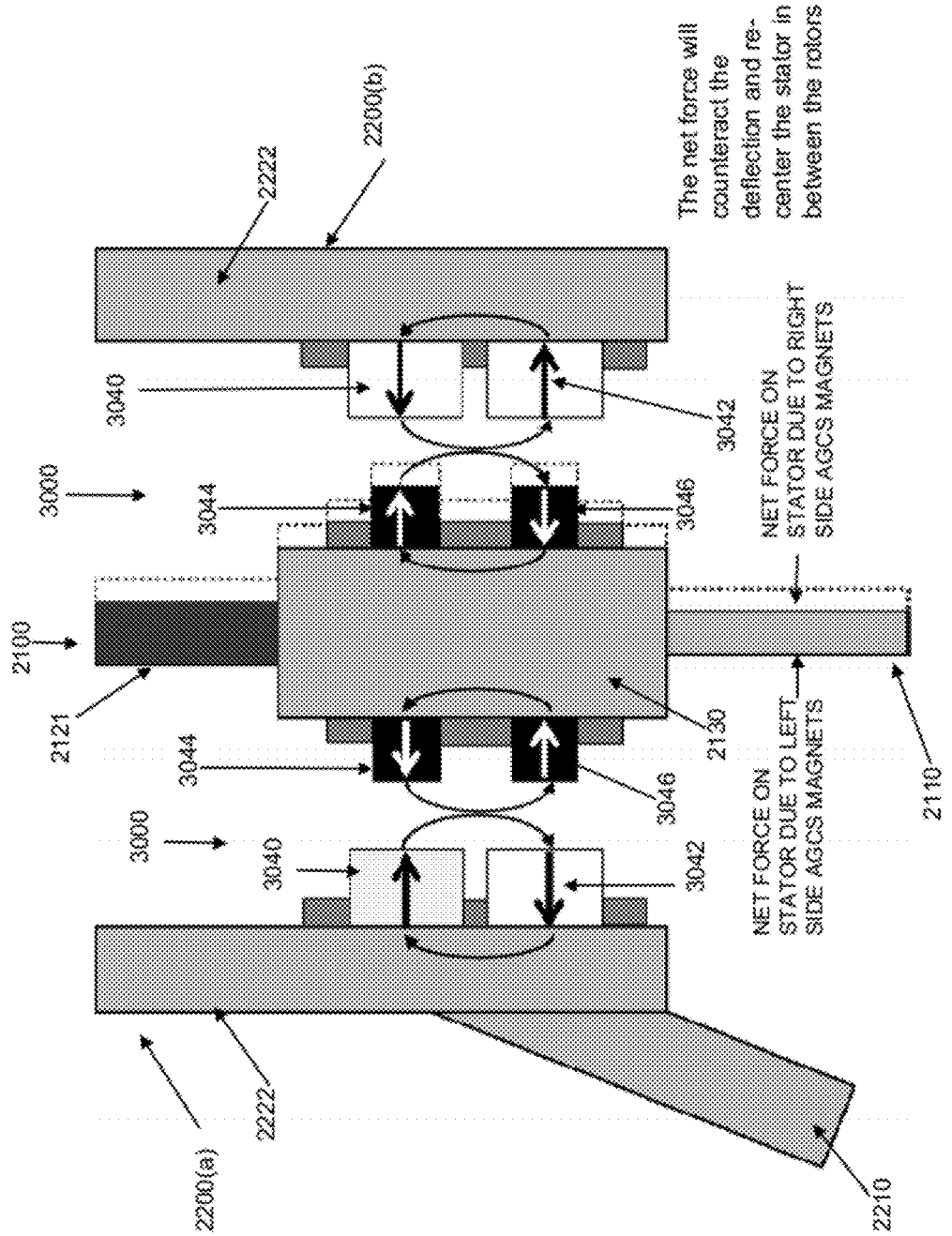
FIG. 43 is a schematic view showing the air gap control system arrangement according to the present invention wherein the stator assembly shown in FIG. 42 has returned to an equilibrium position due to removal of the external force causing the distortion.

FIG. 42 shows the rotor/stator/rotor assembly 2000 after deflection caused by fluctuations in torque, speed or as a result of other inertial dynamics inherent to or externally applied to the rotor/stator/rotor assembly 2000. The physical gap between magnets 3040 and 3042 of rotor assembly 2200 (*b*) and magnets 3044 and 3046 on the right side of stator assembly 2100 is reduced, resulting in an increase in repulsive force between those magnets. The physical gap between magnets 3040 and 3042 of rotor assembly 2200(*a*) and magnets 3044 and 3046 on the left side of stator assembly 2100 is increased, resulting in a reduction in repulsive force between those magnets. The net result of force felt by the stator assembly 2100, is a net force to the left, acting to center the stator assembly 2100 in between the rotors 2200(*b*) and 2200(*a*). This re-centering and balance of forces on the left and right sides of stator assembly 2100 is shown in FIG. 43.

Figure 44:
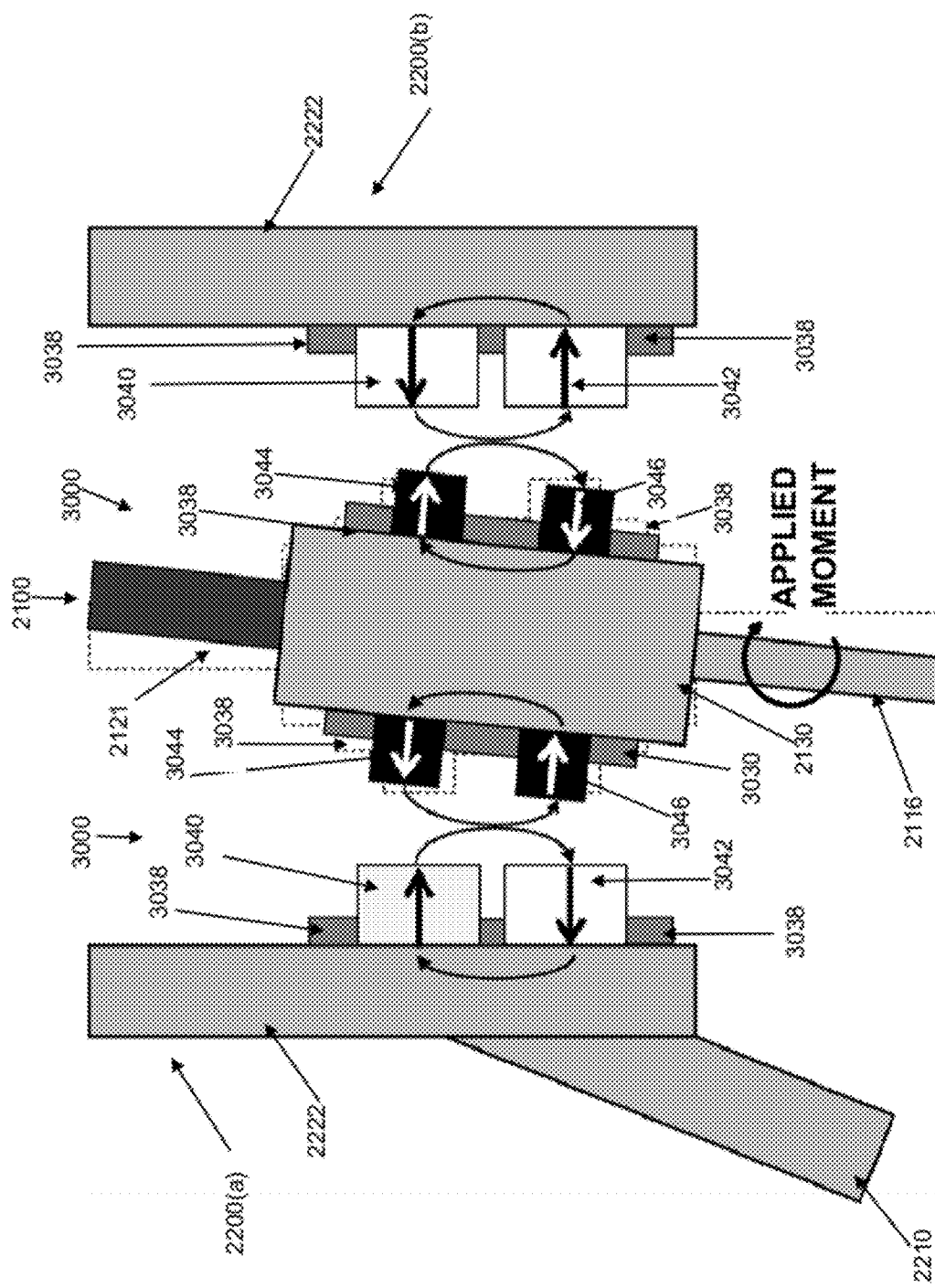
FIG. 44 is a schematic view showing the air gap control system arrangement according to the present invention wherein an applied moment to the stator is reacted by the air gap control system.
Figure 45:
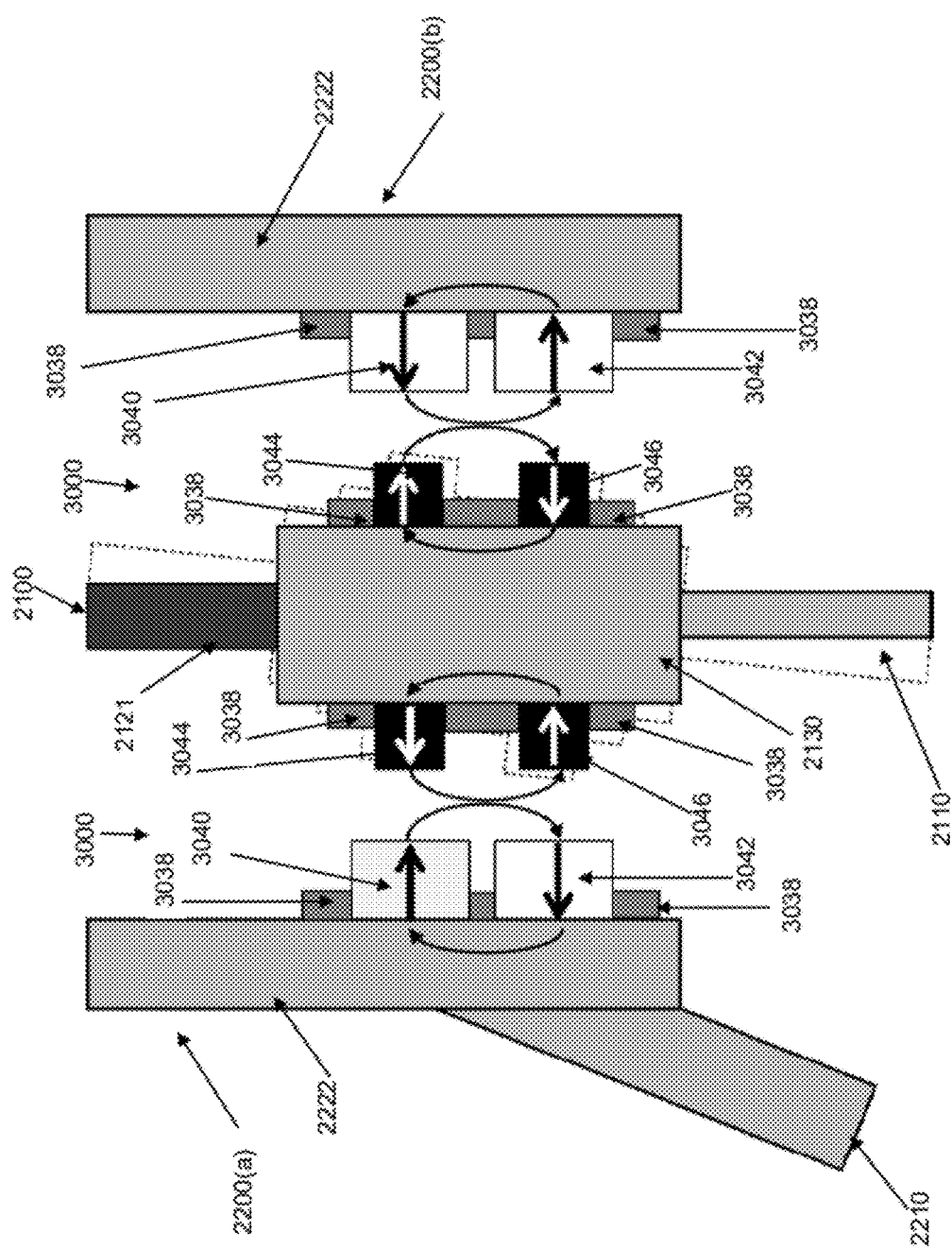
FIG. 45 is a schematic view showing the air gap control system arrangement according to the present invention wherein the stator assembly shown in FIG. 44 has returned to an equilibrium position due to removal of the external force causing the distortion.

Additionally, the repulsive forces of the magnet pairs 3040 and 3044 as well as 3042 and 3046 act to reduce out-of-plane rotation of the stator assembly 2100 in relation to the rotor assemblies 2200(*b*) and 2200(*a*) by reacting against bending moments as shown in FIG. 44. These bending moments might be a result of deflection in stator support structures 2110 or inertial loading of the rotor/stator/rotor assembly 2000. The net moment on the system will be balanced and the stator assembly 2100 will re-center itself in between rotors 2200(*b*) and 2200(*a*) and balance forces on the left and right sides as shown in FIG. 45.

While the preferred embodiment utilizes a magnetic bearing as described above, it is known that other means exist by which the air gap control system exerts a force which, in the case of an axially oriented motor or generator, enables a primarily axial translation of at least one rigidly supported member mounted in opposition to at least one other rigidly supported member so that the gap distance at all lateral points between the two members is maintained relatively constant regardless of the dynamic changes in external loading on the rigidly mounted members of the assembly. The preferred and exemplary embodiments described herein have numerous advantages. Generally speaking, an axially soft (or less stiff) structure and an axially stiff support structure for a rotor and stator may be used to reduce loads on any of the force transmitting mechanisms between the rotor and the stator. In the disclosed embodiments, this allows a stiffer rotor to force the stator to follow the rotor, should the rotor deflect from any outside forces. The flex in the soft structure allows for maintaining the necessary axial air gap without exceeding the capacity of either the non-contacting force transmission mechanisms or the contacting force mechanisms over the full range of movement of the rotor. The present invention also can help prevent exceeding the load capacity of the mechanical snubbing material in a contacting force transmission concept. Using combined mechanisms, devices and methods can further reduce the undesirable, rapid wear of the mechanical snubbing material by preventing contact for substantial lengths of operating time (in which case it will be acting like a guide and not like a snubber) while transmitting axial (and torsional) force to the stator.

Using a PCB stator in the present invention differs significantly from iron-core machines of the axial or radial gap configurations. In those machines, the magnetic attraction of the stator to the rotor (and visa versa) is one or two orders of magnitude higher than the forces that make torque from electricity (as a motor) or provide available torque to convert to electricity (as a generator). Thus, the structure of the stator and the rotor, as well as the bearing system between them, must be designed to resist these forces to maintain the physical air gap at rest (for permanently excited machines such as the types that use permanent magnets on the rotors or in the stators) and in operation (all rotating electric machines). Further, in such machines, departures from true concentricity of the stator and the rotor of more than ~10% of the nominal air gap can cause output waveform distortions that can generate undue transmission or other load related losses.

The unique features of the axial gap, air core machines produced using the design and manufacturing methods of U.S. Pat. No. 7,109,625, entitled Conductor Optimized Axial field Rotary Energy Device, dated Sep. 19, 2006, allow the mechanical gap to be set considering tolerances with relatively small machines, while the inside diameter of the stator is left unsupported. As the diameter is increased, the use of tolerances alone to ensure the air gap is inviolate under all operating conditions is impractical if weight and cost are design objectives. The mass of the structure needed to make a stiff enough support to maintain the air gap at machine diameters over 8 meters will necessarily exceed the electromagnetic mass by more than an order of magnitude. In order to reduce costs and weight, the present invention may be employed. This includes using a low axial stator stiffness, for axial air gap machines, combined with a system and method to guide the stator axial movement so that it follows any rotor movement in large diameter, axial air gap, air core, electric machines so that a minimum physical air gap between the rotor and stator is maintained under all conditions. The details of the system and method to transmit the rotor's axial motion to the stator support system so that the support system moves the stator far enough, and timely enough, to avoid contact are numerous, and form a number of embodiments of this design. Other means will be apparent to others practiced in the art. Similar concepts may be used if they may be employed to maintain an air gap between parts with relative motion that cannot touch in operation, and they operate by having one structural element that is significantly stiffer that also provides a spatial reference point and location from which a force is transmitted to the softer structural element to guide it into the desired position from that reference point, such embodiments will be considered to be within the scope of this invention.

Further, in radial field machines where the material selection and geometry of the machine produces the same "air core" results (no magnetic attraction between the rotor and the stator), a similar approach can be used. And, in cases where the rotor is more amenable to being the more flexible element of the system, the same concept applies. Therefore axial and radial field machines with rotors that exhibit sufficient compliance to follow a stiffer stator structure, should it be subject to motion that can close or distort the air gap, should also be understood from the present disclosure In an embodiment of the invention, a pneumatic device may be used in order to provide an "air bearing" between the rotor and stator. This pneumatic device may be used in combination with a mechanical device. In some embodiments, the mechanical device may be integrated with pneumatic features. Such an embodiment could reduce the wear on the mechanical device by maintaining an "air bearing" like ability to support significant loads without allowing contact, while still retaining the mechanical backup protection. In another embodiment, the pneumatic device can be fitted in the vicinity of the mechanical features noted above in the purely mechanical design. In this embodiment the likelihood of an impact load on the initial contact material pads is minimized, as an air bearing load capacity increases as the clearances are reduced.

The same kind of approach can be used with electromagnetic forces, from an active thrust bearing concept with controllable damping, to an inactive arrangement based on arrays of like polarity magnets facing each other (no damping), to concepts like those used in mag-lev trains that use relative motion between magnet arrays in the train "cars" and specifically shaped coils in the track to levitate the train cars also being selected. These systems have inherent damping that can be "designed" by controlling the resistance of the electrical coils.

Moreover, there are additional designs which use auxiliary windings to the generator windings at other than the generator pole number to establish a controllable axial force over the working area of the rotor and stator. This method requires, like the magnetic thrust bearing, position sensors, power supplies and controls, but affords substantial force generating capacity and control with relatively little extra material (perhaps another layer or two to each 26 layer board), however the added air gap will lower efficiency or require thicker magnets which add cost.

The further object of the invention is inventively achieved by a wind turbine comprising a generator as described above. The wind turbine may include one or many of embodiments described herein. Those of skill in the art will be readily aware that many of the improvements, modifications, and designs provided herein can be combined and modified consistent with the present invention.

In conclusion, the present invention provides, among other things, a system and method for the design, manufacturing and operation of rotating electromagnetic machines—typically called electric motors or electric power generators. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention.

We claim:

1. An assembly for an axial flux generator, the assembly comprising:
   an arc-shaped rotor section, the rotor section including
      a rotor support, configured to rotate around an axis of a generator, a first rotor element and a second rotor element each connected to the rotor support, the first rotor element and the second rotor element each being for power generation; and
   an arc-shaped stator section, the stator section including:
      a stator support, a first printed circuit board and a second printed circuit board each connected to the stator support in a side-by side relationship along at least a portion of the arc-shaped stator section, the first printed circuit board being for power generation and having a plurality of conductors, at least a first conductor from the plurality of conductors providing a conductive path associated with a first electrical phase of the axial flux generator and at least a second conductor from the plurality of conductors providing a conductive path associated with a, second electrical phase of the axial flux generator different than the first electrical phase of the axial flux generator, the second printed circuit board being for power generation and being coupled to the first printed circuit board,
      the arc-shaped stator section configured to be coupled to an adjacent arc-shaped stator section of the axial flux generator;
      the rotor section and the stator section being disposed relative to each other such that an axial air gap is defined between (1) the first rotor element and the second rotor element and (2) the first printed circuit board and the second printed circuit board, the first rotor element, the second rotor element, the first printed circuit board and the second printed circuit board each being configured to be positioned at substantially the same radial distance from the axis of the generator.

2. The assembly of claim 1, wherein the first rotor element is positioned on a first side of the first printed circuit board, the second rotor element is positioned on a first side of the second rotor element, the rotor section further includes a third rotor element positioned on a second side of the first printed circuit board and a fourth rotor element positioned on a second side of the second printed circuit board.

3. The assembly of claim 1, wherein each of the first printed circuit board and the second printed circuit board extend radially outward from the stator support.

4. The assembly of claim 1, wherein the assembly is non-destructively detachably connectable to an adjacent assembly.

5. The assembly of claim 1, wherein the first printed circuit board and the second printed circuit board are each non-destructively detachably connected to the stator support.

6. The assembly of claim 1, wherein the assembly is for an axial flux generator with a diameter of at least three meters.

7. The assembly of claim 1, wherein the rotor support is axially flexible.

8. An axial flux generator comprising:
   a plurality of arc-shaped rotor sections, each rotor section including
      a rotor support configured to rotate around an axis of a generator and an at least one rotor element connected to the rotor support, the at least one rotor element being for power generation; and a plurality of arc-shaped stator sections, each stator section including a stator support, a first printed circuit board and a second printed circuit board each connected to the stator support in a side-by side relationship along at least a portion of the arc-shaped stator section, the first printed circuit board being for power generation and providing a plurality of conductors, each conductor from the plurality of conductors providing a conductive path associated with a different one of a plurality of electrical phases of the axial flux generator, each conductor from the plurality of conductors being couplable to a corresponding conductor from a plurality of conductors of an adjacent stator section from the plurality of arc-shaped stator sections, the second printed circuit board being for power generation and being couplable to the first printed circuit board, an axial air gap being defined between the at least one rotor element and both the first printed circuit board and the second printed circuit board, the first printed circuit board, the second printed circuit board and the at least one rotor element each being positioned at substantially the same radial distance from the axis of the generator.

9. The axial flux generator of claim 8, wherein the rotor section further includes a first rotor element positioned on a first side of one of the first printed circuit board and the second printed circuit board and a second rotor element positioned on a second side of the one of a first printed circuit board and the second printed circuit board.

10. The axial flux generator of claim 8, wherein the at least one rotor element extends radially inward from the rotor support.

11. The axial flux generator of claim 8, wherein each rotor section from the plurality of rotor sections is non-destructively detachably connectable to an adjacent rotor section.

12. The axial flux generator of claim 8, wherein the at least one rotor element is non-destructively detachably connected to the rotor support.

13. The axial flux generator of claim 8, wherein the axial flux generator has a diameter of at least three meters.

14. The axial flux generator of claim 8, wherein the rotor support is axially flexible.

15. An axial flux generator comprising:

a non-destructively detachable rotor section including a rotor support configured to rotate around an axis of a generator and at least one rotor element connected to the rotor support, the at least one rotor element being for power generation; and a non-destructively detachable stator section including a first printed circuit board for power generation and a second printed circuit board for power generation coupled to the first printed circuit board in a side-by-side relationship along at least a portion of the stator section, the first printed circuit board having plurality of conductors, at least a first conductor from the plurality of conductors configured to provide a conductive path associated with a first electrical phase of the axial flux generator and at least a second conductor from the plurality of conductors configured to provide a conductive path associated with a second electrical phase of the axial flux generator, the second printed circuit board being couplable to the first printed circuit board, the non-destructively detachable stator section configured to be coupled to an adjacent non-destructively detachable stator section, the non-destructively detachable rotor section configured to be coupled to an adjacent non-destructively attachable rotor section of the axial flux machine; and an axial air gap being defined between the at least one rotor element and both the first printed circuit board and the second printed circuit board, the at least one rotor element, the first printed circuit board and the second printed circuit board each being positioned at substantially the same radial distance from the axis of the generator.

16. The assembly of claim 1, wherein the first conductor is configured to be electrically coupled to a corresponding conductor associated with the first phase of the axial flux generator of the adjoining arc-shaped stator section, and the second conductor is configured to be electrically coupled to a corresponding conductor associated with the second phase of the axial flux generator of the adjoining arc-shaped stator section.

17. The axial flux generator of claim 15, wherein the first conductor is electrically couplable to a conductor of an adjacent stator section providing a conductive path associated with the first electrical phase of the axial flux generator, and the second conductor is electrically couplable to a conductor of the adjacent stator section providing a conductive path associated with the second electrical phase of the axial flux generator.

18. The axial flux generator of claim 15, wherein the first printed circuit board, the second printed circuit board, the first rotor element and the second rotor element, are each positioned at substantially the same radial distance from the axis of the generator.

* * * * *